United States Patent
Oguri et al.

(10) Patent No.: US 11,047,433 B2
(45) Date of Patent: Jun. 29, 2021

(54) CLUTCH AND MOTOR

(71) Applicant: DENSO CORPORATION, Kariya (JP)

(72) Inventors: Ryosuke Oguri, Kariya (JP); Shusuke Kijima, Kariya (JP); Tetsuya Honda, Kariya (JP); Yoshio Aoki, Kariya (JP); Hiroyuki Okada, Kariya (JP); Kenta Suzuki, Kariya (JP); Nakatsune Shirai, Kariya (JP); Daisuke Sawamoto, Kariya (JP); Tomoaki Ozaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 110 days.

(21) Appl. No.: 16/471,959

(22) PCT Filed: Mar. 9, 2018

(86) PCT No.: PCT/JP2018/009196
§ 371 (c)(1),
(2) Date: Jun. 20, 2019

(87) PCT Pub. No.: WO2018/168686
PCT Pub. Date: Sep. 20, 2018

(65) Prior Publication Data
US 2019/0331175 A1 Oct. 31, 2019

(30) Foreign Application Priority Data

Mar. 17, 2017 (JP) .............................. JP2017-053617
Mar. 17, 2017 (JP) .............................. JP2017-053618
Mar. 17, 2017 (JP) .............................. JP2017-053619

(51) Int. Cl.
*F16D 15/00* (2006.01)
*F16D 41/08* (2006.01)
(Continued)

(52) U.S. Cl.
CPC ............. *F16D 41/08* (2013.01); *F16D 15/00* (2013.01); *H02K 23/68* (2013.01); *E05F 15/697* (2015.01);
(Continued)

(58) Field of Classification Search
CPC .......... F16D 41/08; F16D 15/00; F16D 43/24; H02K 23/68; H02K 5/148; H02K 5/225;
(Continued)

(56) References Cited

U.S. PATENT DOCUMENTS 3,827,524 A * 8/1974 Kagata ............... B60K 17/3515
192/48.6
2002/0011390 A1 1/2002 Yamamoto et al.
(Continued)

FOREIGN PATENT DOCUMENTS

| | | |
|---|---|---|
| JP | H11-264426 A | 9/1999 |
| JP | 2002-44908 A | 2/2002 |

(Continued)

OTHER PUBLICATIONS

May 29, 2018 International Search Report issued in International Patent Application No. PCT/JP2018/009196.

*Primary Examiner* — David J Hlavka
(74) *Attorney, Agent, or Firm* — Oliff PLC

(57) ABSTRACT

This clutch includes an annular clutch housing, a rotationally driven drive-side rotating body, a driven-side rotating body, a rolling body, and a support member. The clutch is configured such that, when the drive-side rotating body starts to rotate when driven, the drive-side rotating body comes into contact with the support member in a rotational direction and presses the rolling body in the rotational direction through the support member, thereby releasing the rolling body from gripping effected by the clutch housing and the driven-side rotating body. The support member
(Continued)

includes a load generation section for generating a load which makes it difficult for the support member to rotate about the rotation axis of the drive-side rotating body when at least the drive-side rotating body starts to rotate when driven.

16 Claims, 37 Drawing Sheets

(51) Int. Cl.
*H02K 23/68* (2006.01)
*E05F 15/697* (2015.01)

(52) U.S. Cl.
CPC ..... *E05Y 2201/434* (2013.01); *E05Y 2900/55* (2013.01)

(58) Field of Classification Search
CPC ....... H02K 7/1166; H02K 7/14; E05F 15/697; E05Y 2201/434; E05Y 2900/55
See application file for complete search history.

(56) References Cited

U.S. PATENT DOCUMENTS

| | | | | |
|---|---|---|---|---|
| 2002/0158527 | A1* | 10/2002 | Kawakami | H02K 5/148 310/78 |
| 2012/0061200 | A1* | 3/2012 | Yamashita | H02K 7/108 192/45.001 |
| 2014/0232247 | A1* | 8/2014 | Honda | H02K 7/003 310/75 D |

FOREIGN PATENT DOCUMENTS

| | | |
|---|---|---|
| JP | 2005-160161 A | 6/2005 |
| JP | 2007-100846 A | 4/2007 |
| JP | 2012-82952 A | 4/2012 |
| JP | 2015-148332 A | 8/2015 |

\* cited by examiner

Fig.29
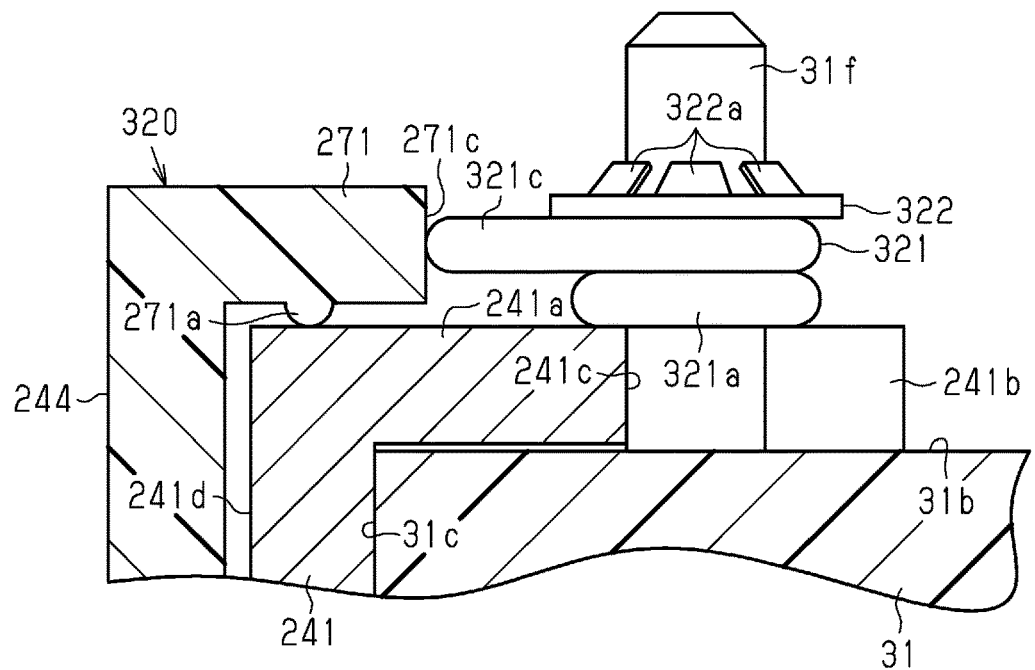
Fig.30A                    Fig.30B
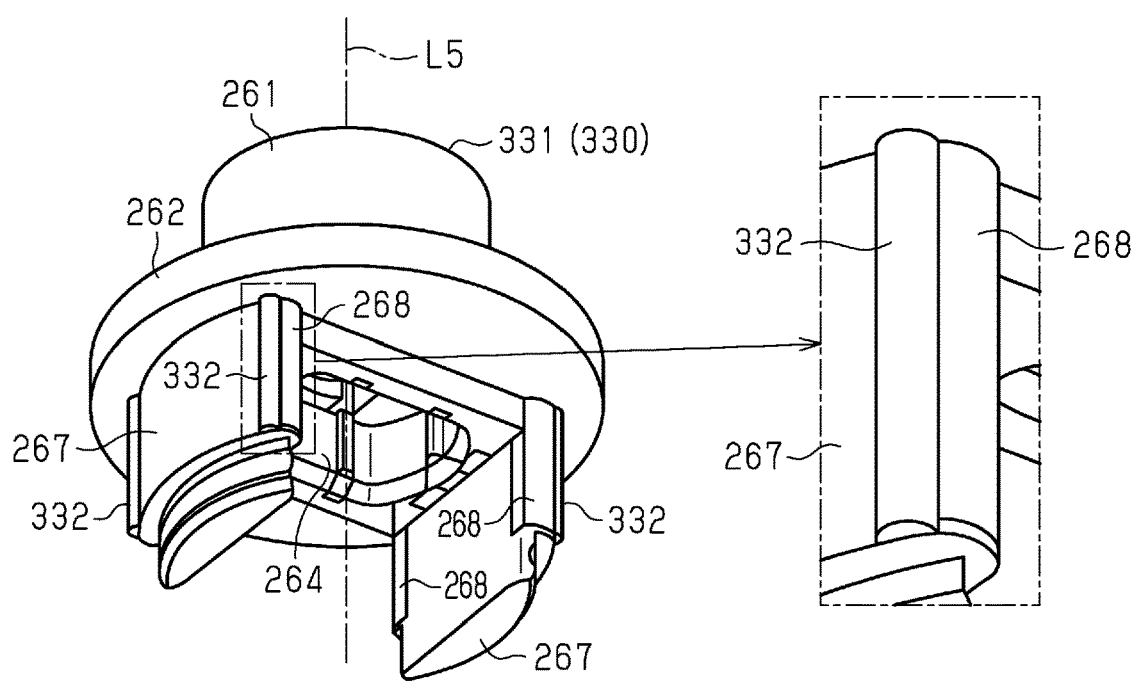

CLUTCH AND MOTOR

TECHNICAL FIELD

The present invention relates to a clutch and a motor.

BACKGROUND ART

In the prior art, a motor used as a drive source of a power window device or the like mounted on a vehicle includes a motor unit and an output unit. The motor unit includes a rotation shaft that is rotationally driven. The output unit includes a driven shaft to which the rotational driving force of the rotation shaft is transmitted. The output unit outputs the rotational driving force transmitted to the driven shaft. As described in patent document 1, for example, the rotation shaft and the driven shaft are connected by a clutch that functions to transmit the rotational driving force of the rotation shaft to the driven shaft while restricting the transmission of rotation force from the driven shaft side to the rotation shaft.

Patent document 1 describes a clutch including a driving-side rotating body that rotates integrally with the rotation shaft, a driven-side rotating body engageable with the driving-side rotating body in a rotation direction and rotated integrally with a driven shaft, and a cylindrical clutch housing into which the driving-side rotating body and the driven-side rotating body are inserted. Further, rolling bodies are arranged between the inner circumferential surface of the clutch housing and the driven-side rotating body to restrict rotation of the driven-side rotating body (that is, the rotation of the driven shaft) by being held between the inner circumferential surface of the clutch housing and the driven-side rotating body (serving as wedges) when the rotation shaft is not rotationally driven. The rolling bodies are held by a support member inserted into the clutch housing. The support member includes rolling body holding portions, each having two supports projecting in the direction of the rotation axis of the driving-side rotating body on two sides of each rolling body in the rotation direction of the driving-side rotating body, to hold the rolling bodies between the inner circumferential surface of the clutch housing and the driven-side rotating body. The support member is rotatable about the rotation axis of the driving-side rotating body together with the driving-side rotating body.

In such a clutch, when starting rotational drive of the rotation shaft, the driving-side rotating body comes into contact with the support member (rolling body holding portions of the support member) from the rotation direction of the driving-side rotating body and presses the rolling bodies in the rotation direction of the driving-side rotating body with the support member (rolling body holding portions) to release the rolling bodies held between the inner circumferential surface of the clutch housing and the driven-side rotating body. When the rotation shaft is rotationally driven, the support member is pressed by the driving-side rotating body to rotate about the rotation axis of the driving-side rotating body together with the driving-side rotating body. Thus, when the rotation shaft is rotationally driven, the rolling bodies rotate together with the driving-side rotating body and the driven-side rotating body about the rotation axis of the driving-side rotating body along the inner circumferential surface of the clutch housing while being held by the support member.

PRIOR ART DOCUMENTS

Patent Document

Patent Document 1: Japanese Laid-Open Patent Publication No. 2012-82952

SUMMARY OF INVENTION

Problems that are to be Solved by the Invention

As described above, when starting rotational drive of the rotation shaft (driving-side rotating body), the driving-side rotating body rotates relative to the support member, and the driving-side rotating body comes into contact with the support member (rolling body holding portions) from the rotation direction of the driving-side rolling body. The driving-side rotating body presses the rolling bodies in the rotation direction of the driving-side rotating body with the support member while in contact with the support member (rolling body holding portions) and releases the rolling bodies held between the inner circumferential surface of the clutch housing and the driven-side rotating body. In this case, after releasing the rolling bodies, even when the driven-side rotating body that has started to rotate integrally with the driving-side rotating body acts to hold the rolling bodies again between the inner circumferential surface of the clutch housing, the driving-side rotating body continues to contact and press the support member (rolling body holding portions) from the rotation direction, and the support member holding the rolling bodies rotates integrally with the driving-side rotating body. Thus, the rolling bodies, which are held between the inner circumferential surface of the clutch housing and the driven-side rotating body, are readily released. Accordingly, in this case, the rolling bodies held between the inner circumferential surface of the clutch housing and the driven-side rotating body can be released smoothly. This limits the generation of noise at the clutch when starting rotational drive of the rotation shaft.

However, the impact of the driving-side rotating body coming into contact with the support member (rolling body holding portions) when starting rotational drive of the rotation shaft will force the support member in the rotation direction of the driving-side rotating body, and the support member holding the rolling bodies may rotate ahead of the driving-side rotating body. As a result, the rolling bodies that have once been released from the holding between the inner circumferential surface of the clutch housing and the driven-side rotating body are held again between the driven-side rotating body that has been increased in rotational speed until the driving-side rotating body again comes into contact with the support member (rolling body holding portions), and the inner circumferential surface of the clutch housing. This increases the impact of the driving-side rotating body when coming into contact with the support member (rolling body holding portions) again to release the rolling bodies held between the inner circumferential surface of the clutch housing and the driven-side rotating body becomes large, and generates noise. Further, the impact of the driving-side rotating body coming into contact with the support member (rolling body holding portions) again may cause the support member holding the rolling bodies to rotate ahead of the driving-side rotating body again. Thus, the above actions are repeated. In this case, the clutch generates noise a number of times before the rolling bodies, which are held between the inner circumferential surface of the clutch housing and the driven-side rotating body, are completely released.

It is an object of the present invention to provide a clutch and a motor capable of limiting the generation of noise when starting rotational drive of the driving-side rotating body.

Means for Solving the Problem

To achieve the above object, a clutch in accordance with a first aspect includes an annular clutch housing, a driving-side rotating body that is rotationally driven, a driven-side rotating body, a rolling body, and a support member. The driven-side rotating body is inserted into the clutch housing. Rotational driving force is transmitted from the driving-side rotating body to the driven-side rotating body. The rolling body is arranged between an inner circumferential surface of the clutch housing and the driven-side rotating body. The rolling body is rotated about a rotation axis of the driving-side rotating body together with the driving-side rotating body when the driving-side rotating body is rotationally driven and held between the clutch housing and the driven-side rotating body to restrict rotation of the driven-side rotating body when the driving-side rotating body is not rotationally driven. The support member holds the rolling body between the inner circumferential surface of the clutch housing and the driven-side rotating body and being rotatable about the rotation axis of the driving-side rotating body together with the driving-side rotating body. When starting rotational drive of the driving-side rotating body, the driving-side rotating body abuts on the support member from a rotation direction and presses the rolling body in the rotation direction with the support member to release the rolling body held between the clutch housing and the driven-side rotating body. The support member includes a load generation portion that generates load limiting rotation of the support member about the rotation axis of the driving-side rotating body at least when starting rotational drive of the driving-side rotating body.

A clutch in accordance with a second aspect includes an annular clutch housing, a driving-side rotating body that is rotationally driven, a driven-side rotating body, a rolling body, and a support member. The driven-side rotating body is at least partially arranged in the clutch housing. Rotational driving force is transmitted from the driving-side rotating body to the driven-side rotating body. The rolling body is arranged between an inner circumferential surface of the clutch housing and the driven-side rotating body. The rolling body is rotated about a rotation axis of the driving-side rotating body together with the driving-side rotating body when the driving-side rotating body is rotationally driven and held between the inner circumferential surface of the clutch housing and the driven-side rotating body to restrict rotation of the driven-side rotating body when the driving-side rotating body is not rotationally driven. The support member holds the rolling body between the inner circumferential surface of the clutch housing and the driven-side rotating body and is rotatable about the rotation axis of the driving-side rotating body together with the driving-side rotating body. When starting rotational drive of the driving-side rotating body, the driving-side rotating body abuts on the support member from a rotation direction of the driving-side rotating body and presses the rolling body in the rotation direction of the driving-side rotating body with the support member to release the rolling body held between the inner circumferential surface of the clutch housing and the driven-side rotating body. The clutch further comprises an urging member that urges the support member to limit rotation of the support member about the rotation axis of the driving-side rotating body.

A clutch in accordance with a third aspect includes an annular clutch housing, a driving-side rotating body that is rotationally driven, a driven-side rotating body, a rolling member, and a support member. The driven-side rotating body is inserted into the clutch housing. Rotational driving force is transmitted from the driving-side rotating body to the driven-side rotating body. The rolling body is arranged between an inner circumferential surface of the clutch housing and the driven-side rotating body. The rolling body is held between the clutch housing and the driven-side rotating body when the driving-side rotating body is not rotationally driven to restrict rotation of the driven-side rotating body. The support member includes a pair of first and second supports and a rolling body holding portion. The first and second supports project in a rotation axis direction of the driving-side rotating body on both sides of the rolling body in a rotation direction of the driving-side rotating body. The rolling body holding portion holds the rolling body between the inner circumferential surface of the clutch housing and the driven-side rotating body. The support member is rotatable about the rotation axis of the driving-side rotating body together with the driving-side rotating body. When starting rotational drive of the driving-side rotating body, the driving-side rotating body abuts on the rolling body holding portion from the rotation direction and presses the rolling body in the rotation direction with the rolling body holding portion to release the rolling body held between the clutch housing and the driven-side rotating body. The clutch further includes a support connecting portion that connects distal end portions of the two first and second supports in the rotation axis direction of the driving-side rotating body.

BRIEF DESCRIPTION OF DRAWINGS

FIG. 29 is a schematic cross-sectional view of the vicinity of the clutch in the motor of the seventh embodiment.

FIG. 30A is a perspective view of a driving-side rotating body of a clutch in an eighth embodiment, and FIG. 30B is a partial enlarged view of the driving-side rotating body.

EMBODIMENTS OF THE INVENTION

First Embodiment

Hereinafter, a motor including a clutch in a first embodiment will now be described.

Figure 1:
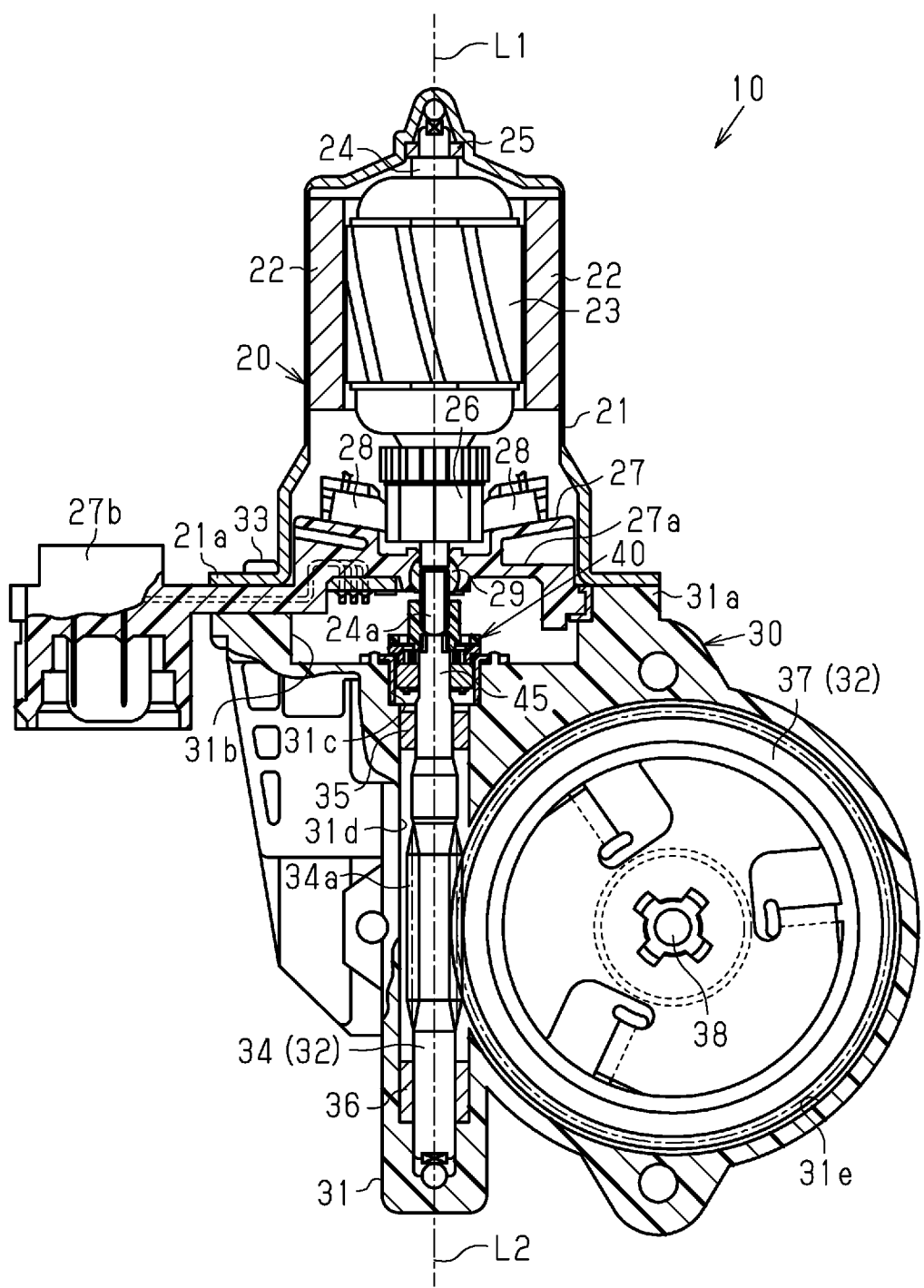
FIG. 1 is a cross-sectional view of a motor of a first embodiment.

A motor 10 in the present embodiment shown in FIG. 1 is provided in a power window device for electrically raising and lowering a vehicle window glass. The motor 10 includes a motor unit 20 for producing torque and an output unit 30 for decelerating and outputting rotation output by the motor unit 20, which are coupled integrally. The motor 10 also includes a clutch 40 at a drive connecting portion between the motor unit 20 and the output unit 30.

The motor unit 20 in the present embodiment includes a DC motor. Magnets 22 are fixed to the inner circumferential surface of a tubular yoke housing 21 (hereinafter referred to as a yoke 21) having a closed end and forming the motor unit 20, and an armature 23 is arranged inside the magnets 22. The armature 23 has a rotation shaft 24 arranged in a central portion of the yoke 21. A proximal end portion (upper end portion in FIG. 1) of the rotation shaft 24 is rotatably supported by a bearing 25 provided at the bottom center of the yoke 21, and a cylindrical commutator 26 is fixed to a portion of the rotation shaft 24 near the distal end. A distal end portion of the rotation shaft 24 (lower end portion in FIG. 1) forms a connecting portion 24a having two parallel planes cut out from a cylindrical form.

A flange 21a extends outward from an opening of the yoke 21, and a brush holder 27 is fitted to the opening of the yoke 21. The brush holder 27 includes a holder body 27a, shaped to close the opening of the yoke 21, and a connector 27b, projecting from the holder body 27a radially outward of the yoke 21 and connected to an external connector (not shown). The holder body 27a holds a plurality of brushes 28 for supplying power. The brushes are electrically connected to the connector 27b by wires (not shown) and slide on the commutator 26. A substantially central portion of the holder body 27a holds a bearing 29. The bearing 29 rotatably supports a portion of the rotation shaft 24 between the commutator 26 and the connecting portion 24a. When external power supplied to the brushes 28 via the connector 27b is supplied to the armature 23 via the commutator 26, the armature 23 (rotation shaft 24) is rotationally driven, that is, the motor unit 20 is rotationally driven.

The output unit 30 includes a speed reduction mechanism 32 and the like accommodated in a gear housing 31 made of resin. The gear housing 31 has a fixing portion 31a for fixing the gear housing 31 to the motor unit 20 at a portion axially facing the motor unit 20 (an upper end portion in FIG. 1). The fixing portion 31a has an outer shape similar to the outer shape of the flange 21a of the yoke 21. A housing recess 31b open to the inside of the yoke 21 is formed in the fixing portion 31a. In a state in which part of the holder body 27a of the brush holder 27 is inserted into the housing recess 31b, the flange 21a abutting on the fixing portion 31a is fixed to the fixing portion 31a by a screw 33. This fixes the yoke 21 to the gear housing 31 integrates the motor unit 20 with the output unit 30. The brush holder 27 is held between the yoke 21 and the fixing portion 31a.

In the gear housing 31, a clutch housing recess 31c is axially recessed in the bottom center of the housing recess 31b. Further, a worm shaft housing 31d is recessed to extend from the bottom center of the clutch housing recess 31c in the direction of the central axis L1 of the rotation shaft 24. In the gear housing 31, a wheel housing 31e is recessed on the side of the worm shaft housing 31d (right side in FIG. 1). The wheel housing 31e and the worm shaft housing 31d are connected at a substantially central portion of the worm shaft housing 31d in the axial direction (longitudinal direction).

A substantially cylindrical worm shaft 34 (driven shaft) is accommodated in the worm shaft housing 31d. The worm shaft 34 is made of a metal material, and has a worm 34a in the form of screw teeth formed on an axially substantially central portion thereof. The worm shaft 34 is rotatably supported at both axial end portions thereof by two bearings 35 and 36 arranged on both axial end portions of the worm shaft housing 31d. The worm shaft 34 arranged in the worm shaft housing 31d is rotatably supported by the bearings 35 and 36 to be arranged coaxially with the rotation shaft 24, that is, so that the central axis L1 of the rotation shaft 24 and the central axis L2 of the worm shaft 34 lie along the same straight line.

A disc-shaped worm wheel 37 meshing with the worm 34a of the worm shaft 34 is rotatably accommodated in the wheel housing 31e. The worm wheel 37 forms the speed reduction mechanism 32 together with the worm shaft 34. That is, the speed reduction mechanism 32 in the present embodiment is a worm speed reduction mechanism (worm gear). An output shaft 38 that extends in the axial direction of the worm wheel 37 (direction perpendicular to the sheet surface in FIG. 1) and rotates integrally with the worm wheel 37 is provided in a radially central portion of the worm wheel 37. The vehicle window glass is connected to the output shaft 38 by a window regulator (not shown).

The clutch 40 that connects the rotation shaft 24 of the motor unit 20 and the worm shaft 34 of the output unit 30 is accommodated in the clutch housing recess 31c.

Figure 2:
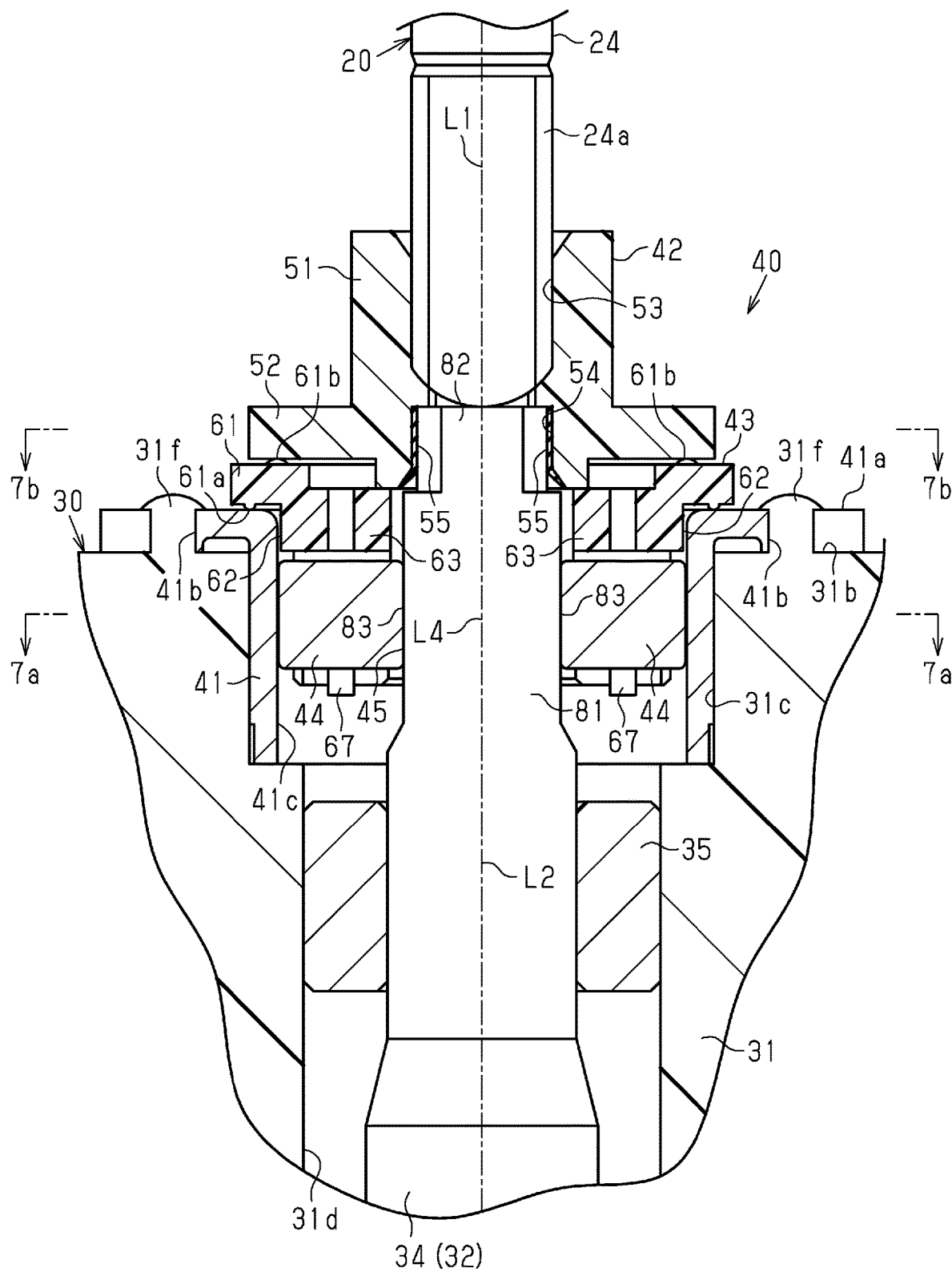
FIG. 2 is a partial, enlarged, cross-sectional view of the motor of the first embodiment.
Figure 3:
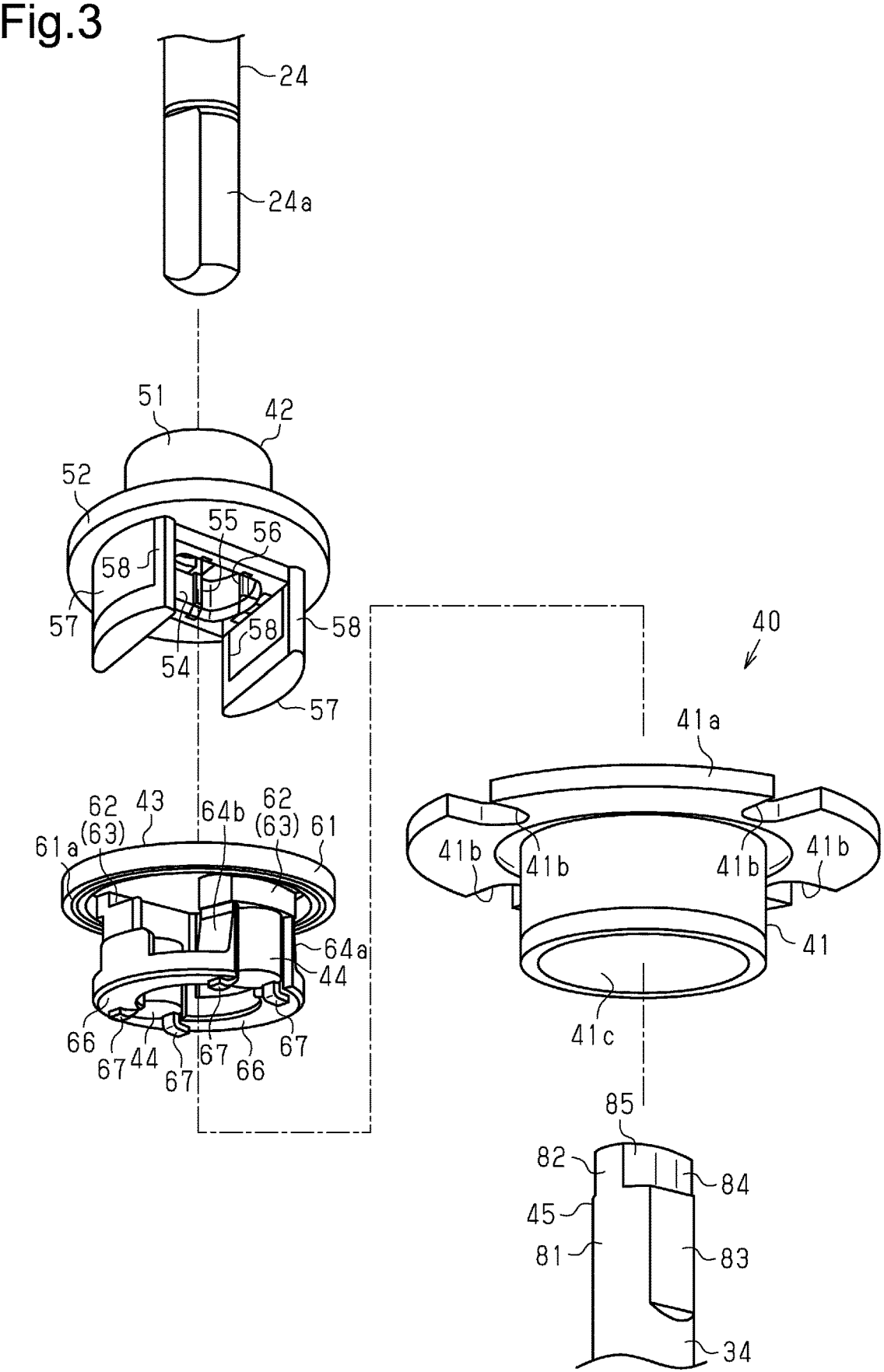
FIG. 3 is an exploded perspective view of a clutch of the first embodiment.

As shown in FIGS. 2 and 3, the clutch 40 includes a clutch housing 41, a driving-side rotating body 42, a support member 43, rolling bodies 44, and a driven-side rotating body 45.

The clutch housing 41 has a cylindrical shape. A collar-shaped flange 41a extends radially outward from one axial end portion of the clutch housing 41. The outer diameter of a cylindrical portion of the clutch housing 41 is substantially equal to the inner diameter of the clutch housing recess 31c, and the outer diameter of the flange 41a is larger than the inner diameter of the clutch housing recess 31c. In the flange 41a, fixing recesses 41b are formed in four locations at equal angular intervals in the circumferential direction. The fixing recesses 41b axially extend through the flange 41a and are open radially outward.

As shown in FIG. 2, the clutch housing 41 is inserted into the clutch housing recess 31c until the flange 41a contacts the bottom of the housing recess 31b, and is fixed to the gear housing 31 at the flange 41a. More specifically, fixing projections 31f projecting in the axial direction are formed on the outer circumference of the opening of the clutch housing recess 31c forming the bottom of the housing recess 31b, at four locations at equal angular intervals in the circumferential direction. The four fixing projections 31f are axially inserted into the four fixing recesses 41b of the flange 41a. Further, distal end portions of the fixing projections 31f are worked on by thermal caulking. Thus, the clutch housing 41 is fixed to the gear housing 31 in a non-movable manner in the axial direction and non-rotatable manner in the circumferential direction. The clutch housing 41 fixed to the gear housing 31 is arranged coaxially with the rotation shaft 24 and the worm shaft 34.

As shown in FIGS. 2 and 3, the driving-side rotating body 42 has a substantially cylindrical shaft connecting portion 51. A disc-shaped collar 52 extending radially outward is integrally formed with the outer circumferential surface of the shaft connecting portion 51.

In the shaft connecting portion 51, a drive shaft insertion hole 53 extending in the axial direction is formed in the axial center of an axial end portion on the motor unit 20 side (upper end portion in FIG. 2). The drive shaft insertion hole 53 has two planes corresponding to the outer shape of the connecting portion 24a of the rotation shaft 24. The connecting portion 24a is press-fitted into the drive shaft insertion hole 53 so that the driving-side rotating body 42 is connected to the rotation shaft 24 in an integrally rotatable manner. The rotation shaft 24 and the driving-side rotating body 42 connected to the rotation shaft 24 are coaxial (that is, their central axes lie along the same straight line).

Also, in the shaft connecting portion 51, a driven shaft insertion hole 54 extending in the axial direction is formed in the axial center of an axial end portion on the output unit 30 side (lower end portion in FIG. 2). The central axis of the driven shaft insertion hole 54 coincides with the central axis of the drive shaft insertion hole 53. In the present embodiment, the drive shaft insertion hole 53 and the driven shaft insertion hole 54 are connected with each other.

Figure 7A:
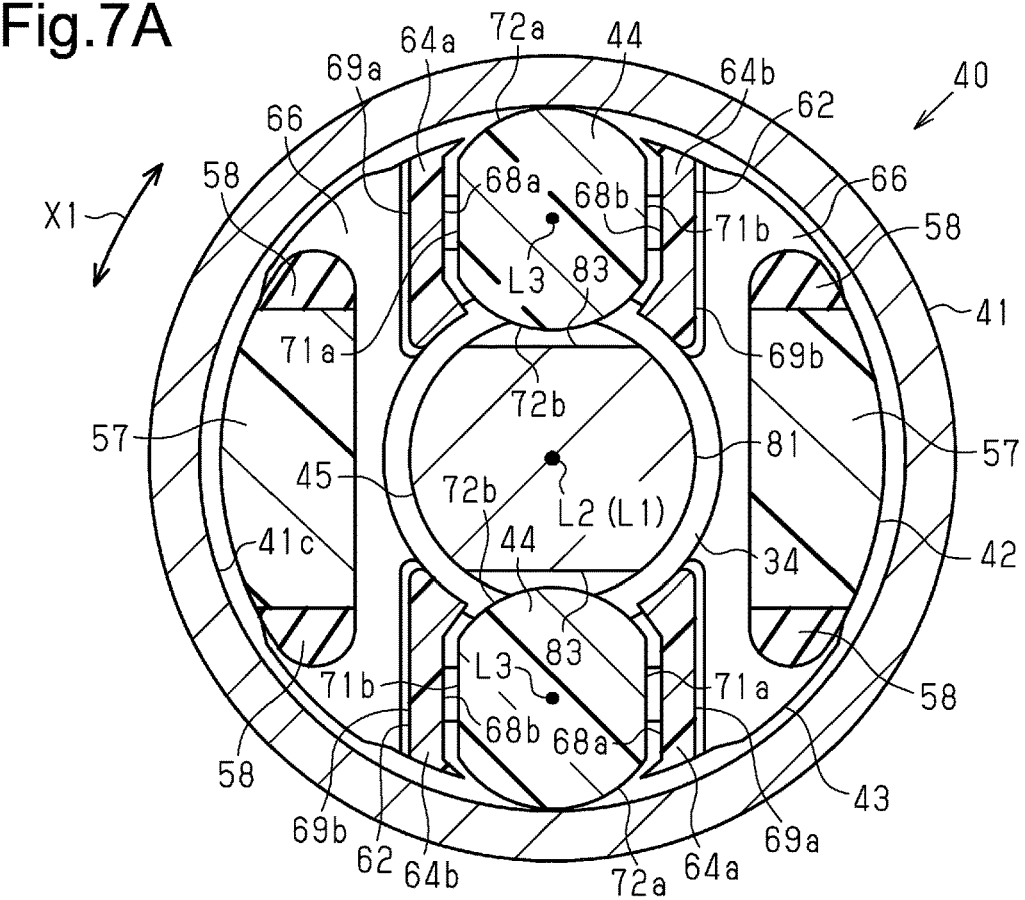
FIG. 7A is a cross-sectional view of the clutch of the first embodiment (a cross-sectional view taken along line 7a-7a in FIG. 2)
Figure 7B:
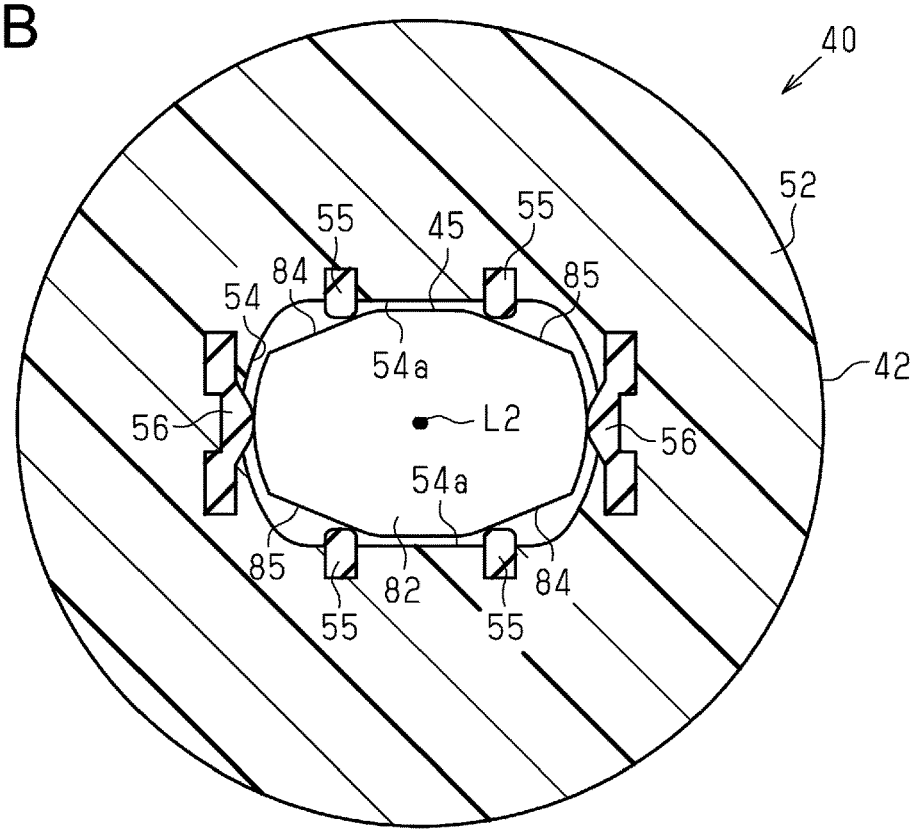
FIG. 7B is a cross-sectional view of the clutch (a cross-sectional view taken along line 7b-7b in FIG. 2).

As shown in FIG. 7B, the inner circumferential surface of the driven shaft insertion hole 54 has two parallel planar driving-side transmission surfaces 54a that are parallel to the axial direction. The shape of the driven shaft insertion hole 54 viewed from the axial direction is substantially shaped as a field track (two planes). A direction parallel to the driving-side transmission surfaces 54a is the longitudinal direction, and a direction perpendicular to the driving-side transmission surfaces 54a is the transverse direction. Two first elastic members 55 made of an elastic material such as a rubber material are provided at each driving-side transmission surface 54a. Second elastic members 56 made of an elastic material such as a rubber material are provided at both end portions of the driven shaft insertion hole 54 in the longitudinal direction in an axial view. The first and second elastic members 55 and 56 project slightly inward from the inner circumferential surface of the driven shaft insertion hole 54.

As shown in FIGS. 3 and 7A, the driving-side rotating body 42 has two rolling body release portions 57 axially extended from the collar 52 toward the output unit 30 (downward in FIG. 3). The rolling body release portions 57 are provided on both sides of the driven shaft insertion hole 54 in the longitudinal direction in an axial view. The two rolling body release portions 57 are provided in positions separated by 180° in the rotation direction and radially opposed to each other. Both end portions of each rolling body release portion 57 in the circumferential direction are formed by elastic portions 58 made of an elastic material such as a rubber material. Both ends of each rolling body release portion 57 in the circumferential direction extend linearly in parallel with the rotation axis of the driving-side rotating body 42. The rolling body release portions 57 are arranged inside the clutch housing 41.

As shown in FIGS. 2 and 3, the support member 43 holds the rolling bodies 44 between the clutch housing 41 and the driven-side rotating body 45 radially facing each other. The support member 43 in the present embodiment is made of resin.

The support member 43 has an annular ring 61 extending about the central axis L2 of the worm shaft 34. The outer diameter of the ring 61 is larger than the inner diameter of the clutch housing 41. The ring 61 is arranged closer to the motor unit 20 (on upper side in FIG. 2) than the flange 41*a* of the clutch housing 41 and axially faces the flange 41*a*. The ring 61 is located between the flange 41*a* and the collar 52 to axially overlap the flange 41*a* and the collar 52.

A lower projecting portion 61*a*, serving as a first abutting portion that forms an annular rib extending in the circumferential direction of the ring 61 and contacts the flange 41*a* from the axial direction, is provided on a lower surface of the ring 61 (an axial end face facing the flange 41*a*). Also, a plurality of upper projecting portions 61*b*, serving as second abutting portions having a substantially semispherical shape projecting in the axial direction, are provided on an upper surface of the ring 61 (an axial end face facing the collar 52). In the present embodiment, the upper projecting portions 61*b* are circumferentially spaced at four locations. The upper projecting portions 61*b* have distal end portions axially contacting the collar 52 from the side of the output unit 30.

Rolling body holding portions 62 for holding the rolling bodies 44 in an axially extending columnar shape are formed at two circumferentially spaced locations on the inner circumferential side of the ring 61 (two locations at 180° intervals in the present embodiment).

The rolling bodies 44 held by the rolling body holding portions 62 will now be described in detail.

Figure 4A:
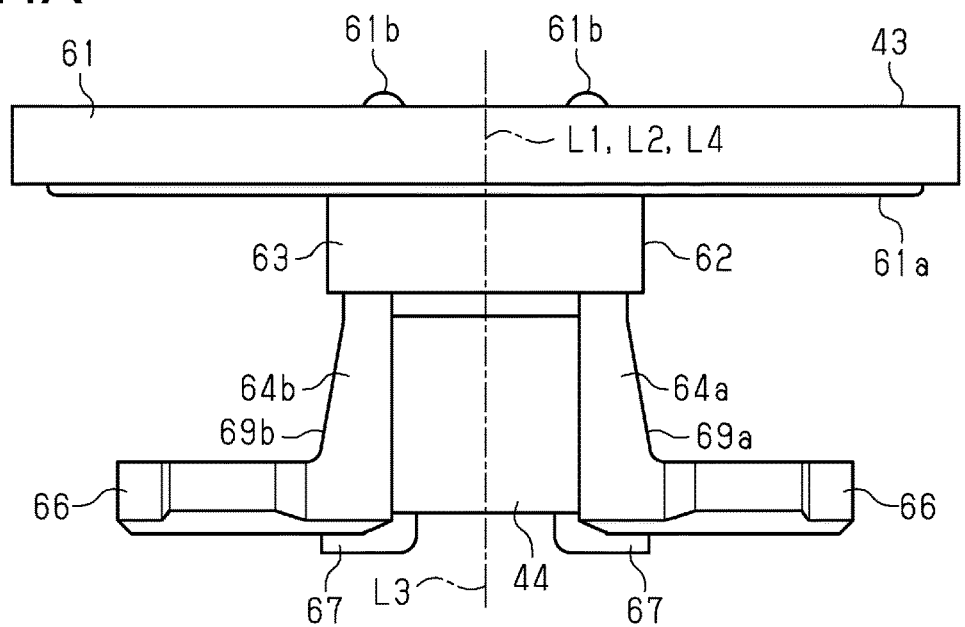
FIG. 4A is a side view of a support member holding rolling bodies in the clutch of the first embodiment.
Figure 4B:
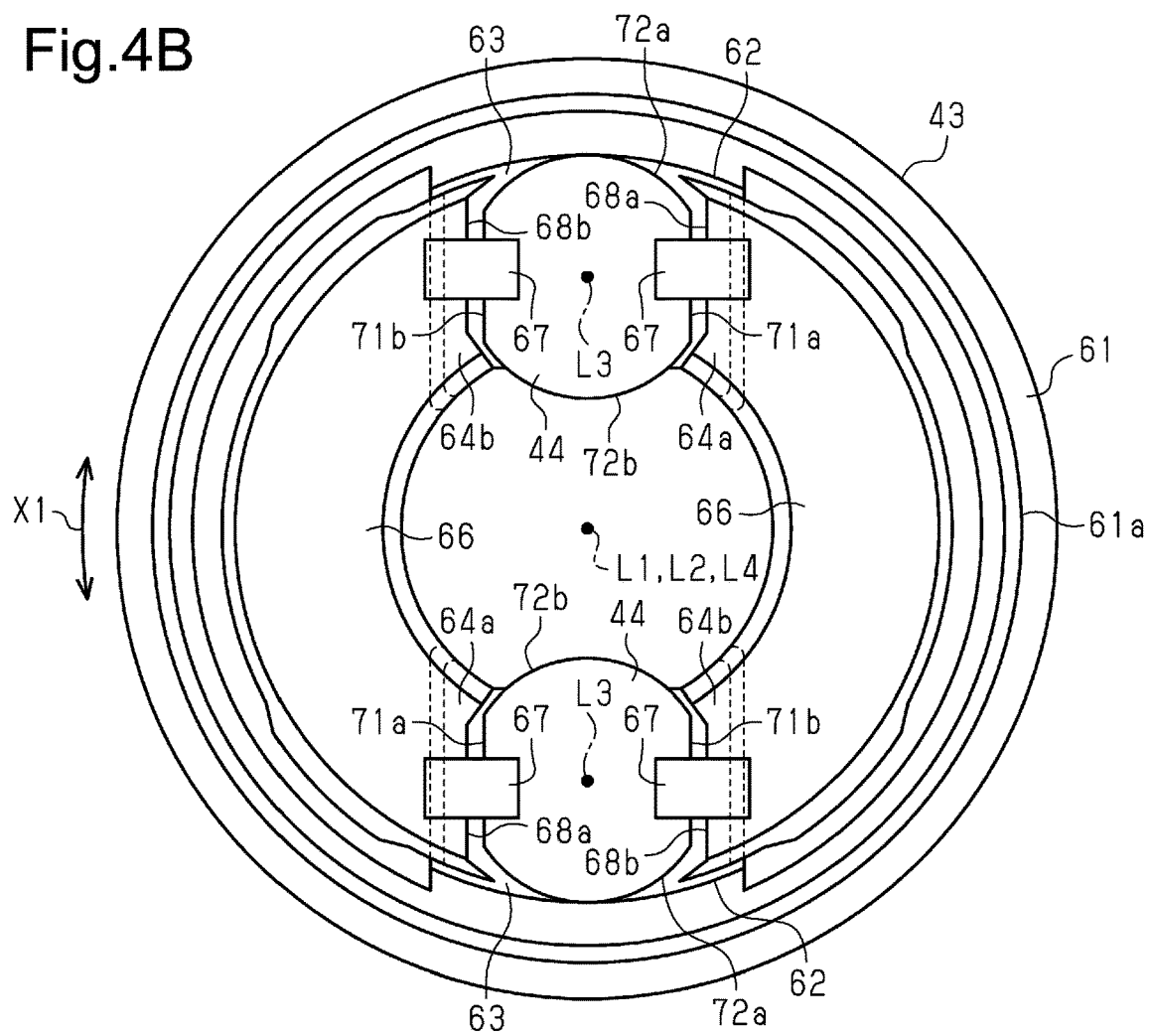
FIG. 4B is a bottom view of the support member.

As shown in FIGS. 4A and 4B, the rolling bodies 44, which are made of resin, are arranged such that their central axes L3 are parallel to the central axis L1 of the rotation shaft 24 and the central axis L2 of the worm shaft 34. The rolling bodies 44 in the present embodiment are shaped to have two planes as viewed from the axial direction. Thus, when viewed from the axial direction, the rolling bodies 44 are shape to extend in the longitudinal direction and the transverse direction. In a state shown in FIG. 4B, the radial direction of the clutch 40 is the longitudinal direction of the rolling bodies 44, and the circumferential direction of the clutch 40 is the transverse direction of the rolling bodies 44. Each rolling body 44 has planar first and second opposed surfaces 71*a* and 71*b* on both sides in a rotation direction X1 of the driving-side rotating body 42 (same as circumferential direction of clutch 40; hereinafter referred to as rotation direction X1). Each rolling body 44 further has first and second arcuate surfaces 72*a* and 72*b* on both sides in the radial direction of the clutch 40.

In each rolling body 44, the first and second opposed surfaces 71*a* and 71*b* are parallel to the central axis L3 and parallel to each other. In each rolling body 44, the first and second arcuate surfaces 72*a* and 72*b* have an arc shape of which the center of curvature is the central axis L3 as viewed from the axial direction. In the present embodiment, the first arcuate surface 72*a* and the second arcuate surface 72*b* have the same curvature but may have different curvatures. The first and second arcuate surfaces 72*a* and 72*b* are formed in parallel and not inclined relative to the central axis L3.

As shown in FIG. 7A, in each rolling body 44, the first arcuate surface 72*a* located on the radially outside radially faces a cylindrical inner circumferential surface 41*c* of the clutch housing 41 and can contact the inner circumferential surface 41*c*. In each rolling body 44, the second arcuate surface 72*b* located on the radially inside radially faces the driven-side rotating body 45 and can contact the driven-side rotating body 45.

As shown in FIGS. 3, 4A, and 4B, each rolling body holding portion 62 includes an axial support portion 63 extending radially inward from the ring 61. The axial support portion 63 axially faces the rolling body 44. Each rolling body holding portion 62 also has two roller supports 64*a* and 64*b* extended to the opposite side of the ring 61 (downward in FIG. 4A) from both circumferential end portions of the axial support portion 63 in the axial direction (direction of the central axes L1 and L2). In each rolling body holding portion 62, the two roller supports 64*a* and 64*b* are located on both sides of the rolling body 44 in the rotation direction X1 and hold the rolling body 44 from both sides in the rotation direction X1 so that the central axis L3 is parallel to the central axis L1. In regard with the two roller supports 64*a* and 64*b* of each rolling body holding portion 62, when the clutch 40 is viewed from the motor unit 20 in the axial direction (that is, in a state shown in FIG. 7A), the roller support located on the counterclockwise side of the rolling body 44 is referred to as a first roller support 64*a*, and the roller support located on the clockwise side of the rolling body 44 is referred to as a second roller support 64*b*.

The support member 43 also has connecting portions 66, each of which connects a distal end portion of the first roller support 64*a* of one of the rolling body holding portions 62 and a distal end portion of the second roller support 64*b* of the other rolling body holding portion 62. The connecting portions 66 have an arc shape and extend about the central axes L1 and L2 in an axial view. In the distal end portions of the roller supports 64*a* and 64*b*, holding claws 67 projecting between the first and second roller supports 64*a* and 64*b* are provided. The holding claws 67 contact one axial end face of the rolling body 44 from the axial direction to prevent separation of the rolling body 44 from the rolling body holding portion 62 in the axial direction.

As shown in FIGS. 4A and 4B, in each rolling body holding portion 62, the two roller supports 64*a* and 64*b* have side surfaces facing each other in the rotation direction X1 which form first and second rolling body abutting surfaces 68*a* and 68*b*. The first rolling body abutting surface 68*a* of the first roller support 64*a* has a planar shape so as to be parallel to the central axes L1 and L2 and faces the first opposed surface 71*a* of the rolling body 44 arranged between the two roller supports 64*a* and 64*b*. Like the first rolling body abutting surface 68*a*, the second rolling body abutting surface 68*b* provided on the second roller support 64*b* has a planar shape parallel to the central axes L1 and L2, and faces the second opposed surface 71*b* of the rolling body 44 arranged between the two roller supports 64*a* and 64*b*. The first and second rolling body abutting surfaces 68*a* and 68*b* facing each other in the rotation direction X1 are parallel to each other.

As shown in FIG. 4B, the distance between the first and second rolling body abutting surfaces 68*a* and 68*b* facing each other at each rolling body holding portion 62 is less than the largest outer diameter of each rolling body 44 (that is, the longitudinal width of the rolling body 44 in an axial view). Further, the distance between the first and second rolling body abutting surfaces 68*a* and 68*b* facing each other at each rolling body holding portion 62 is slightly greater than the width of each rolling body 44 in the rotation direction X1 (length between the first opposed surface 71*a* and the second opposed surface 71b, the transverse width of the rolling body 44 in an axial view).

As shown in FIG. 4A, in each rolling body holding portion 62, the two roller supports 64a and 64b have first and second inclined surfaces 69a and 69b serving as load generation portions on circumferential side surfaces opposite to the first and second rolling body abutting surfaces 68a and 68b facing each other. The first inclined surface 69a provided on the first roller support 64a extends between a position slightly closer to the distal end of the first roller support 64a than the proximal end of the first roller support 64a and the connecting portion 66. The first inclined surface 69a is planar and inclined relative to the direction of the rotation axis L4 of the support member 43 (same as rotation axis direction of the driving-side rotating body 42, same as direction of the central axis L1 in present embodiment). That is, the first inclined surface 69a is formed so as not to be parallel to the direction of the rotation axis L4 and is not perpendicular to the direction of the rotation axis L4. Specifically, the first inclined surface 69a is inclined so that the first rolling body abutting surface 68a becomes farther as the distal end side of the first roller support 64a becomes closer. Thus, the width of the first roller support 64a in the circumferential direction (rotation direction of the support member 43 about the rotation axis of the driving-side rotating body 42) gradually increases from its proximal end side toward its distal end side.

The second inclined surface 69b has the same shape as the first inclined surface 69a. That is, the second inclined surface 69b provided on the second roller support 64b extends between a position slightly closer to the distal end of the second roller support 64b than the proximal end of the second roller support 64b and the connecting portion 66. The second inclined surface 69b is planar and inclined relative to the direction of the rotation axis L4 of the support member 43 (same as rotation axis direction of the driving-side rotating body 42, same as the direction of central axis L1 in present embodiment). The second inclined surface 69b is inclined so that the second rolling body abutting surface 68b becomes farther as the distal end side of the second roller support 64b becomes closer. Thus, the width of the second roller support 64b in the circumferential direction gradually increases from its proximal end side toward its distal end side.

The first inclined surface 69a and the second inclined surface 69b are inclined, for example, by about 10° relative to the direction of the rotation axis L4 of the support member 43.

As shown in FIGS. 2 and 7A, the two rolling bodies 44 are held by the support member 43 of the above structure so as to be arranged at equal angular intervals (at 180° intervals in the present embodiment) in the rotation direction X1. Since the roller supports 64a and 64b holding the rolling bodies 44 are inserted and arranged in the clutch housing 41, the rolling bodies 44 radially face the clutch housing 41 inside the clutch housing 41. The support member 43 is relatively rotatable in the rotation direction X1 relative to the clutch housing 41.

The rolling body release portions 57 of the driving-side rotating body 42 are inserted into the clutch housing 41 through the inner circumferential side of the ring 61 of the support member 43. Further, each rolling body release portion 57 is arranged between the two rolling body holding portions 62 and circumferentially adjacent to the rolling body holding portions 62. Thus, both end portions (elastic portions 58) of each rolling body release portion 57 in the rotation direction X1 face the first roller support 64a of one of the rolling body holding portions 62 and the second roller support 64b of the other rolling body holding portion 62 in the rotation direction X1. Specifically, one end portion of each rolling body release portion 57 in the rotation direction X1 faces the first inclined surface 69a of the first roller support 64a of one of the rolling body holding portions 62 in the rotation direction X1, and the other end portion of the rolling body release portion 57 in the rotation direction X1 faces the second inclined surface 69b of the second roller support 64b of the other rolling body holding portion 62 in the rotation direction X1. The support member 43 and the driving-side rotating body 42 are relatively rotatable in the rotation direction X1. When the driving-side rotating body 42 rotates, the rolling body release portions 57 come into contact with the first inclined surfaces 69a of the first roller supports 64a or the second inclined surfaces 69b of the second roller supports 64b located forward in the rotation direction from the rotation direction of the driving-side rotating body 42.

As shown in FIGS. 2 and 3, the driven-side rotating body 45 is formed integrally with a proximal end portion of the worm shaft 34 (an upper end portion in FIG. 2), and is made of metal. The driven-side rotating body 45 includes a control portion 81 and a driven-side connecting portion 82 arranged in the axial direction. The driven-side connecting portion 82 is provided on the proximal end side (upper side in FIG. 2) of the control portion 81.

The control portion 81 is formed integrally with the worm shaft 34 and is cylindrical. The control portion 81 extends in the axial direction of the worm shaft 34. The control portion 81 has a central axis coinciding with the central axis L2 of the worm shaft 34 and is formed coaxially with the worm shaft 34. As shown in FIG. 7A, when viewed from the direction of the central axis L2, the control portion 81 has a point symmetrical shape, of which the center of symmetry is the central axis L2 of the worm shaft 34.

Two control surfaces 83 are formed on the outer circumferential surface of the control portion 81. The control surfaces 83 are formed at two locations at equal angular intervals (at 180° intervals in the present embodiment) in the circumferential direction on the outer circumferential surface of the control portion 81. The control surfaces 83 are planar and parallel to the axial direction and orthogonal to the radial direction of the driven-side rotating body 45. Further, the two control surfaces 83 are parallel to each other, and the axial length of the control surfaces 83 is greater than the axial length of the rolling bodies 44.

As shown in FIGS. 2 and 7B, the driven-side connecting portion 82 is cylindrical and extends in the axial direction of the worm shaft 34. The driven-side connecting portion 82 has a central axis coinciding with the central axis L2 of the worm shaft 34 and is formed coaxially with the worm shaft 34. The driven-side connecting portion 82 is slightly thinner than the driven shaft insertion hole 54. The driven-side connecting portion 82 has a substantially elliptical cross-section orthogonal to the axial direction, and the cross-sectional shape is uniform in the axial direction. In an axial view, the longitudinal direction of the driven-side connecting portion 82 is parallel to the control surfaces 83, and the transverse direction of the driven-side connecting portion 82 is perpendicular to the control surfaces 83 (see also FIG. 7A). As shown in FIG. 7B, when viewed from the direction of the central axis L2, the driven-side connecting portion 82 has a point symmetrical shape of which the center of symmetry is the central axis L2 of the worm shaft 34.

Two first driven-side transmission surfaces 84 and two second driven-side transmission surfaces 85 are formed on the outer circumferential surface of the driven-side connecting portion 82. One of the two first driven-side transmission surfaces 84 is formed 180° opposite to the other first driven-side transmission surface 84. The two first driven-side transmission surfaces 84 are planar and parallel to the axial direction and parallel to each other. The distance between the two first driven-side transmission surfaces 84 is equal to the distance between the two driving-side transmission surfaces 54a provided in the driven shaft insertion hole 54 of the driving-side rotating body 42.

The second driven-side transmission surfaces 85 are each formed between the two first driven-side transmission surfaces 84. One of the second driven-side transmission surfaces 85 is formed 180° opposite to the other second driven-side transmission surface 85. The two second driven-side transmission surfaces 85 are planar and parallel to the axial direction and parallel to each other. The distance between the two second driven-side transmission surfaces 85 is equal to the distance between the two driving-side transmission surfaces 54a provided in the driven shaft insertion hole 54 of the driving-side rotating body 42. The first driven-side transmission surfaces 84 and the second driven-side transmission surfaces 85 are axially formed from one end to the other end of the driven-side connecting portion 82 in the axial direction.

As shown in FIG. 2, the driven-side rotating body 45 is inserted into the clutch housing 41 and the support member 43 from the side opposite to the driving-side rotating body 42. The driven-side rotating body 45 is arranged coaxially with the clutch housing 41, the driving-side rotating body 42, and the support member 43.

As shown in FIG. 7B, the driven-side connecting portion 82 is loosely fitted in the driven shaft insertion hole 54 to be integrally rotatable with the driving-side rotating body 42. The first and second elastic members 55 and 56 are located between the outer circumferential surface of the driven-side connecting portion 82 loosely fitted in the driven shaft insertion hole 54 and the inner circumferential surface of the driven shaft insertion hole 54. Specifically, the two second elastic members 56 are in contact with both end portions of the driven-side connecting portion 82 in the longitudinal direction in an axial view. The four first elastic members 55 are located between the driving-side transmission surfaces 54a and the two first driven-side transmission surfaces 84 and two second driven-side transmission surfaces 85.

When the driving-side rotating body 42 rotates about the central axis relative to the driven-side rotating body 45, the driving-side transmission surfaces 54a come into contact with the first driven-side transmission surfaces 84 or the second driven-side transmission surfaces 85 in the rotation direction while elastically deforming the first elastic members 55. Thus, the driving-side rotating body 42 is engaged with the driven-side rotating body 45 in the rotation direction to transmit the rotational driving force of the driving-side rotating body 42 to the driven-side rotating body 45.

As shown in FIG. 7A, the control portion 81 of the driven-side rotating body 45 is inserted into the support member 43 such that the rolling bodies 44 are located between the control surfaces 83 and the inner circumferential surface 41c of the clutch housing 41 to radially face the clutch housing 41 and the rolling bodies 44. That is, the support member 43 holds the rolling bodies 44 between the inner circumferential surface 41c of the clutch housing 41 and the control surfaces 83 of the driven-side rotating body 45.

The distance between each control surface 83 and the inner circumferential surface 41c of the clutch housing 41 (spacing in a direction perpendicular to the control surface 83) changes in the rotation direction of the driven-side rotating body 45. In the present embodiment, the distance between each control surface 83 and the inner circumferential surface 41c of the clutch housing 41 is the longest at the circumferential center of the control surface 83, and gradually becomes shorter from the circumferential center toward both circumferential ends of the control surface 83. The distance between the circumferential center of each control surface 83 and the inner circumferential surface 41c of the clutch housing 41 is greater than the largest outer diameter of the rolling body 44. The distance between a circumferential end of each control surface 83 and the inner circumferential surface 41c of the clutch housing 41 is less than the largest outer diameter of the rolling body 44.

The operation of the motor 10 will now be described focusing on the operation of the clutch 40.

Figure 8A:
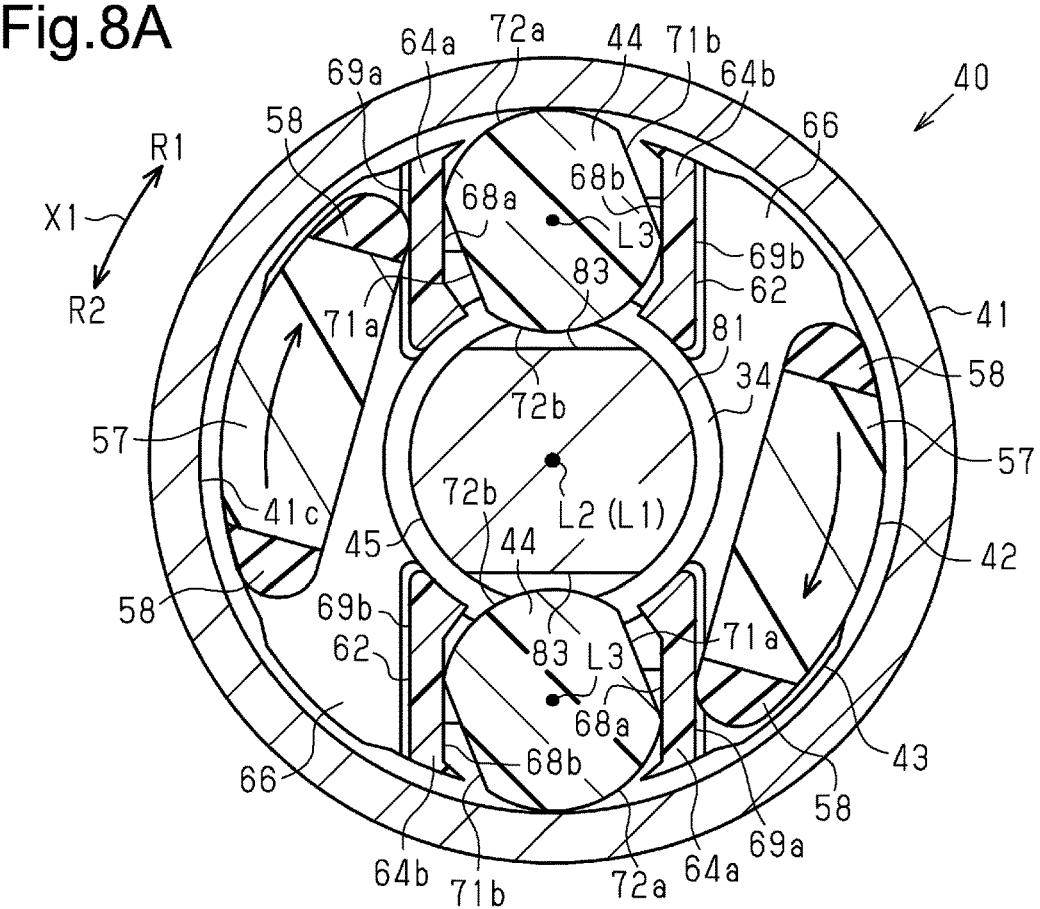
FIGS. 8A and 8B are cross-sectional views illustrating the operation of the clutch of the first embodiment.
Figure 8B:
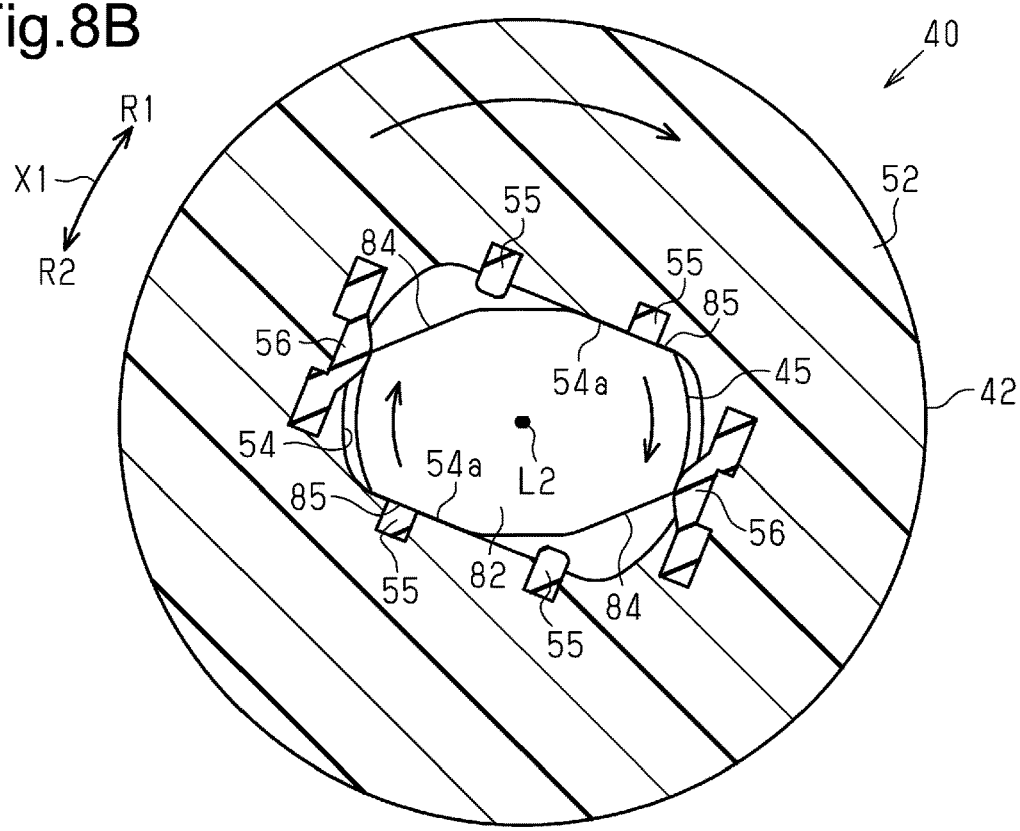

As shown in FIGS. 2 and 8A, when the motor unit 20 is driven by energizing the motor unit 20, the driving-side rotating body 42 rotates together with the rotation shaft 24. That is, the rotational drive of the driving-side rotating body 42 is started. FIGS. 8A and 8B illustrate a case where the driving-side rotating body 42 is rotationally driven in a first direction R1. As shown in FIG. 8A, as the driving-side rotating body 42 rotates in the first direction R1, the circumferential end portions (elastic portions 58) of the rolling body release portions 57 of the driving-side rotating body 42 on the front sides in the rotation direction come into contact with the first inclined surfaces 69a of the first roller supports 64a of the rolling body holding portions 62 in the rotation direction.

Figure 5:
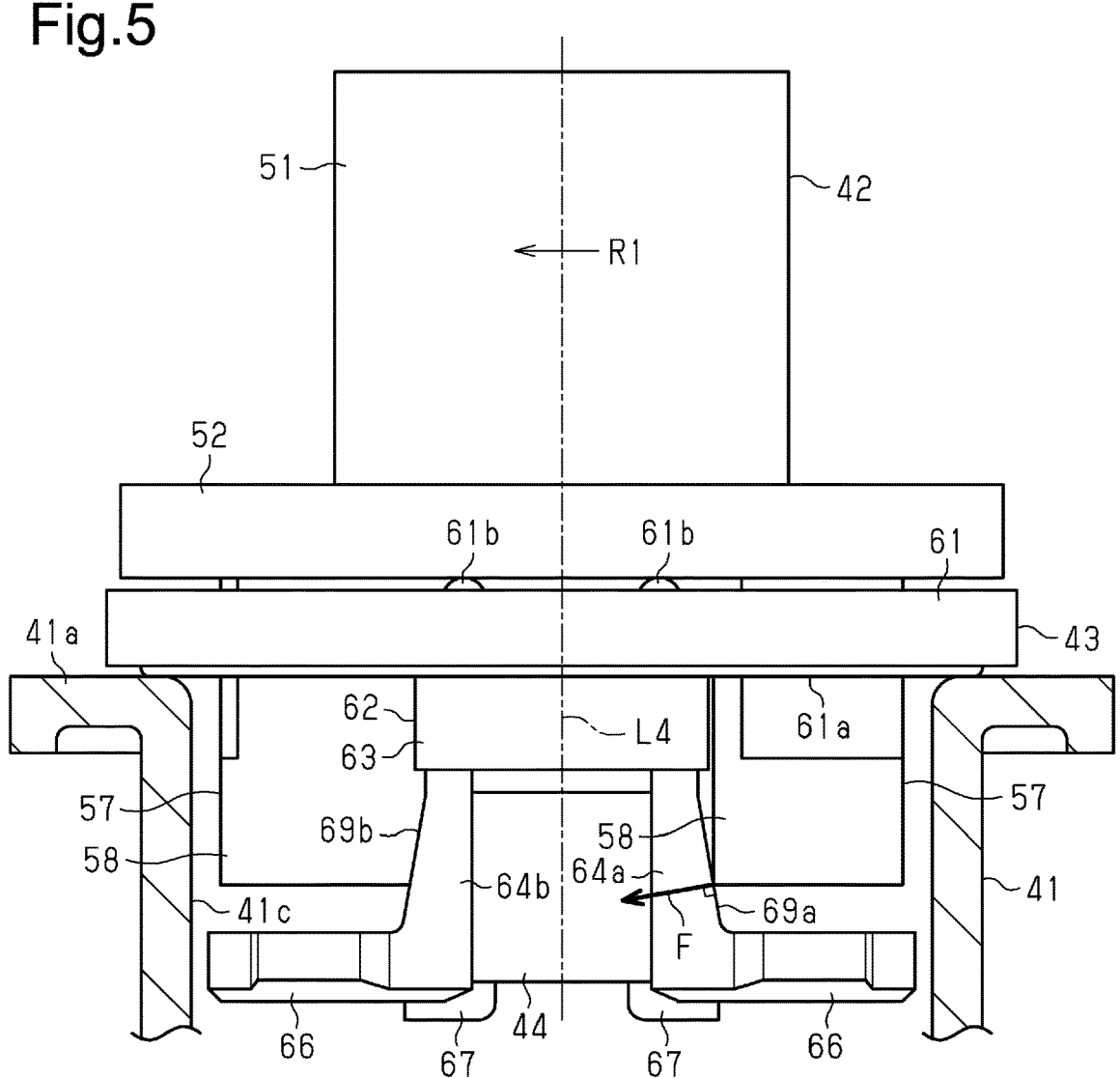
FIG. 5 is a side view of a driving-side rotating body and the support member of the first embodiment.
Figure 6:
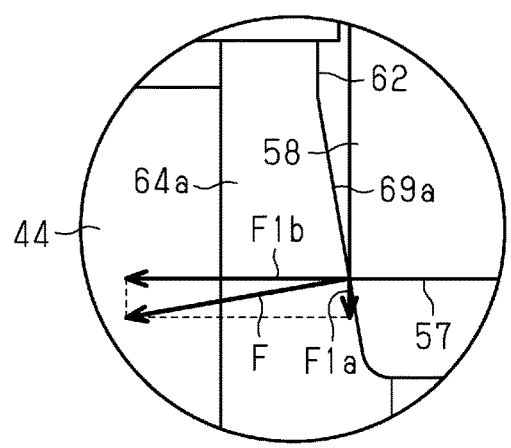
FIG. 6 is a partial enlarged view of the driving-side rotating body and the support member of the first embodiment.

Here, as shown in FIGS. 5 and 6, the circumferential ends of the rolling body release portions 57 extend in parallel to the rotation axis of the driving-side rotating body 42, whereas the first inclined surfaces 69a are inclined relative to the direction of the rotation axis L4 of the support member 43 (same as rotation axis direction of the driving-side rotating body 42). Thus, if each rolling body release portion 57 comes into contact with the first inclined surface 69a in the rotation direction of the driving-side rotating body 42 when starting rotational drive of the driving-side rotating body 42, a component force F1a (see FIG. 6) in the direction of the rotation axis L4 of the support member 43 is generated from a pressing force F produced by the driving-side rotating body 42 at the first inclined surface 69a. The component force F1a presses the support member 43 against the clutch housing 41 overlapped in the direction of the rotation axis L4. Consequently, the lower projecting portion 61a of the ring 61 is axially pressed against the flange 41a of the clutch housing 41 thereby increasing frictional force between the lower projecting portion 61a and the flange 41a. That is, the first inclined surface 69a acts to increase the frictional force between the lower projecting portion 61a and the flange 41a. The frictional force between the lower projecting portion 61a and the flange 41a limits rotation of the support member 43 about the rotation axis of the driving-side rotating body 42. Thus, when starting rotational drive of the driving-side rotating body 42, the support member 43 is prevented from being forced in the rotation direction of the driving-side rotating body 42 (first direction R1 in the example shown in FIG. 7), rotating ahead of the driving-side rotating body 42 by the impact of the rolling body release portions 57 coming into contact with the first roller supports 64a from the rotation direction of the driving-side rotating body 42. Consequently, after the rolling body release portions 57 come into contact with the first roller supports 64a from the rotation direction of the driving-side rotating body 42, the driving-side rotating body 42 and the support member 43 easily rotate integrally. Then, the circumferential component forces F1*b* of the pressing forces F press the rolling body release portions 57 contacting the first roller supports 64*a* of the rolling body holding portions 62 in the rotation direction against the rolling bodies 44 in the first direction R1 with the first roller supports 64*a* to release the rolling bodies 44 held between the inner circumferential surface 41*c* of the clutch housing 41 and the control surfaces 83 of the driven-side rotating body 45.

As shown in FIG. 8B, the driving-side rotating body 42 is connected to the driven-side rotating body 45 in an integrally rotatable manner as the driving-side transmission surfaces 54*a* abut on the second driven-side transmission surfaces 85 of the driven-side connecting portion 82 from the first direction R1.

After releasing the rolling bodies 44 held between the inner circumferential surface 41*c* of the clutch housing 41 and the driven-side rotating body 45 when the support member 43 is pressed in the rotation direction of the driving-side rotating body 42 by the driving-side rotating body 42, the driven-side rotating body 45 may act to hold the rolling bodies 44 again with the inner circumferential surface 41*c* of the clutch housing 41 (see FIG. 8A). However, the present embodiment prevents the support member 43 from rotating ahead of the driving-side rotating body 42 so that the driving-side rotating body 42 easily rotates integrally with the support member 43. Thus, integral rotation of the driving-side rotating body 42 and the support member 43 readily releases the rolling bodies 44 held between the inner circumferential surface 41*c* of the clutch housing 41 and the driven-side rotating body 45.

While the driving-side rotating body 42 and the support member 43 are integrally rotating with the rolling body release portions 57 pressing the first roller supports 64*a* and the rolling bodies 44 in the first direction R1, the rolling bodies 44 are arranged at circumferentially central portions of the control surfaces 83. That is, the rolling bodies 44 shift to an unlocked state in which the rolling bodies 44 are not held between the control surfaces 83 and the clutch housing 41 (that is, the rolling bodies 44 do not interfere with the rotation of the driven-side rotating body 45). In the unlocked state, the rotational driving force of the driving-side rotating body 42 (rotation shaft 24) is transmitted to the driven-side rotating body 45 (worm shaft 34), and the rotation shaft 24 and the worm shaft 34 integrally rotate in the first direction R1. The rotation of the worm shaft 34 in the first direction R1 is transmitted to the output shaft 38 while being decelerated by the worm shaft 34 and the worm wheel 37 and then output from the output shaft 38. Then, the vehicle window glass is raised or lowered with the window regulator (not shown) in accordance with the rotation direction of the output shaft 38. When the motor unit 20 is de-energized, the rotational drive of the rotation shaft 24, that is, the rotational drive of the driving-side rotating body 42 is stopped.

When the driving-side rotating body 42 is rotated in a second direction R2 by the drive of the motor unit 20, the clutch 40, in which the rotation direction of the members becomes opposite, connects the rotation shaft 24 and the worm shaft 34 through the same actions as described above when the driving-side rotating body 42 is rotated in the first direction R1.

Figure 9A:
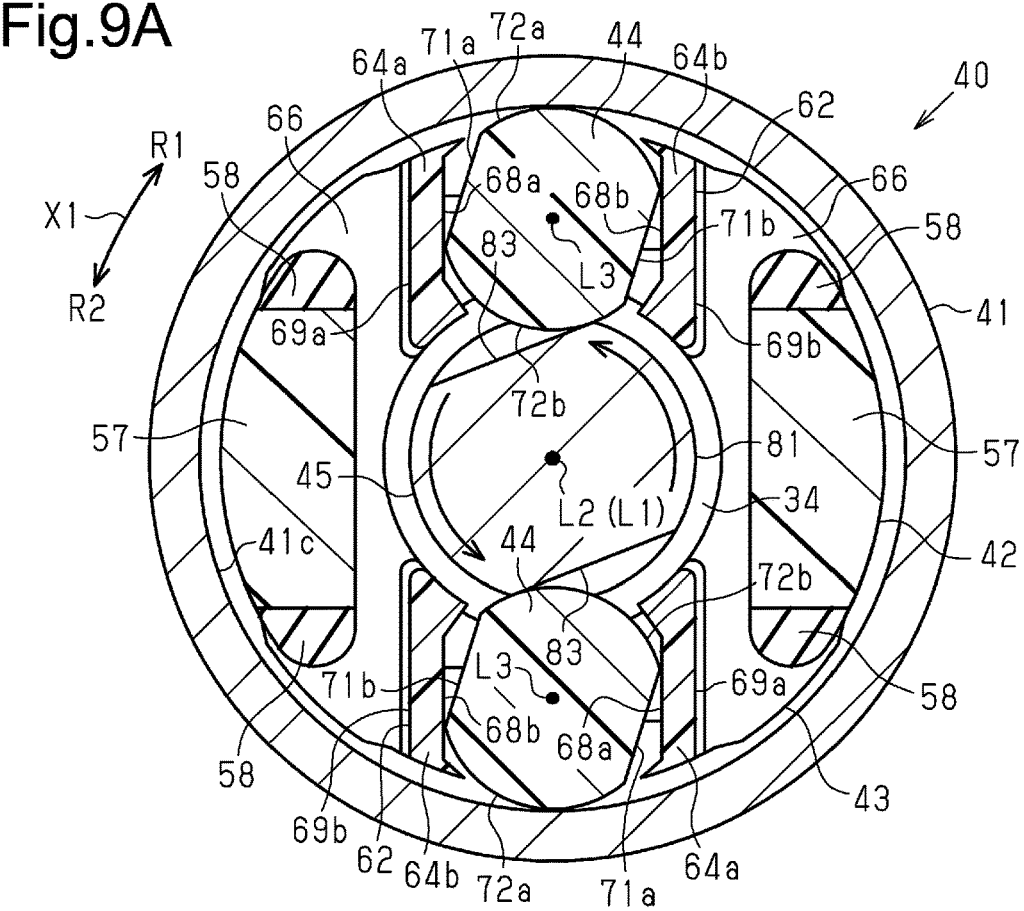
FIGS. 9A and 9B are cross-sectional views illustrating the operation of the clutch of the first embodiment.
Figure 9B:
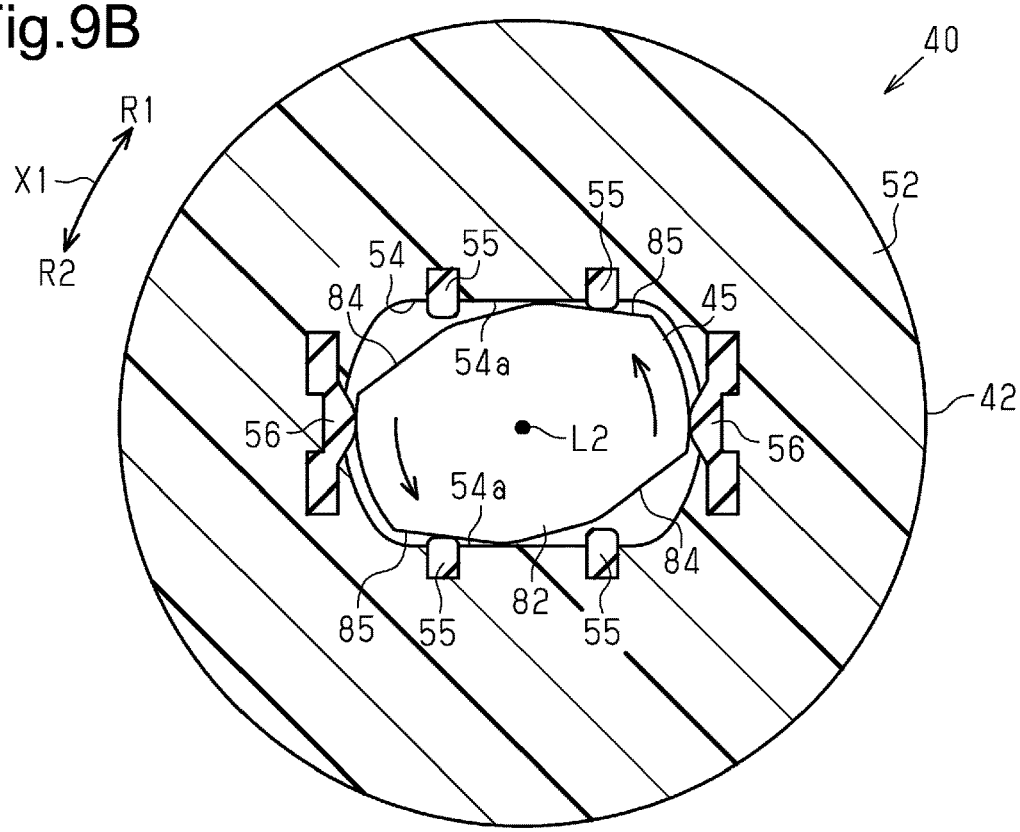

As shown in FIGS. 9A and 9B, when a load is applied from the load side (window regulator side in the present embodiment) to the output shaft 38 in a state where the drive of the motor unit 20 is stopped, that is, when the rotation shaft 24 (driving-side rotating body 42) is not rotationally driven, the load acts to rotate the driven-side rotating body 45. FIGS. 9A and 9B illustrate a case where the driven-side rotating body 45 tries to rotate in the second direction R2. Then, the control surfaces 83 of the driven-side rotating body 45 press the rolling bodies 44 arranged between the control surfaces 83 and the inner circumferential surface 41*c* of the clutch housing 41 to the outer circumferential side. In each rolling body 44 pressed by the control surface 83, the first arcuate surface 72*a* comes into contact with the inner circumferential surface 41*c* of the clutch housing 41 between the two roller supports 64*a* and 64*b*, and the second arcuate surface 72*b* comes into contact with a portion of the control surface 83 closer to a circumferential end portion than the circumferential center of the control surface 83 (rearward end portion of control surface 83 in second direction R2). Then, each rolling body 44 is held between the portion of the control surface 83 closer to the rearward end portion in the second direction R2 and the inner circumferential surface 41*c* of the clutch housing 41. Thus, the rolling bodies 44 serve as wedges to stop the rotation (rotation in the second direction R2) of the driven-side rotating body 45 (that is, to lock the rotation of the worm shaft 34). Consequently, rotation of the output shaft 38 is restricted when the rotation shaft 24 (driving-side rotating body 42) is not rotationally driven. In a state where the driven-side rotating body 45 is arranged in a locked position (position holding rolling bodies 44 with the clutch housing 41, state of FIG. 9A), as shown in FIG. 9B, the second driven-side transmission surfaces 85 of the driven-side connecting portion 82 do not contact the driving-side transmission surfaces 54*a* of the driving-side rotating body 42 in the rotation direction (second direction R2).

In a case where the driven-side rotating body 45 acts to rotate in the first direction R1 when the motor unit 20 (driving-side rotating body 42) is not driven, rotation of the driven-side rotating body 45 is restricted in the same manner. That is, each rolling body 44 is held between a portion of the control surface 83 closer to a rearward end portion in the first direction R1 and the inner circumferential surface 41*c* of the clutch housing 41. Thus, the rolling bodies 44 serve as wedges restricting rotation of the driven-side rotating body 45 (rotation in first direction R1), that is, to lock the rotation of the worm shaft 34.

The advantages of the present embodiment will now be described.

(1) When starting rotational drive of the driving-side rotating body 42, the driving-side rotating body 42 is not repeatedly separated from and abut on the support member 43 in the rotation direction of the driving-side rotating body 42. This reduces the noise generated when starting rotational drive of the driving-side rotating body 42. Since the motor 10 is provided with the clutch 40 that reduces noise generation when starting rotational drive of the driving-side rotating body 42, noise generation in the motor 10 is reduced when starting rotational drive of the rotation shaft 24.

(2) The support member 43 has the lower projecting portion 61*a* that abuts on the flange 41*a* of the clutch housing 41. The first and second inclined surfaces 69*a* and 69*b* act to increase the frictional force between the lower projecting portion 61*a* and the flange 41*a* when starting rotational drive of the driving-side rotating body 42. Thus, the frictional force between the lower projecting portion 61*a* and the flange 41*a* is increased by the first and second inclined surfaces 69*a* and 69*b* so that the frictional force limits rotation of the support member 43 about the rotation axis of the driving-side rotating body 42. Consequently, when starting rotational drive of the driving-side rotating body 42, the support member 43 is easily limited from rotating ahead of the driving-side rotating body 42 in the rotation direction of the driving-side rotating body 42 by the frictional force. As a result, noise generation when starting rotational drive of the driving-side rotating body 42 is easily reduced.

(3) The first and second inclined surfaces 69a and 69b generate pressing forces for pressing the support member 43 against the clutch housing 41 (that is, the component forces F1a) so that the lower projecting portion 61a is pressed against the flange 41a. Thus, the component forces F1a generated by the first and second inclined surfaces 69a and 69b press the lower projecting portion 61a against the flange 41a and easily increases the frictional force between the lower projecting portion 61a and the flange 41a. The frictional force limits rotation of the support member 43 about the rotation axis of the driving-side rotating body 42. Consequently, when starting rotational drive of the driving-side rotating body 42, the support member 43 is further easily limited from rotating ahead of the driving-side rotating body 42 in the rotation direction of the driving-side rotating body 42. As a result, noise generation when starting rotational drive of the driving-side rotating body 42 is further easily limited.

(4) The support member 43 has a portion overlapping the clutch housing 41 in the direction of the rotation axis L4 of the support member 43. The first and second inclined surfaces 69a and 69b of the support member 43 are inclined relative to the direction of the rotation axis L4 of the support member 43. Therefore, when the driving-side rotating body 42 comes into contact with the first inclined surfaces 69a or the second inclined surfaces 69b from the rotation direction when starting rotational drive of the driving-side rotating body 42, the component forces F1a in the direction of the rotation axis L4 are generated at the inclined surfaces from the pressing forces F produced by the driving-side rotating body 42. The component forces F1a press the support member 43 against the clutch housing 41 overlapped in the direction of the rotation axis L4 of the support member 43. Consequently, when starting rotational drive of the driving-side rotating body 42, the support member 43 is further easily limited from rotating ahead of the driving-side rotating body 42 in the rotation direction of the driving-side rotating body 42. As a result, noise generation when starting rotational drive of the driving-side rotating body 42 is further easily reduced.

Second Embodiment

A motor including a clutch in a second embodiment will now be described. In the present embodiment, same reference numerals are given to those components that are the same as the corresponding components of the first embodiment. Such components will not be described in detail.

Figure 10:
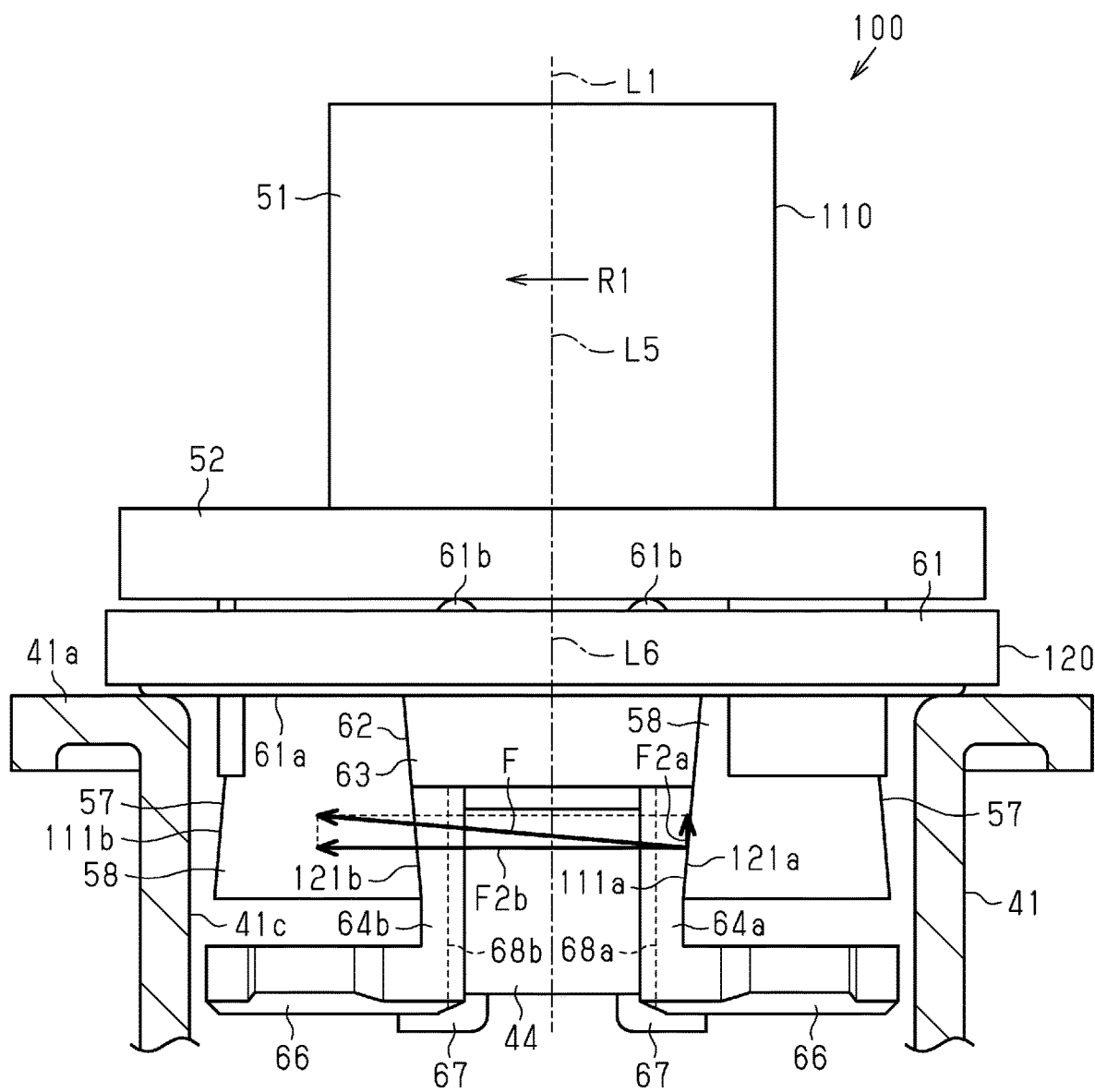
FIG. 10 is a side view of a support member holding rolling bodies and a driving-side rotating body of a second embodiment.

As shown in FIG. 10, a clutch 100 in the present embodiment is provided in the motor 10 in place of the clutch 40 of the first embodiment. The clutch 100 is configured to include a driving-side rotating body 110 in place of the driving-side rotating body 42 in the clutch 40 of the first embodiment and include a support member 120 in place of the support member 43.

The support member 120 is configured to include first and second inclined surfaces 121a and 121b as load generation portions in place of the first and second inclined surfaces 69a and 69b as load generation portions at the support member 43 of the first embodiment.

In each rolling body holding portion 62, the first inclined surface 121a provided on the first roller support 64a side is extended over a side surface of the axial support portion 63 on circumferentially one side (right side in FIG. 10) and a circumferential side surface of the first roller support 64a opposite to the rolling body 44. In each rolling body holding portion 62, the first inclined surface 121a is extended from the axially proximal end of the axial support portion 63 to a portion of the first roller support 64a on the distal end side near the connecting portion 66. The first inclined surface 121a has a planar shape inclined relative to the direction of the rotation axis L6 of the support member 120 (same as direction of rotation axis L5 of driving-side rotating body 110, same as direction of central axis L1 in present embodiment). That is, the first inclined surface 121a is formed such that it is not parallel to the direction of the rotation axis L6 and is not perpendicular to the direction of the rotation axis L6. Specifically, the first inclined surface 121a is inclined to approach the first rolling body abutting surface 68a from the axially proximal end of the axial support portion 63 toward the distal end side of the first roller support 64a. Thus, the width of the first roller support 64a in the circumferential direction (rotation direction of support member 120 around rotation axis L5 of driving-side rotating body 110) gradually decreases from its proximal end side toward its distal end side.

The second inclined surface 121b has the same shape as the first inclined surface 121a. Specifically, at each rolling body holding portion 62, the second inclined surface 121b provided on the second roller support 64b side is extended over a side surface of the axial support portion 63 on circumferentially one side (left side in FIG. 10) and a circumferential side surface of the second roller support 64b opposite to the rolling body 44. In each rolling body holding portion 62, the second inclined surface 121b is extended from the axially proximal end of the axial support portion 63 to a portion of the second roller support 64b on the distal end side near the connecting portion 66. The second inclined surface 121b has a planar shape inclined relative to the direction of the rotation axis L6 of the support member 120. Specifically, the second inclined surface 121b is inclined to be closer to the second rolling body abutting surface 68b from the axially proximal end of the axial support portion 63 toward the distal end side of the second roller support 64b. Thus, the width of the second roller support 64b in the circumferential direction gradually decreases from its proximal end side to its distal end side, and the width of the rolling body holding portion 62 in the circumferential direction gradually decreases from the axially proximal end toward the distal end side.

The driving-side rotating body 110 is configured to include first and second driving-side inclined surfaces 111a and 111b at each rolling body release portion 57 in the driving-side rotating body 42 of the first embodiment.

The first driving-side inclined surface 111a is formed on a side surface of the rolling body release portion 57 that faces the first inclined surface 121a provided on one of the two rolling body holding portions 62 in the rotation direction of the driving-side rotating body 110. The first driving-side inclined surface 111a is extended from the proximal end to the distal end of the rolling body release portion 57. The first driving-side inclined surface 111a is inclined relative to the direction of the rotation axis L5 of the driving-side rotating body 110. That is, the first driving-side inclined surface 111a is formed such that it is not parallel with the direction of the rotation axis L5 and is not perpendicular to the direction of the rotation axis L5. Specifically, a straight line passing through the circumferential center of the rolling body release portion 57 and extending in the direction of the rotation axis L5 is the center line of the rolling body release portion 57, and the first driving-side inclined surface 111a is inclined to be circumferentially farther from the center line of the rolling body release portion 57 from the proximal end toward the distal end of the rolling body release portion 57. Thus, one circumferential end portion of the rolling body release portion 57 is shaped to gradually project in the circumferential direction (rotation direction of driving-side rotating body 110) from the proximal end toward the distal end of the rolling body release portion 57. The first driving-side inclined surface 111a can come into surface contact with the opposing first inclined surface 121a in the rotation direction of the driving-side rotating body 110 from the rotation direction of the driving-side rotating body 110.

The second driving-side inclined surface 111b has the same shape as the first driving-side inclined surface 111a. Specifically, the second driving-side inclined surface 111b is provided on a side surface of the rolling body release portion 57 that faces the second inclined surface 121b provided on one rolling body holding portion 62 of the two rolling body holding portions 62 in the rotation direction of the driving-side rotating body 110. The second driving-side inclined surface 111b is extended from the proximal end to the distal end of the rolling body release portion 57. The second driving-side inclined surface 111b is inclined relative to the direction of the rotation axis L5 of the driving-side rotating body 110. Specifically, the second driving-side inclined surface 111b is inclined to be circumferentially farther from the center line of the rolling body release portion 57 from the proximal end toward the distal end of the rolling body release portion 57. Thus, the other circumferential end portion of the rolling body release portion 57 is shaped to gradually project in the circumferential direction (rotation direction of driving-side rotating body 110) from the proximal end toward the distal end of the rolling body release portion 57, and the rolling body release portion 57 is shaped to gradually increase the circumferential width from its proximal end toward its distal end. The second driving-side inclined surface 111b can come into surface contact with the second inclined surface 121b it faces in the rotation direction of the driving-side rotating body 110 from the rotation direction of the driving-side rotating body 110.

The operation of the present embodiment will now be described.

When the rotational drive of the rotation shaft 24 is started by the drive of the motor unit 20, the rotational drive of the driving-side rotating body 110 that rotates integrally with the rotation shaft 24 is started. As the driving-side rotating body 110 rotates, the circumferential end portions of the rolling body release portions 57 of the driving-side rotating body 110 on the front sides in the rotation direction come into contact with the rolling body holding portions 62 in the rotation direction (see FIG. 8A). That is, depending on the rotation direction of the driving-side rotating body 110, the first driving-side inclined surfaces 111a come into surface contact with the first inclined surfaces 121a. Alternatively, the second driving-side inclined surfaces 111b come into surface contact with the second inclined surfaces 121b.

FIG. 10 illustrates a case where the driving-side rotating body 110 rotates in the first direction R1, and the first driving-side inclined surface 111a comes into surface contact with the first inclined surface 121a from the rotation direction of the driving-side rotating body 110. The first inclined surface 121a and the first driving-side inclined surface 111a are both inclined in the same direction relative to the direction of the rotation axis L5 of the driving-side rotating body 110 (same as direction of rotation axis L6 of support member 120). Thus, as each first driving-side inclined surface 111a comes into contact with the first inclined surface 121a from the rotation direction of the driving-side rotating body 110 when starting rotational drive of the driving-side rotating body 110, a component force F2a in the direction of the rotation axis L6 of the support member 120 is generated from a pressing force F produced by the driving-side rotating body 110 at the first inclined surface 121a. The component forces F2a press the support member 120 against the driving-side rotating body 110 overlapped in the direction of the rotation axis L6 of the support member 120. Consequently, the upper projecting portions 61b of the ring 61 are axially pressed against the collar 52 to increase the frictional force between the upper projecting portions 61b and the collar 52. That is, the first inclined surfaces 121a act to increase the frictional force between the upper projecting portions 61b and the collar 52. The frictional force between the upper projecting portions 61b and the collar 52 limits rotation of the support member 120 about the rotation axis of the driving-side rotating body 110. Thus, when starting rotational drive of the driving-side rotating body 110, the support member 120 is not forced in the rotation direction of the driving-side rotating body 110 and rotated ahead of the driving-side rotating body 110 by the impact of the rolling body release portions 57 coming into contact with the rolling body holding portions 62 from the rotation direction of the driving-side rotating body 110. Consequently, after the rolling body release portions 57 come into contact with the rolling body holding portions 62 from the rotation direction of the driving-side rotating body 110, the driving-side rotating body 110 easily rotates integrally with the support member 120. Then, circumferential component forces F2b of the pressing forces F press the rolling body release portions 57 contacting the rolling body holding portions 62 in the rotation direction against the rolling bodies 44 in the rotation direction of the driving-side rotating body 110 with the rolling body holding portions 62 thereby releasing the rolling bodies 44 held between the inner circumferential surface 41c of the clutch housing 41 and the control surfaces 83 of the driven-side rotating body 45.

After releasing the rolling bodies 44 held between the inner circumferential surface 41c of the clutch housing 41 and the driven-side rotating body 45 by pressing the support member 120 in the rotation direction of the driving-side rotating body 110 with the driving-side rotating body 110, the driven-side rotating body 45 may act to hold the rolling bodies 44 again with the inner circumferential surface 41c of the clutch housing 41. However, the present embodiment prevents the support member 120 from rotating ahead of the driving-side rotating body 110 thereby facilitating the integral rotation of the driving-side rotating body 110 and the support member 120. Consequently, integral rotation of the driving-side rotating body 110 and the support member 120 immediately releases the rolling bodies 44 held between the inner circumferential surface 41c of the clutch housing 41 and the driven-side rotating body 45.

The same effect is obtained when the second driving-side inclined surfaces 111b come into surface contact with the second inclined surfaces 121b from the rotation direction of the driving-side rotating body 110 when starting rotational drive of the driving-side rotating body 110.

In addition to advantage (1) of the first embodiment, the present embodiment has the following advantages.

(1) The support member 120 includes the upper projecting portions 61b that abut on the collar 52 of the driving-side rotating body 110. The first and second inclined surfaces 121a and 121b act to increase the frictional force between the upper projecting portions 61b and the collar 52 when starting rotational drive of the driving-side rotating body 110. Thus, the frictional force between the upper projecting portions 61b and the collar 52 is increased by the first and second inclined surfaces 121a and 121b so that the frictional force limits rotation of the support member 120 about the rotation axis of the driving-side rotating body 110. Consequently, when starting rotational drive of the driving-side rotating body 110, the support member 120 can be easily restricted from rotating ahead of the driving-side rotating body 110 in the rotation direction of the driving-side rotating body 110 by the frictional force. As a result, noise generation when starting rotational drive of the driving-side rotating body 110 is easily reduced.

(2) The first and second inclined surfaces 121a and 121b generate pressing forces (that is, the component forces F2a) for pressing the support member 120 against the driving-side rotating body 110 so that the upper projecting portions 61b are pressed against the collar 52. Thus, the component forces F2a generated by the first and second inclined surfaces 121a and 121b press the upper projecting portions 61b against the collar 52 and easily increases the frictional force between the upper projecting portions 61b and the collar 52. The frictional force limits rotation of the support member 120 about the rotation axis L5 of the driving-side rotating body 110. Consequently, when starting rotational drive of the driving-side rotating body 110, the support member 120 is further easily prevented from rotating ahead of the driving-side rotating body 110 in the rotation direction of the driving-side rotating body 110. As a result, noise generation when starting rotational drive of the driving-side rotating body 110 is further easily reduced.

(3) The support member 120 has a portion overlapping the driving-side rotating body 110 in the direction of the rotation axis L6 of the support member 120. The first and second inclined surfaces 121a and 121b of the support member 120 are inclined relative to the direction of the rotation axis L6 of the support member 120. Therefore, when the driving-side rotating body 110 comes into contact with the first inclined surfaces 121a or the second inclined surfaces 121b from the rotation direction when starting rotational drive of the driving-side rotating body 110, the component forces F2a in the direction of the rotation axis L6 of the support member 120 are generated at the inclined surfaces from the pressing forces F produced by the driving-side rotating body 110. The component forces F2a presses the support member 120 is pressed against the driving-side rotating body 110 it overlaps in the direction of the rotation axis L6 of the support member 120. Consequently, when starting rotational drive of the driving-side rotating body 110, the support member 120 is further easily restricted from rotating ahead of the driving-side rotating body 110 in the rotation direction of the driving-side rotating body 110. As a result, noise generation when starting rotational drive of the driving-side rotating body 110 is further easily reduced.

(4) The driving-side rotating body 110 include the first and second driving-side inclined surfaces 111a and 111b that are inclined relative to the direction of the rotation axis L5 of the driving-side rotating body 110. When starting rotational drive of the driving-side rotating body 110, the first and second driving-side inclined surfaces 111a and 111b come into surface contact with the first and second inclined surfaces 121a and 121b from the rotation direction of the driving-side rotating body 110. Thus, when the first and second driving-side inclined surfaces 111a and 111b come into contact with the first and second inclined surfaces 121a and 121b, component forces in the direction of the rotation axis L6 of the support member 120 can be stably and easily generated from pressing forces produced by the driving-side rotating body 110. The component forces press the support member 120 against the driving-side rotating body 110 overlapping in the direction of the rotation axis L6 of the support member 120. Consequently, when starting rotational drive of the driving-side rotating body 110, the support member 120 is further effectively restricted from rotating ahead of the driving-side rotating body 110 in the rotation direction of the driving-side rotating body 110. As a result, noise generation when starting rotational drive of the driving-side rotating body 110 is effectively reduced.

Third Embodiment

A motor including a clutch in a third embodiment will now be described. In the present embodiment, same reference numerals are given to those components that are the same as the corresponding components of the first embodiment. Such components will not be described in detail.

Figure 11:
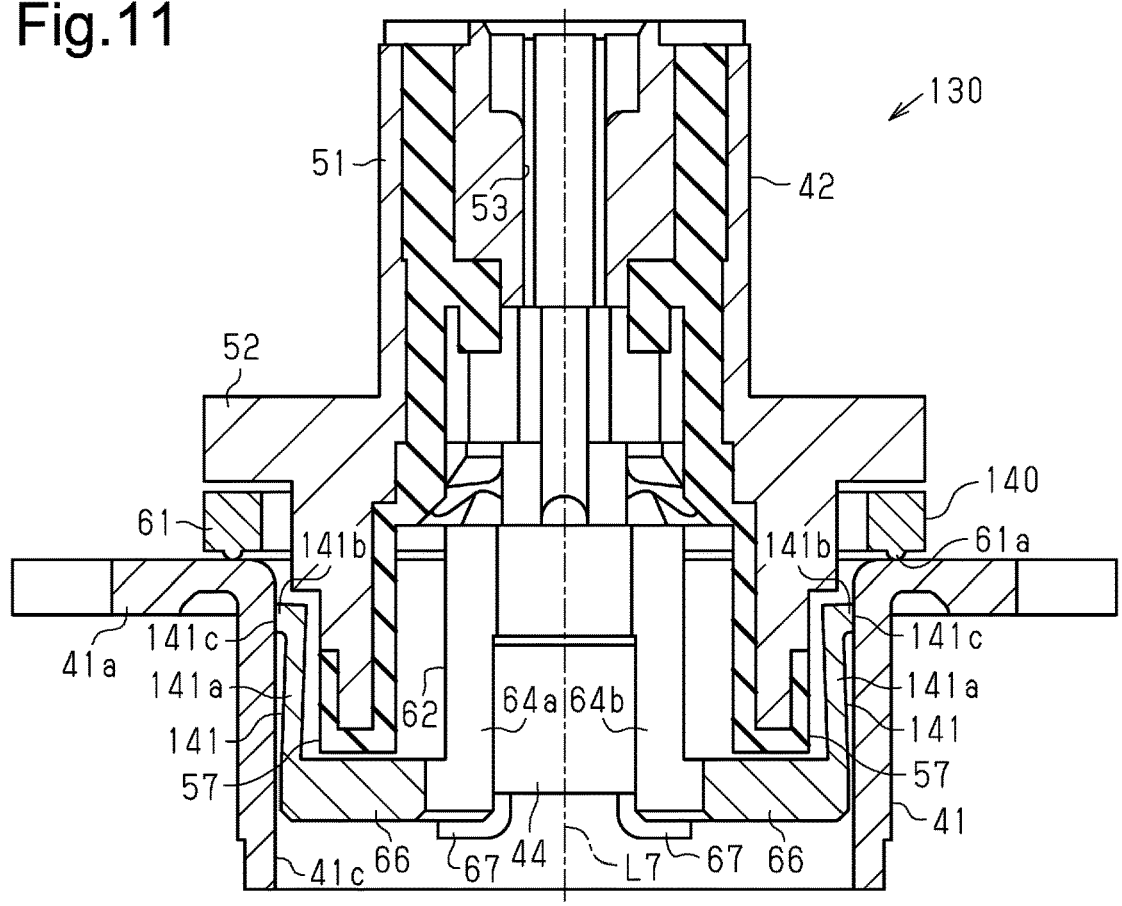
FIG. 11 is a cross-sectional view of a clutch except a driven-side rotating body of a third embodiment.

As shown in FIG. 11, a clutch 130 of the present embodiment is provided in the motor 10 in place of the clutch 40 of the first embodiment. The clutch 130 is configured to include a support member 140 in place of the support member 43 in the clutch 40 of the first embodiment. The support member 140 is configured to include urging portions 141 as load generation portions at the support member 43 of the first embodiment. The support member 140 is not provided with the first and second inclined surfaces 69a and 69b of the first embodiment, and the first and second roller supports 64a and 64b have a constant width in the circumferential direction (rotation direction of driving-side rotating body 42) along the rotation axis direction of the driving-side rotating body 42.

Figure 12:
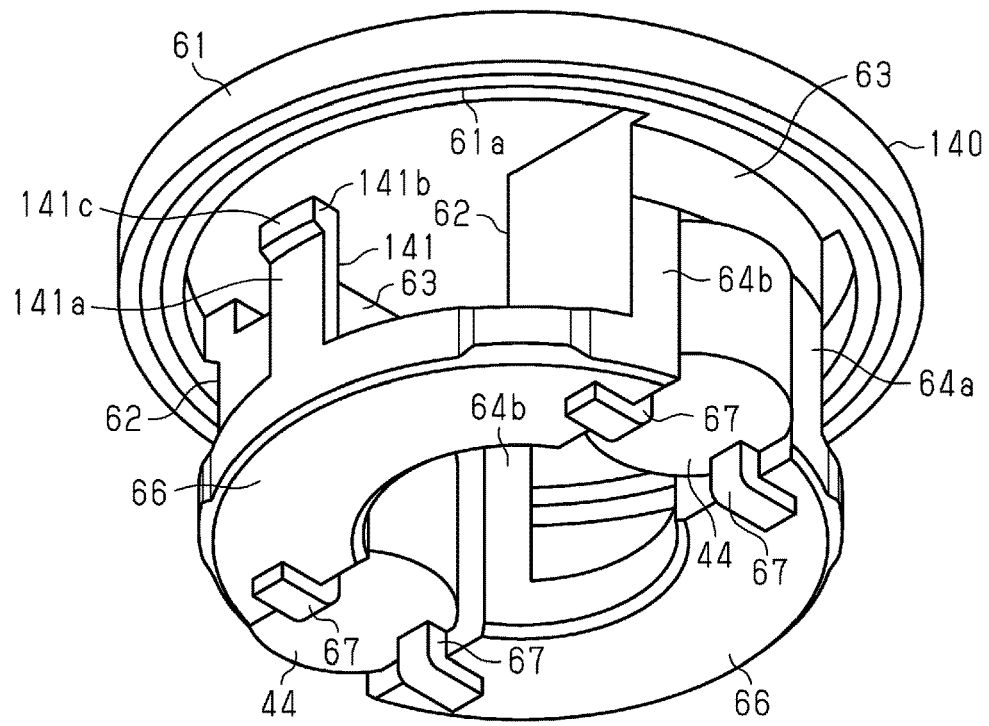
FIG. 12 is a perspective view of a support member holding rolling bodies in the clutch of the third embodiment.

As shown in FIGS. 11 and 12, the urging portions 141 are integrally provided at central portions of the connecting portions 66 in the circumferential direction (rotation direction of the support member 140). At each connecting portion 66, the urging portion 141 has an extending portion 141a, extending from the connecting portion 66 toward the ring 61 in the direction of the rotation axis L7 of the support member 140, and a pressing portion 141b, serving as a first abutting portion projecting from a distal end portion of the extending portion 141a to the outer circumferential side.

The extending portion 141a is elastically deformable so that the position of its distal end portion is changed in the radial direction relative to its proximal end portion. In a state before the support member 140 is inserted into the clutch housing 41 (that is, state shown in FIG. 12), the radially outer side surface of the extending portion 141a is flush with the outer circumferential surface of the connecting portion 66.

The pressing portion 141b projects radially outward from the outer circumferential surface of the connecting portion 66. A sliding contact surface 141c, which is a distal end surface of the pressing portion 141b (side surface facing radially outward), has an arc shape bulging toward the outer circumferential side as viewed from the direction of the rotation axis L7 of the support member 140. The sliding contact surface 141c is curved with the same curvature as the curvature of the inner circumferential surface 41c of the clutch housing 41, for example. In the state before the support member 140 is inserted into the clutch housing 41, the sliding contact surface 141c is located on the radially outside of the outer circumferential surface of the connecting portion 66. In this state, the diameter of a circle (not shown) in which the sliding contact surfaces 141c of the two urging portions 141 are inscribed as viewed from the direction of the rotation axis L7 is larger than the inner diameter of the clutch housing 41.

As shown in FIG. 11, the support member 140 is inserted into the clutch housing 41 with the extending portions 141a of the urging portions 141 elastically deformed radially inward. The sliding contact surfaces 141c of the urging portions 141 are pressed against the inner circumferential surface 41c of the clutch housing 41 by the elastic forces of the extending portions 141a. That is, the support member 140 includes the urging portions 141 (extending portions 141a) that generate pressing forces to press the pressing portions 141b against the inner circumferential surface 41c of the clutch housing 41 so that the sliding contact surfaces 141c abutting on the inner circumferential surface 41c of the clutch housing 41 are pressed against the inner circumferential surface 41c. The sliding contact surfaces 141c press-contact the inner circumferential surface 41c of the clutch housing 41 slidably in the rotation direction of the support member 140 so that frictional force (load), which limits rotation of the support member 140 about the rotation axis of the driving-side rotating body 42, is generated between the inner circumferential surface 41c and the sliding contact surfaces 141c. That is, the extending portions 141a of the urging portions 141 act to increase the frictional force between the inner circumferential surface 41c of the clutch housing 41 and the pressing portions 141b.

The operation of the present embodiment will now be described.

When the rotational drive of the rotation shaft 24 is started by the drive of the motor unit 20, the rotational drive of the driving-side rotating body 42 that rotates integrally with the rotation shaft 24 is started. As the driving-side rotating body 42 rotates, the circumferential end portions of the rolling body release portions 57 of the driving-side rotating body 42 on the front sides in the rotation direction come into contact with the rolling body holding portions 62 in the rotation direction (see FIG. 8A).

At this time, the frictional force between the inner circumferential surface 41c of the clutch housing 41 and the sliding contact surfaces 141c limit rotation of the support member 140 about the rotation axis of the driving-side rotating body 42. Thus, when starting rotational drive of the driving-side rotating body 42, the support member 140 is restricted from being forced in the rotation direction of the driving-side rotating body 42, rotating ahead of the driving-side rotating body 42 by the impact of the rolling body release portions 57 coming into contact with the rolling body holding portions 62 from the rotation direction of the driving-side rotating body 42. Consequently, after the rolling body release portions 57 come into contact with the rolling body holding portions 62 from the rotation direction of the driving-side rotating body 42, the driving-side rotating body 42 and the support member 140 easily rotate integrally. Then, the rolling body release portions 57 contacting the rolling body holding portions 62 in the rotation direction press the rolling bodies 44 in the rotation direction of the driving-side rotating body 42 with the rolling body holding portions 62 and releases the holding of the rolling bodies 44 held between the inner circumferential surface 41c of the clutch housing 41 and the control surfaces 83 of the driven-side rotating body 45.

After releasing the rolling bodies 44 held between the inner circumferential surface 41c of the clutch housing 41 and the driven-side rotating body 45 by pressing the support member 140 in the rotation direction of the driving-side rotating body 42 with the driving-side rotating body 42, the driven-side rotating body 45 may act to hold the rolling bodies 44 again with the inner circumferential surface 41c of the clutch housing 41. However, the present embodiment restricts the support member 140 from rotating ahead of the driving-side rotating body 42 and facilitates integral rotation of the driving-side rotating body 42 and the support member 140. Consequently, integral rotation of the driving-side rotating body 42 and the support member 140 immediately releases the rolling bodies 44 from between the inner circumferential surface 41c of the clutch housing 41 and the driven-side rotating body 45.

In addition to advantage (1) of the first embodiment, the present embodiment has the following advantages.

(1) The support member 140 includes the pressing portions 141b that abut and slide on the inner circumferential surface 41c of the clutch housing 41. The extending portions 141a of the urging portions 141 act to increase the frictional force between the pressing portions 141b and the inner circumferential surface 41c of the clutch housing 41. Thus, the frictional force between the pressing portions 141b and the inner circumferential surface 41c of the clutch housing 41 is increased by the extending portions 141a so that the frictional force limits rotation of the support member 140 about the rotation axis of the driving-side rotating body 42. Consequently, when starting rotational drive of the driving-side rotating body 42, the support member 140 is easily restricted from being rotated ahead of the driving-side rotating body 42 in the rotation direction of the driving-side rotating body 42 by the frictional force. As a result, noise generation when starting rotational drive of the driving-side rotating body 42 is easily reduced.

(2) The support member 140 include the urging portions 141 that generate pressing forces to press the pressing portions 141b against the inner circumferential surface 41c of the clutch housing 41 so that the sliding contact surfaces 141c abutting on the inner circumferential surface 41c of the clutch housing 41 are pressed against the inner circumferential surface 41c. Thus, the pressing forces generated by the urging portions 141 press the pressing portions 141b against the inner circumferential surface 41c of the clutch housing 41 and easily increases the frictional force between the pressing portions 141b (sliding contact surfaces 141c) and the inner circumferential surface 41c of the clutch housing 41. This frictional force limits rotation of the support member 140 about the rotation axis of the driving-side rotating body 42. Consequently, when starting rotational drive of the driving-side rotating body 42, the support member 140 is further easily restricted from rotating ahead of the driving-side rotating body 42 in the rotation direction of the driving-side rotating body 42. As a result, noise generation when starting rotational drive of the driving-side rotating body 42 is further easily reduced.

Fourth Embodiment

A motor including a clutch in a fourth embodiment will now be described. In the present embodiment, same reference numerals are given to those components that are the same as the corresponding components of the first embodiment. Such components will not be described in detail.

Figure 13A:
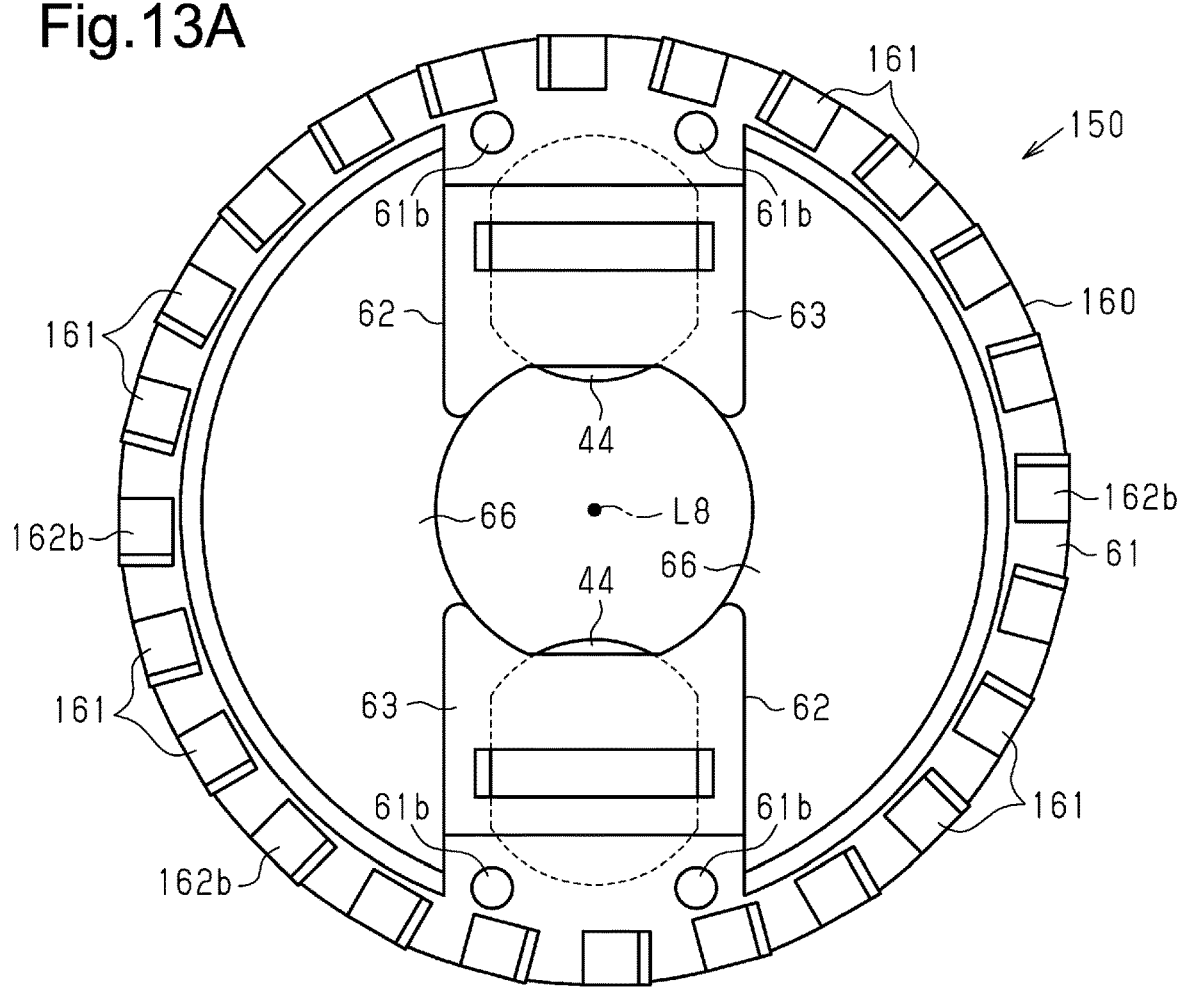
FIG. 13A is a plan view of a support member holding rolling bodies in a clutch of a fourth embodiment.
Figure 13B:
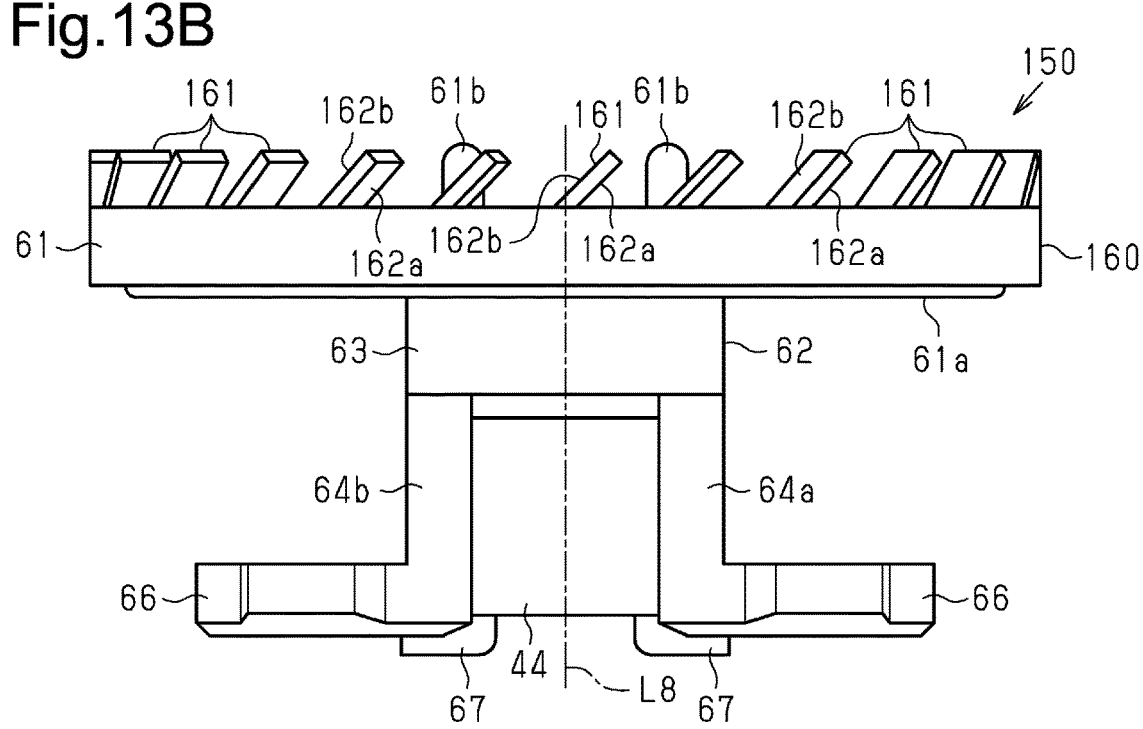
FIG. 13B is a side view of the support member.

As shown in FIGS. 13A and 13B, a clutch 150 of the present embodiment is provided in the motor 10 in place of the clutch 40 of the first embodiment. The clutch 150 is configured to include a support member 160 in place of the support member 43 in the clutch 40 of the first embodiment. The support member 160 is not provided with the first and second inclined surfaces 69a and 69b of the first embodiment, and the first and second roller supports 64a and 64b have a constant width in the circumferential direction (rotation direction of the driving-side rotating body 42) along the rotation axis direction of the driving-side rotating body 42.

The support member 160 is configured to be provided with a plurality of resistance projections 161 as load generation portions at the ring 61 of the support member 43 of the first embodiment. The plurality of resistance projections 161 axially project from one axial end face of the ring 61 which is an end face axially facing the collar 52. In the present embodiment, twenty-four resistance projections 161 are provided at equal angular intervals in the circumferential direction (at 15° intervals) on one axial end face of the ring 61. In FIG. 13B, to simplify illustration, only the resistance projections 161 provided on the lower half of the ring 61 in FIG. 13A are shown, and the resistance projections 161 provided on the upper half are not shown. The resistance projections 161, which have a substantially flat plate shape, axially project from one axial end face of the ring 61 and are inclined relative to the direction of the rotation axis L8 of the support member 160 when the ring 61 is viewed from the radially outer side. In the present embodiment, when the ring 61 is viewed from the side of the driving-side rotating body 42 (in state shown in FIG. 13A), the resistance projections 161 are inclined such that their distal ends are located on the counterclockwise side of their proximal ends. The height of the resistance projections 161 in the direction of the rotation axis L8 is lower than the height of the upper projecting portions 61b in the direction of the rotation axis L8. Thus, in a state where the support member 160 and the driving-side rotating body 42 are coupled, the upper projecting portions 61b contact the collar 52 from the axial direction, and the resistance projections 161 do not contact the collar 52.

Each resistance projection 161 includes first and second resistance inclined surfaces 162a and 162b on both ends in the rotation direction of the support member 160. At each resistance projection 161, the first resistance inclined surface 162a, which is a side surface on one side in the rotation direction of the support member 160 (side surface on counterclockwise side when viewing ring 61 from side of driving-side rotating body 42, side surface on right side in FIG. 13B), is inclined relative to the direction of the rotation axis L8 of the support member 160. In the present embodiment, at each resistance projection 161, the first resistance inclined surface 162a is inclined relative to the direction of the rotation axis L8, forming an acute angle θ1 with one axial end face of the ring 61. At each resistance projection 161, the second resistance inclined surface 162b, which is a side surface on the other side in the rotation direction of the support member 160 (side surface on clockwise side when viewing ring 61 from side of driving-side rotating body 42, a side surface on the left side in FIG. 13B), is inclined relative to the direction of the rotation axis L8 of the support member 160. In the present embodiment, at each resistance projection 161, the second resistance inclined surface 162b is inclined relative to the direction of the rotation axis L8, forming an obtuse angle θ2 with one axial end face of the ring 61.

The operation of the present embodiment will now be described.

When the rotational drive of the rotation shaft 24 is started by the drive of the motor unit 20, the rotational drive of the driving-side rotating body 42 that rotates integrally with the rotation shaft 24 is started. As the driving-side rotating body 42 rotates, the circumferential end portions of the rolling body release portions 57 of the driving-side rotating body 42 on the front sides in the rotation direction come into contact with the rolling body holding portions 62 in the rotation direction (see FIG. 8A).

Figure 14A:
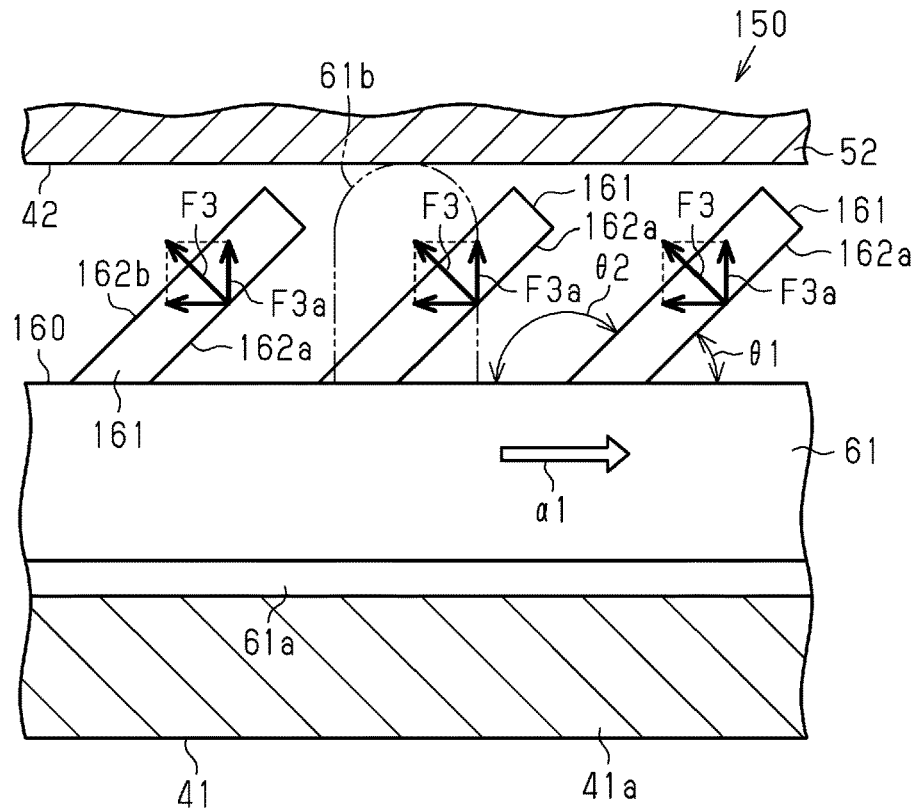
FIGS. 14A and 14B are schematic views showing part of the clutch of the fourth embodiment.

FIG. 14A illustrates a case where the driving-side rotating body 42 rotates in a counterclockwise direction (direction of arrow α1 in FIG. 14A) as viewed from the side of the motor unit 20. The support member 160 is increased in air resistance by the plurality of resistance projections 161, and thus the air resistance is increased as compared with the support member without the resistance projections 161. This limits rotation of the support member 160 about the rotation axis of the driving-side rotating body 42. Further, the resistance projections 161 axially projecting from the ring 61 have the first resistance inclined surfaces 162a inclined relative to the direction of the rotation axis L8 of the support member 160. Thus, when the support member 160 rotates about the rotation axis of the driving-side rotating body 42, component forces F3a in the direction of the rotation axis L8 of the support member 160 are generated from pressing forces F3 produced by the air resistance acting on the first resistance inclined surfaces 162a in accordance with the inclination direction of the first resistance inclined surfaces 162a. In the present embodiment, the component forces F3a are directed toward the driving-side rotating body 42. The component forces F3a press the support member 160 against the driving-side rotating body 42 overlapped in the direction of the rotation axis L8 of the support member 160 so that the upper projecting portions 61b are pressed against the collar 52. As a result, the frictional force between the upper projecting portions 61b and the collar 52 is increased. That is, the resistance projections 161 including the first resistance inclined surfaces 162a act to increase the frictional force between the upper projecting portions 61b and the collar 52. Consequently, the frictional force between the upper projecting portions 61b and the collar 52 further limits rotation of the support member 160 about the rotation axis of the driving-side rotating body 42. Therefore, when starting rotational drive of the driving-side rotating body 42, the support member 160 is restricted from being forced in the rotation direction of the driving-side rotating body 42 and rotated ahead of the driving-side rotating body 42 by the impact of the rolling body release portions 57 coming into contact with the rolling body holding portions 62 from the rotation direction of the driving-side rotating body 42. Consequently, after the rolling body release portions 57 come into contact with the rolling body holding portions 62 from the rotation direction of the driving-side rotating body 42, the driving-side rotating body 42 and the support member 160 easily rotate integrally. Then, the rolling body release portions 57 contacting the rolling body holding portions 62 in the rotation direction press the rolling bodies 44 in the rotation direction of the driving-side rotating body 42 with the rolling body holding portions 62. This releases the rolling bodies 44 held between the inner circumferential surface of the clutch housing 41 and the control surfaces 83 of the driven-side rotating body 45 (see FIG. 8A).

After releasing the rolling bodies 44 held between the inner circumferential surface 41c of the clutch housing 41 and the driven-side rotating body 45 by pressing the support member 160 in the rotation direction of the driving-side rotating body 42 with the driving-side rotating body 42, the driven-side rotating body 45 may act to hold the rolling bodies 44 again with the inner circumferential surface 41c of the clutch housing 41. However, the present embodiment restricts the support member 160 from rotating ahead of the driving-side rotating body 42 thereby facilitating integral rotation of the driving-side rotating body 42 and the support member 160. Thus, integral rotation of the driving-side rotating body 42 and the support member 160 immediately releases the rolling bodies 44 held between the inner circumferential surface 41c of the clutch housing 41 and the driven-side rotating body 45.

Figure 14B:
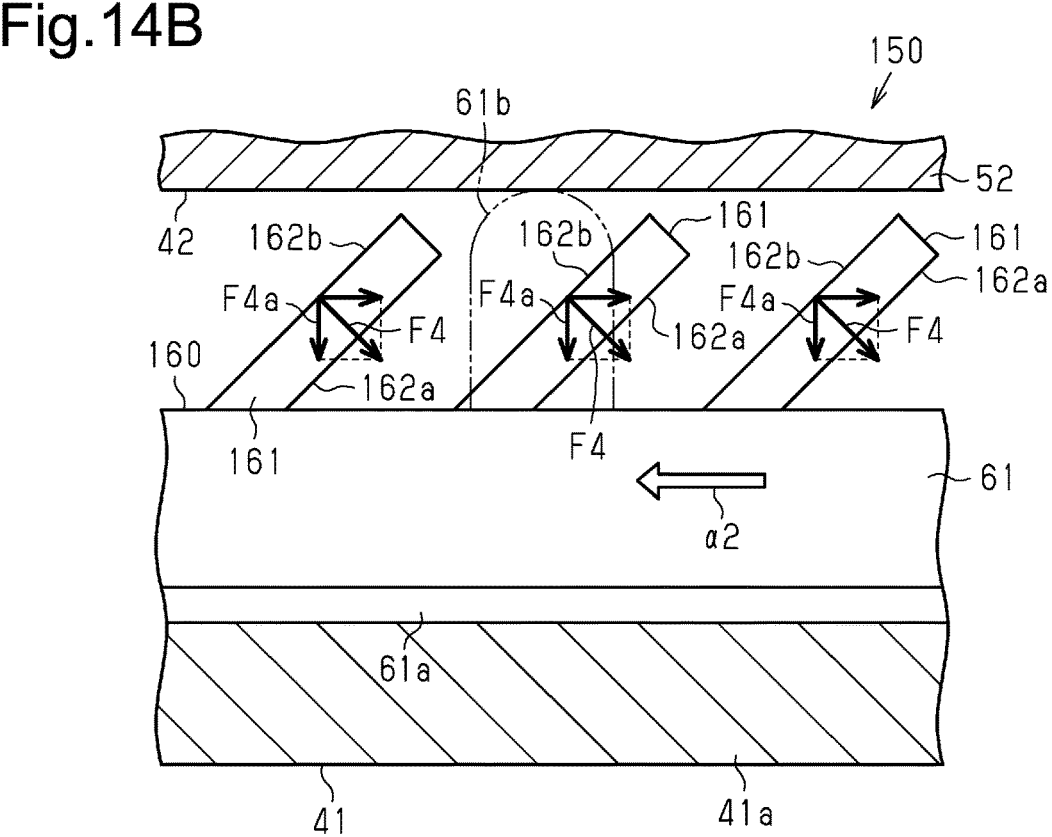

Further, as shown in FIG. 14B, when the driving-side rotating body 42 is rotated by the drive of the motor unit 20 in the clockwise direction (direction of arrow α2 in FIG. 14B) when viewed from the side of the motor unit 20, the same effects can be obtained. That is, the support member 160 is increased in air resistance by the plurality of resistance projections 161, and thus the air resistance is increased as compared with the support member without the resistance projections 161. This limits rotation of the support member 160 about the rotation axis of the driving-side rotating body 42. Further, the resistance projections 161 axially projecting from the ring 61 have the second resistance inclined surfaces 162b inclined relative to the direction of the rotation axis L8 of the support member 160. Thus, when the support member 160 rotates about the rotation axis of the driving-side rotating body 42, component forces F4a in the direction of the rotation axis L8 of the support member 160 are generated from pressing forces F4 produced by the air resistance acting on the second resistance inclined surfaces 162b in accordance with the inclination direction of the second resistance inclined surfaces 162b. In this case, the component forces F4a are forces in a direction opposite to the driving-side rotating body 42. The component forces F4a press the support member 160 against the clutch housing 41 overlapping in the direction of the rotation axis L8 of the support member 160 so that the lower projecting portion 61a is pressed against the flange 41a. As a result, the frictional force between the lower projecting portion 61a and the flange 41a is increased. That is, the resistance projections 161 including the second resistance inclined surfaces 162b act to increase the frictional force between the lower projecting portion 61a and the flange 41a. Consequently, the frictional force between the lower projecting portion 61a and the flange 41a limits rotation of the support member 160 about the rotation axis of the driving-side rotating body 42. Therefore, when the driving-side rotating body 42 rotates in the direction of the arrow α2, the support member 160 is restricted from being forced in the rotation direction of the driving-side rotating body 42 and rotated ahead of the driving-side rotating body 42 by the impact of the rolling body release portions 57 coming into contact with the rolling body holding portions 62 from the rotation direction of the driving-side rotating body 42 when starting rotational drive of the driving-side rotating body 42. Consequently, after the rolling body release portions 57 come into contact with the rolling body holding portions 62 from the rotation direction of the driving-side rotating body 42, the driving-side rotating body 42 and the support member 160 easily rotate integrally.

In addition to advantage (1) of the first embodiment, the present embodiment has the following advantages.

(1) The support member 160 includes the lower projecting portion 61a abutting on the flange 41a of the clutch housing 41 and the upper projecting portions 61b abutting on the collar 52 of the driving-side rotating body 42. The resistance projections 161 act to increase the frictional force between the lower projecting portion 61a and the flange 41a or the frictional force between the upper projecting portions 61b and the collar 52 when starting rotational drive of the driving-side rotating body 42. Thus, the frictional force between the lower projecting portion 61a and the flange 41a or the frictional force between the upper projecting portions 61b and the collar 52 is increased by the resistance projections 161 so that the frictional force limits rotation of the support member 160 about the rotation axis of the driving-side rotating body 42. Consequently, when starting rotational drive of the driving-side rotating body 42, the support member 160 is easily restricted from being rotated ahead of the driving-side rotating body 42 in the rotation direction of the driving-side rotating body 42 by the frictional force. As a result, noise generation when starting rotational drive of the driving-side rotating body 42 is easily reduced.

(2) The support member 160 includes the resistance projections 161 that generate pressing forces (that is, the component forces F3a or the component forces F4a) for pressing the support member 160 against the clutch housing 41 or the driving-side rotating body 42 to press the lower projecting portion 61a against the flange 41a or the upper projecting portions 61b against the collar 52. The component forces F3a generated by the resistance projections 161 press the lower projecting portion 61a against the flange 41a thereby easily increasing the frictional force between the lower projecting portion 61a and the flange 41a is easily increased. Further, the upper projecting portions 61b are pressed against the collar 52 thereby easily increasing the frictional force between the upper projecting portions 61b and the collar 52. This frictional force limits rotation of the support member 160 about the rotation axis of the driving-side rotating body 42. Consequently, when starting rotational drive of the driving-side rotating body 42, the support member 160 is further easily restricted from rotating ahead of the driving-side rotating body 42 in the rotation direction of the driving-side rotating body 42. As a result, noise generation when starting rotational drive of the driving-side rotating body 42 is further easily reduced.

(3) When the support member 160 rotates about the rotation axis of the driving-side rotating body 42, the air resistance acting on the support member 160 is increased by the resistance projections 161 thereby limiting rotation of the support member 160 about the rotation axis of the driving-side rotating body 42. Consequently, when starting rotational drive of the driving-side rotating body 42, the support member 160 is easily restricted from being rotated ahead of the driving-side rotating body 42 in the rotation direction of the driving-side rotating body 42 by the resistance projections 161. As a result, noise generation when starting rotational drive of the driving-side rotating body 42 is easily reduced.

(4) The resistance projections 161 axially projecting from one axial end face of the ring 61 include the first and second resistance inclined surfaces 162a and 162b inclined relative to the direction of the rotation axis L8 of the support member 160 (same as rotation axis direction of driving-side rotating body 42). Thus, when the support member 160 rotates about the rotation axis of the driving-side rotating body 42, component forces in the direction of the rotation axis L8 of the support member 160 are generated from the pressing forces F3 produced by the air resistance acting on the first resistance inclined surfaces 162a or the pressing forces F4 produced by the air resistance acting on the second resistance inclined surfaces 162b. The component forces press the support member 160 against the clutch housing 41 or the driving-side rotating body 42 overlapping in the direction of the rotation axis L8 of the support member 160. Consequently, when starting rotational drive of the driving-side rotating body 42, the support member 160 is further effectively restricted from being rotated ahead of the driving-side rotating body 42 in the rotation direction of the driving-side rotating body 42. As a result, noise generation when starting rotational drive of the driving-side rotating body 42 is further effectively reduced.

The above embodiments may be modified as follows.

In the fourth embodiment, the resistance projections 161 include the first and second resistance inclined surfaces 162*a* and 162*b* inclined relative to the direction of the rotation axis L8 of the support member 160. However, the resistance projections 161 do not necessarily need to have the first and second resistance inclined surfaces 162*a* and 162*b*. For example, each resistance projection 161 may be configured to have only one of the first and second resistance inclined surfaces 162*a* and 162*b*. Further, for example, each resistance projection 161 may be configured to include none of the first and second resistance inclined surfaces 162*a* and 162*b*. That is, both circumferential end faces of each resistance projection 161 may be configured to be parallel with the direction of the rotation axis L8.

In the fourth embodiment, the resistance projections 161 project in the direction of the rotation axis L8 of the support member 160 from one axial end face of the ring 61. However, the resistance projections 161 only need to be provided in positions to project from an outer surface of the support member 160 and increase air resistance when the support member 160 rotates about the rotation axis of the driving-side rotating body 42.

Figure 15A:
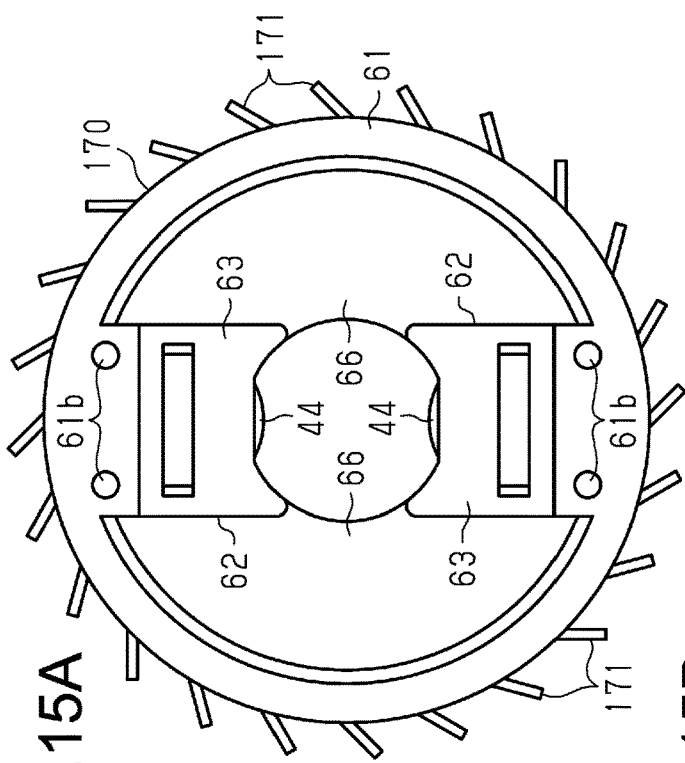
FIG. 15A is a plan view of a support member holding rolling bodies in a clutch in another form.
Figure 15B:
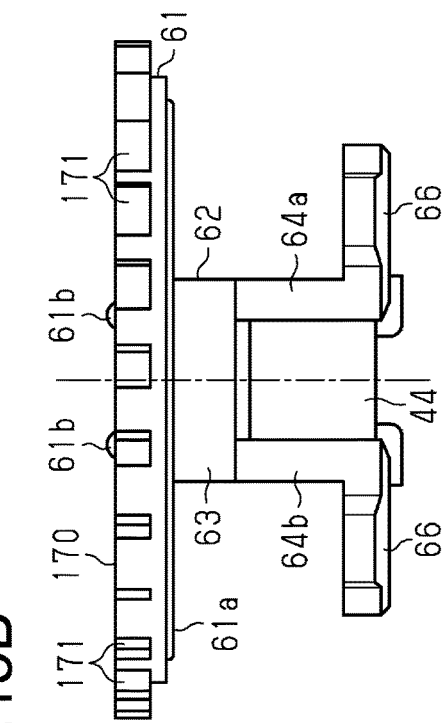
FIG. 15B is a side view of the support member.

For example, a support member 170 shown in FIGS. 15A and 15B has a plurality of resistance projections 171 serving as load generation portions projecting radially outward from the outer circumferential surface of the ring 61. The plurality of resistance projections 171 have a substantially flat plate shape in which the thickness direction is the circumferential direction of the ring 61, and are aligned in the circumferential direction of the ring 61. The resistance projections 171 are inclined such that their distal ends are shifted to one side in the circumferential direction relative to their proximal ends. That is, the resistance projections 171 are inclined relative to the radial direction (direction perpendicular to rotation axis of support member 170). This can provide the same effect as (3) of the fourth embodiment. Since the resistance projections 171 are inclined relative to the radial direction, the support member 170 can be reduced in size in the radial direction as compared with a case where the resistance projections 171 extend along the radial direction.

The resistance projections 171 may be configured to extend in the radial direction without their distal ends being shifted in the circumferential direction relative to their proximal ends. This also obtains advantage (3) of the fourth embodiment. Alternatively, the resistance projections 171 may be inclined relative to the rotation axis direction of the support member 170. This obtains the same advantages as the fourth embodiment.

Figure 16A:
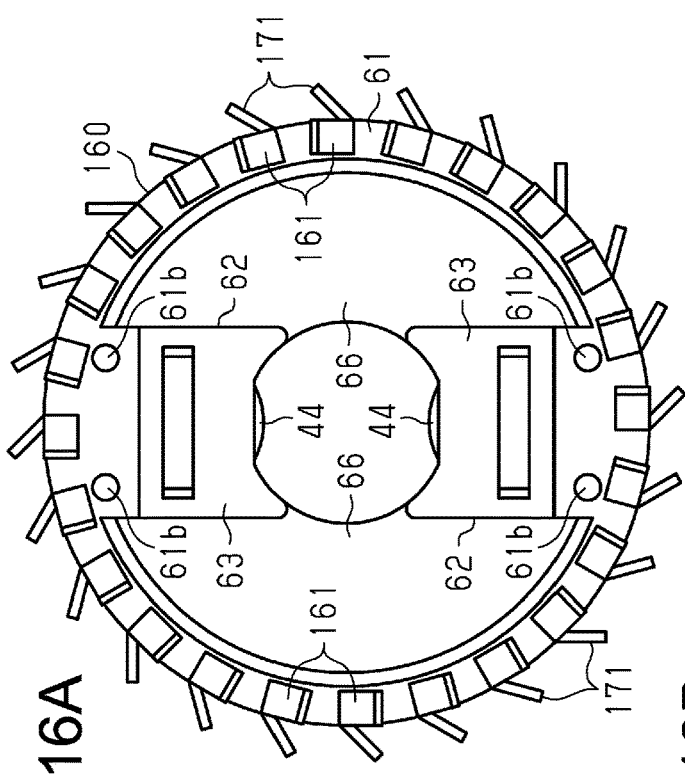
FIG. 16A is a plan view of a support member holding rolling bodies in a clutch in another form.
Figure 16B:
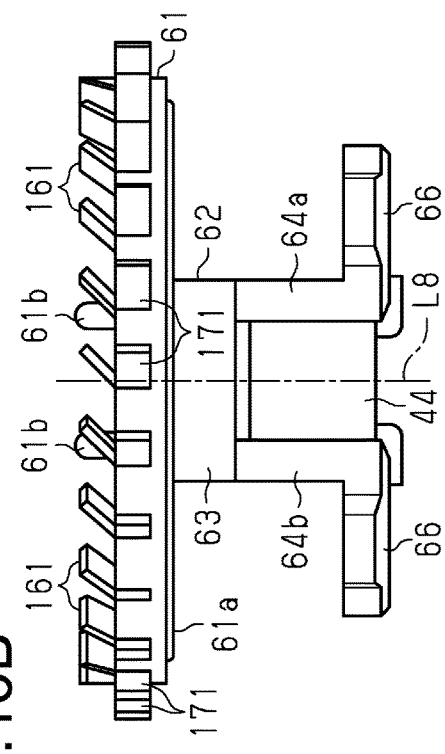
FIG. 16B is a side view of the support member.
Figure 17:
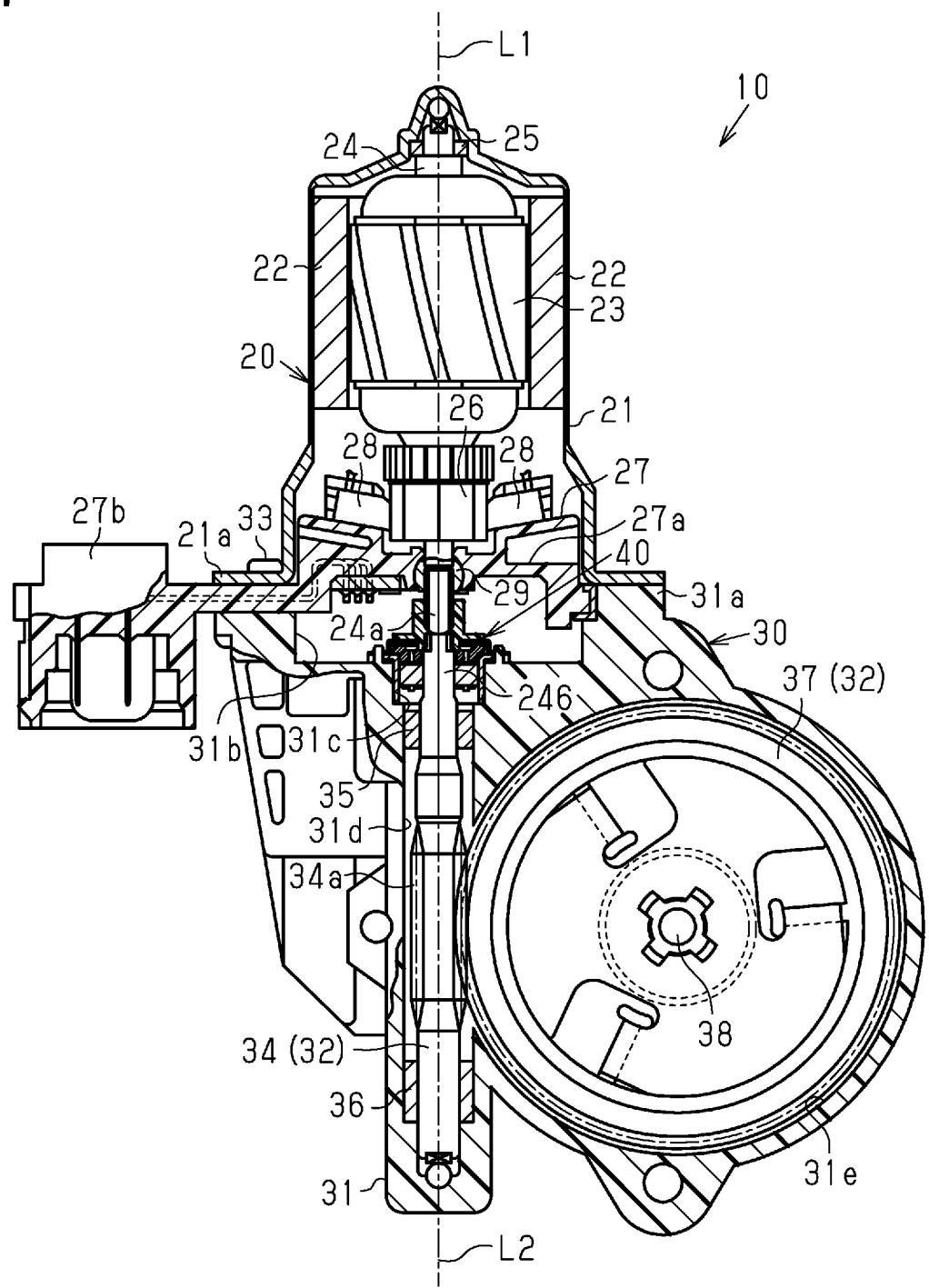
FIG. 17 is a cross-sectional view of a motor of a fifth embodiment.

As shown in FIGS. 16A and 16B, the resistance projections 171 may be further added to the support member 160 of the fourth embodiment. As a result, when the support member 160 rotates about the rotation axis of the driving-side rotating body 42, the air resistance acting on the support member 160 is increased by not only the resistance projections 161 but also the resistance projections 171. This further limits rotation of the support member 160 about the rotation axis of the driving-side rotating body 42. Consequently, when starting rotational drive of the driving-side rotating body 42, the support member 160 is further restricted from being rotated ahead of the driving-side rotating body 42 in the rotation direction of the driving-side rotating body 42. As a result, noise generation when starting rotational drive of the driving-side rotating body 42 is further reduced.

In the third embodiment, the support member 140 includes the two urging portions 141. However, the number of the urging portions 141 of the support member 140 is not limited to two and may be two or greater. Preferably, the positions and the pressing forces of the urging portions 141 are adjusted so that the rotation axis L7 of the support member 140 is not separated from the rotation axis of the driven-side rotating body 45 (same as central axis L2 of worm shaft 34) by the pressing forces of the urging portions 141.

The shape of the urging portions 141 of the support member 140 of the third embodiment is not limited to that of the third embodiment. The urging portions 141 only need to abut on the inner circumferential surface 41*c* of the clutch housing 41 to press the inner circumferential surface 41*c* radially outward. For example, the urging portions 141 may be elastic members provided to project radially outward from the outer circumferential surfaces of the axial support portions 63. The elastic members are made of an elastomer, for example. The urging portions 141 formed by the elastic members are arranged between the axial support portions 63 and the inner circumferential surface 41*c* of the clutch housing 41 in an elastically deformed state to be radially squeezed. This presses the inner circumferential surface 41*c* radially outward with the elastic force. Such a structure will obtain the same advantages as the third embodiment.

In the second embodiment, the first driving-side inclined surfaces 111*a* and the first inclined surfaces 121*a* or the second driving-side inclined surfaces 111*b* and the second inclined surfaces 121*b* may come into surface contact or line contact with each other.

In the second embodiment, when the first and second driving-side inclined surfaces 111*a* and 111*b* and the first and second inclined surfaces 121*a* and 121*b* come into contact with each other in the rotation direction of the driving-side rotating body 110, they generate pressing forces (component forces F2*a*) for pressing the support member 120 against the driving-side rotating body 110 so that the upper projecting portions 61*b* are pressed against the collar 52. However, the first and second driving-side inclined surfaces 111*a* and 111*b* and the first and second inclined surfaces 121*a* and 121*b* may be configured such that when they come into contact with each other in the rotation direction of the driving-side rotating body 110, they generate pressing forces for pressing the support member 120 against the clutch housing 41 so that the lower projecting portion 61*a* is pressed against the flange 41*a*. That is, to generate component forces opposite in direction to the component forces F2*a* of the second embodiment, the directions of the inclinations of the first and second driving-side inclined surfaces 111*a* and 111*b* relative to the direction of the rotation axis L5, and the directions of the inclinations of the first and second inclined surfaces 121*a* and 121*b* relative to the direction of the rotation axis L6 may be opposite to those of the second embodiment. Consequently, the generated pressing forces (component forces) press the lower projecting portion 61*a* against the flange 41*a* and easily increase the frictional force between the lower projecting portion 61*a* and the flange 41*a*. The frictional force limits rotation of the support member 120 about the rotation axis L5 of the driving-side rotating body 110. Consequently, this can also easily prevent the support member 120 from rotating ahead of the driving-side rotating body 110 in the rotation direction of the driving-side rotating body 110 when starting rotational drive of the driving-side rotating body 110. As a result, noise generation when starting rotational drive of the driving-side rotating body 110 is further easily reduced.

In the first embodiment, when the rolling body release portions 57 come into contact with the first and second inclined surfaces 69a and 69b from the rotation direction of the driving-side rotating body 42, they generate pressing forces (component forces F1a) to press the support member 43 against the clutch housing 41 so that the lower projecting portion 61a is pressed against the flange 41a. However, the first and second inclined surfaces 69a and 69b may be configured such that when the rolling body release portions 57 come into contact with them from the rotation direction of the driving-side rotating body 42, they generate pressing forces to press the support member 43 against the driving-side rotating body 42 so that the upper projecting portions 61b are pressed against the collar 52. That is, the directions of the inclinations of the first and second inclined surfaces 69a and 69b relative to the direction of the rotation axis L4 may be opposite to those of the first embodiment so that when the rolling body release portions 57 come into contact with the first and second inclined surfaces 69a and 69b from the rotation direction of the driving-side rotating body 42, component forces opposite to the component forces F1a of the first embodiment are generated. Consequently, the upper projecting portions 61b are pressed against the collar 52 by the generated pressing forces (component forces) thereby easily increasing the frictional force between the upper projecting portions 61b and the collar 52. The frictional force limits rotation of the support member 43 about the rotation axis of the driving-side rotating body 42. This further easily restricts the support member 43 from being rotated ahead of the driving-side rotating body 42 in the rotation direction of the driving-side rotating body 42 when starting rotational drive of the driving-side rotating body 42. As a result, noise generation when starting rotational drive of the driving-side rotating body 42 is further easily restricted.

In the above embodiments, the lower projecting portion 61a forms a rib extending in the circumferential direction of the ring 61. However, the lower projecting portion 61a is not limited in shape and may have any shape allowing it to project from the ring 61 in the axial direction and contact the flange 41a from the axial direction. For example, the lower projecting portion 61a may include a plurality of projections that project from the ring 61 in the axial direction and are provided in a non-continuous manner in the circumferential direction.

In the above embodiments, the upper projecting portions 61b are substantially semispherical projections projecting from the ring 61 in the axial direction. However, the upper projecting portions 61b is not limited in shape and may have any shape allowing it to project from the ring 61 in the axial direction and contact the collar 52 from the axial direction. For example, the upper projecting portions 61b may form an annular rib extending in the circumferential direction of the ring 61.

In the first embodiment, the support member 43 includes the lower projecting portion 61a that contacts the flange 41a of the clutch housing 41 from the axial direction. However, the support member 43 does not necessarily have to directly contact the flange 41a. For example, a member such as a washer may be located between the ring 61 and the flange 41a. The same applies to the support members 120, 140, and 160 in the second to fourth embodiments.

In the first embodiment, the support member 43 includes the upper projecting portions 61b that contact the collar 52 of the driving-side rotating body 42 from the axial direction. However, the support member 43 does not necessarily have to directly contact the collar 52. For example, a member such as a washer may be located between the ring 61 and the collar 52. The same applies to the support members 120, 140, and 160 in the second to fourth embodiments.

In the first embodiment, the shapes of the clutch housing 41, the driving-side rotating body 42, the support member 43, the rolling bodies 44, and the driven-side rotating body 45 forming the clutch 40 do not necessarily need to be the shapes of the first embodiment. For example, the driving-side rotating body 42 may be formed integrally with the rotation shaft 24. Further, for example, the driven-side rotating body 45 may be provided separately from the worm shaft 34, and fitted to the worm shaft 34 in an integrally rotatable manner. The number of the rolling bodies 44 is not limited to two. At least one rolling body 44 may be arranged between the inner circumferential surface 41c of the clutch housing 41 and the driven-side rotating body 45. The same applies to the clutches 100, 130, and 150 in the second to fourth embodiments.

Two or more embodiments of the first to fourth embodiments may be combined for implementation.

In the above embodiments, the motor 10 is used as the drive source of the power window device but may be used as a drive source of another device.

In the above embodiments, the clutches 40, 100, 130, and 150 are provided in the motor 10 to connect the rotation shaft 24 and the worm shaft 34 of the speed reduction mechanism 32. However, the clutches 40, 100, 130, and 150 may be provided in a device other than the motor 10 to connect a rotation shaft to be rotationally driven and a driven shaft to which the rotational driving force of the rotation shaft is transmitted.

Fifth Embodiment

A motor including a clutch of a fifth embodiment will now be described. In the present embodiment, same reference numerals are given to those components that are the same as the corresponding components of the first embodiment. Such components will not be described in detail. Even when different reference numerals components are given to those components that are the same as the corresponding components of the first embodiment, as long as the components are similar, the components will not be described.

The clutch 40 that connects the rotation shaft 24 of the motor unit 20 and the worm shaft 34 of the output unit 30 is accommodated in the clutch housing recess 31c.

Figure 18:
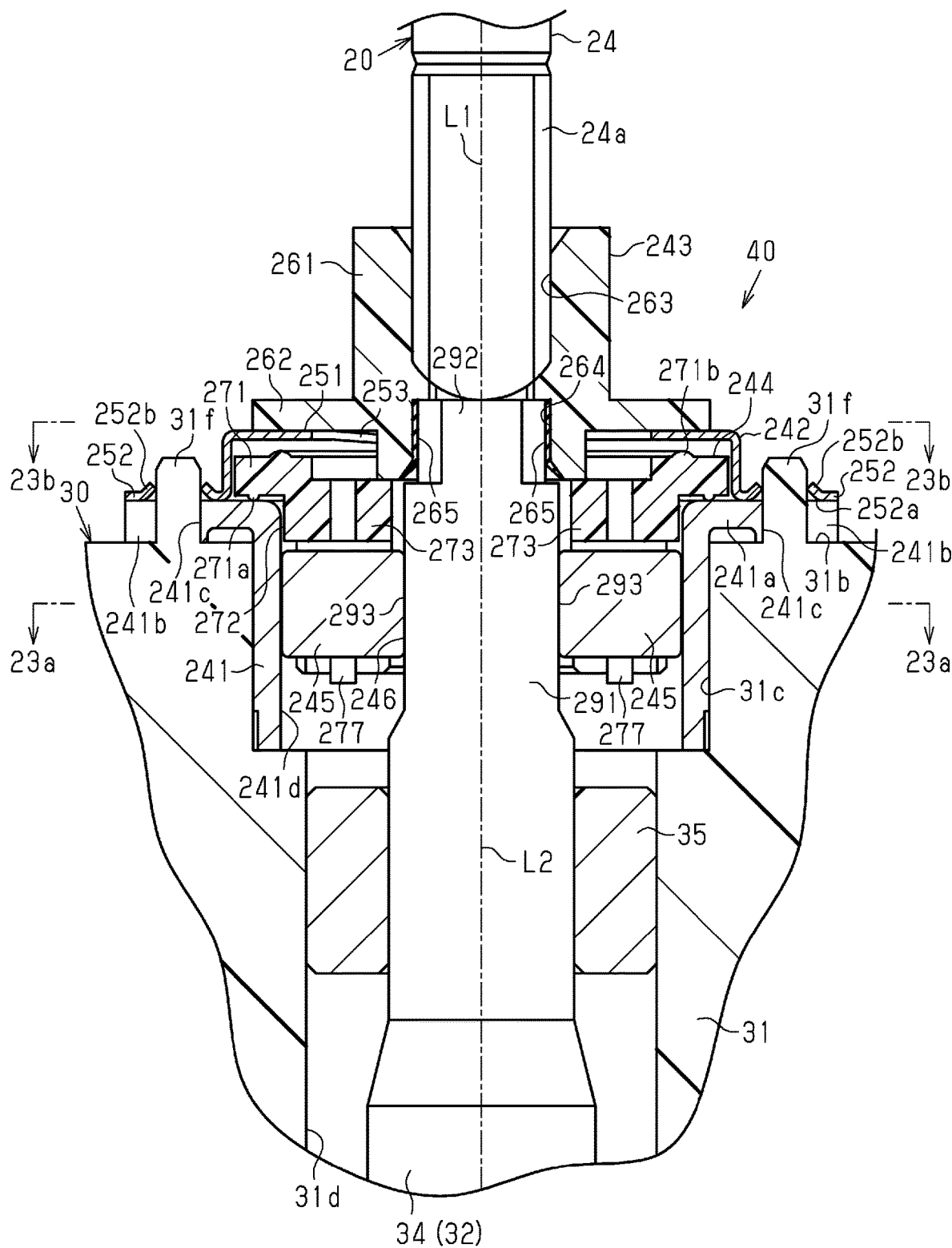
FIG. 18 is a partial enlarged cross-sectional view of the motor of the fifth embodiment.
Figure 19:
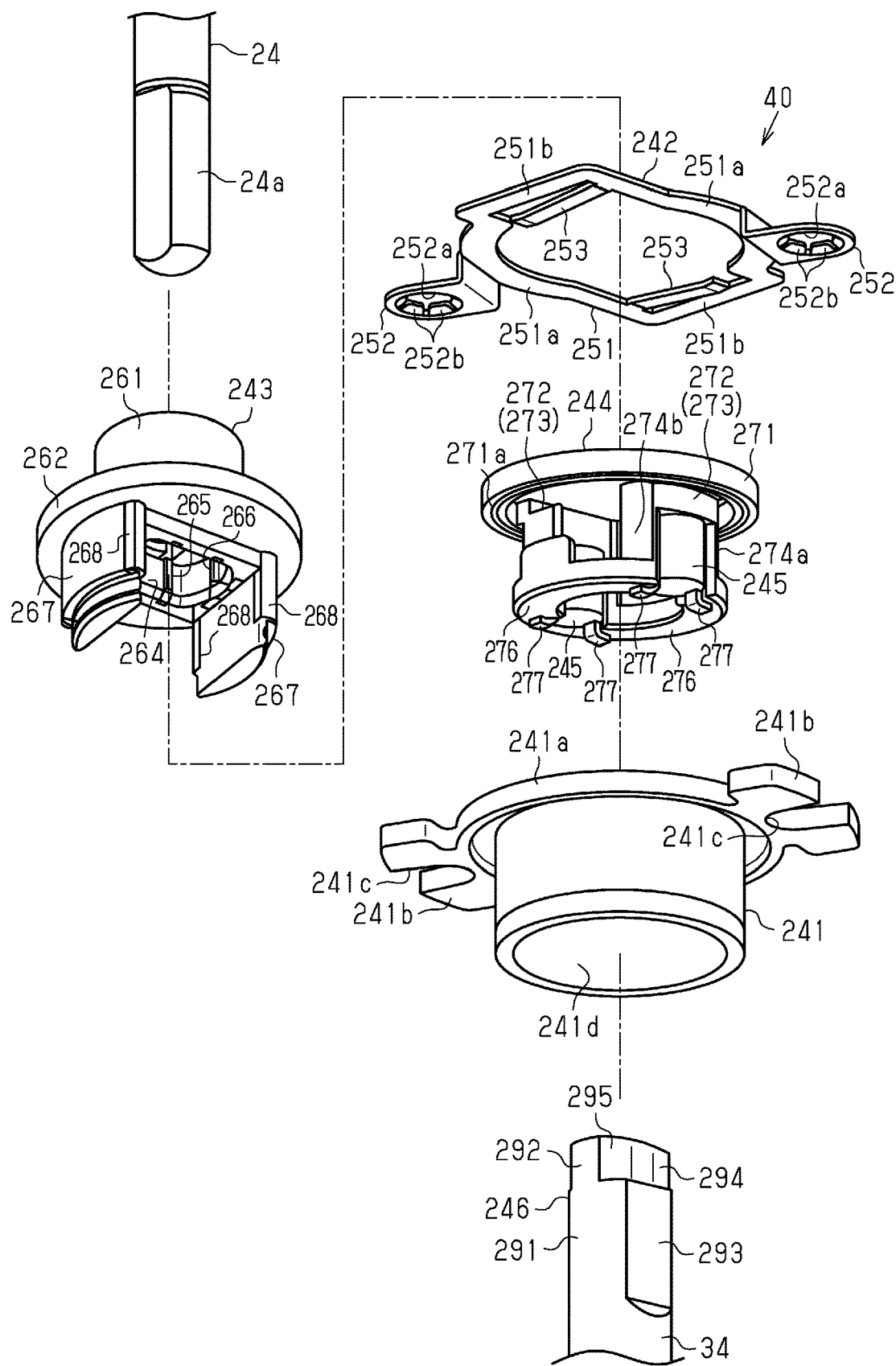
FIG. 19 is an exploded perspective view of a clutch of the fifth embodiment.

As shown in FIGS. 18 and 19, the clutch 40 includes a clutch housing 241, a fixing member 242, a driving-side rotating body 243, a support member 244, rolling bodies 245, and a driven-side rotating body 246.

The clutch housing 241 has a cylindrical shape. A collar-shaped flange 241a extending radially outward is formed at one axial end portion of the clutch housing 241. The outer diameter of a cylindrical portion of the clutch housing 241 is substantially equal to the inner diameter of the clutch housing recess 31c, and the outer diameter of the flange 241a is larger than the inner diameter of the clutch housing recess 31c. Fixing extended portions 241b projecting radially outward are provided at two locations in the flange 241a at equal angular intervals in the circumferential direction. In each fixing extended portion 241b, a fixing recess 241c axially extends through the fixing extended portion 241b and is open radially outward.

Figure 20:
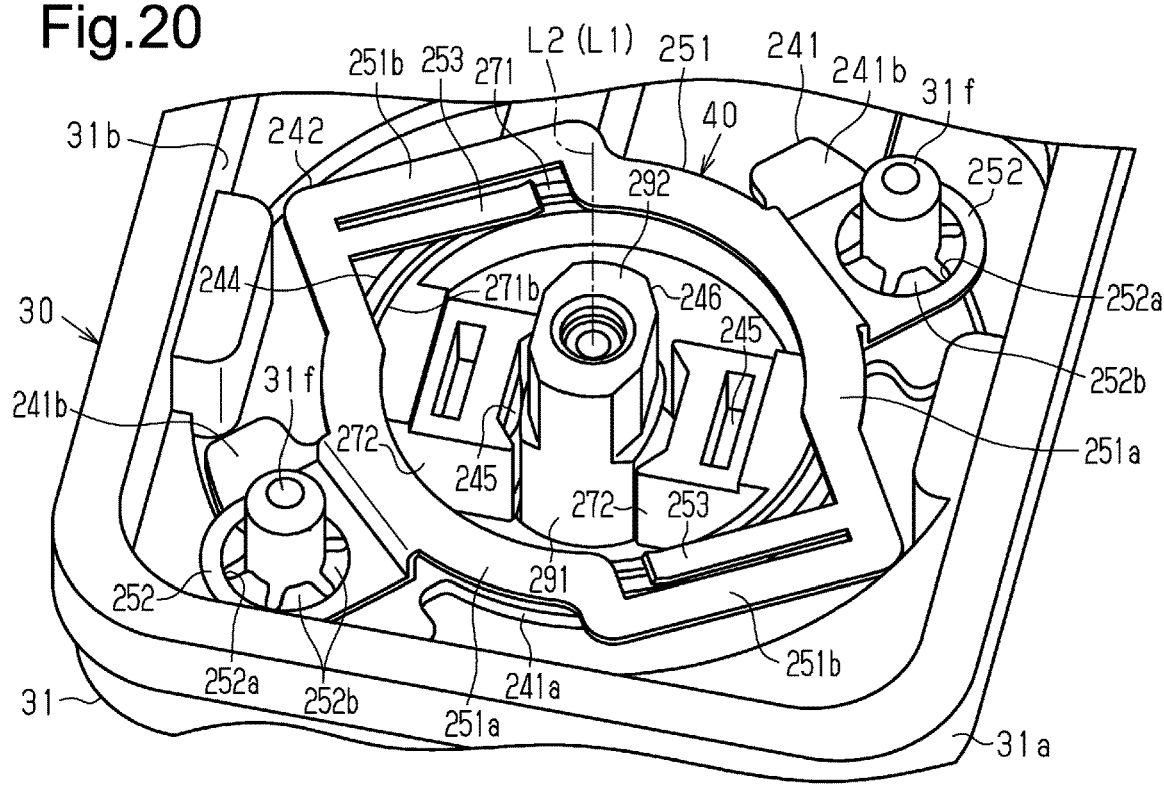
FIG. 20 is a perspective view showing part of an output unit and the clutch of the fifth embodiment.

As shown in FIGS. 18 to 20, the clutch housing 241 is inserted into the clutch housing recess 31c until the flange 241a comes into contact with the bottom of the housing recess 31b and fixed to the gear housing 31 by the fixing member 242. The fixing member 242 is formed by stamping a metal plate material into a predetermined shape. The fixing member 242 has an annular plate-shaped connecting frame 251, two engaging portions 252 projecting radially outward from two locations of the connecting frame 251 at equal angular intervals in the circumferential direction, and two leaf springs 253 serving as urging members extending from the connecting frame 251.

The connecting frame 251 has arcuate portions 251a in an arc shape when viewed from the axial direction (direction of the central axis L1) at two locations at equal angular intervals in the circumferential direction. In the connecting frame 251, portions between the two arcuate portions 251a are leaf spring support portions 251b provided to project radially outward from the arcuate portions 251a.

The arcuate portions 251a are curved with the same curvature as the flange 241a. The engaging portions 252 are extended radially outward from circumferentially substantially central portions of the arcuate portions 251a. The engaging portions 252 extend from the arcuate portions 251a in one axial direction (downward in FIG. 20, toward the gear housing 31) and then extend radially outward in the direction perpendicular to the axial direction. In a portion of each engaging portion 252 near its distal end, an engaging hole 252a axially extends through the engaging portion 252. Engaging teeth 252b project radially inward from an inner circumferential edge of the engaging hole 252a. The engaging teeth 252b each have a substantially trapezoidal shape in which the width in the circumferential direction of the engaging hole 252a decreases toward the distal end.

The leaf spring support portions 251b have a substantially rectangular shape in which the shape viewed from the axial direction is open radially inward. The leaf springs 253 extend from inner circumferential edges of the leaf spring support portions 251b. At each leaf spring support portion 251b, the leaf spring 253 is extended linearly such that a proximal end portion of the leaf spring 253 is located on the outer circumferential side of the arcuate portions 251a, and a distal end portion of the leaf spring 253 is located on an extension line of the arcuate portions 251a as viewed from the axial direction. The two leaf springs 253 are parallel to each other when viewed from the axial direction but the proximal ends and the distal ends are arranged at opposite sides. The distal end portions of the two leaf springs 253 are located at equal angular intervals in the circumferential direction (that is, at 180° intervals). Each leaf spring 253 at the proximal end portion is located at the same axial position as the connecting frame 251. The leaf spring 253 becomes lower in the axial direction (downward in FIG. 20, toward the gear housing 31) as the distal end portion becomes closer.

As shown in FIGS. 18 and 20, the fixing projections 31f projecting in the axial direction are formed on the outer circumference of the opening of the clutch housing recess 31c forming the bottom of the housing recess 31b at two locations at equal angular intervals in the circumferential direction. The clutch housing 241 is inserted into the clutch housing recess 31c with the two fixing projections 31f inserted into the two fixing recesses 241c. The fixing member 242 is axially placed on the clutch housing 241 with the fixing projections 31f inserted into the engaging holes 252a. The fixing extended portions 241b of the clutch housing 241 are held between the engaging portions 252 of the fixing member 242 and the bottom of the housing recess 31b. The engaging teeth 252b of the engaging portions 252 are caught in the outer circumferential surfaces of the fixing projections 31f to fix the fixing member 242 to the gear housing 31 and prevent separation from the gear housing 31. In this manner, the clutch housing 241 is fixed to the gear housing 31 in a non-movable manner in the axial direction and a non-rotatable manner in the circumferential direction. The clutch housing 241 fixed to the gear housing 31 is arranged coaxially with the rotation shaft 24 and the worm shaft 34.

Figure 21:
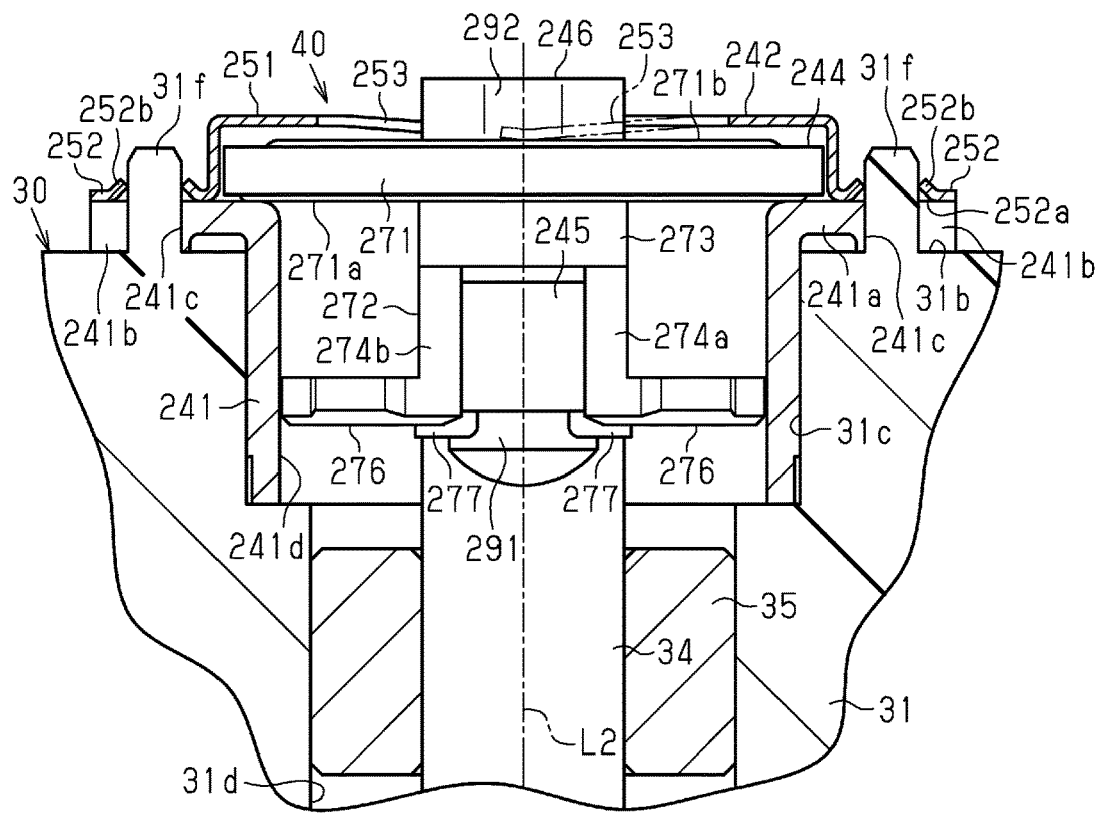
FIG. 21 is a partial cross-sectional view of the vicinity of the clutch in the motor of the fifth embodiment.

As shown in FIGS. 20 and 21, the arcuate portions 251a of the fixing member 242 fixed to the gear housing 31 are located in positions axially coinciding with the flange 241a of the clutch housing 241. Further, the leaf springs 253 of the fixing member 242 approach the flange 241a in the axial direction from the proximal ends toward the distal ends, and their distal end portions are located in positions axially coinciding with the flange 241a.

As shown in FIGS. 18 and 19, the driving-side rotating body 243 has a substantially cylindrical shaft connecting portion 261. A disc-shaped collar 262 extending radially outward is integrally formed on the outer circumferential surface of the shaft connecting portion 261. One axial end face of the collar 262 (lower end face in FIG. 18) contacts the connecting frame 251 of the fixing member 242 from the axial direction.

Rolling body release portions 267 are arranged inside the clutch housing 241 through the inside of the connecting frame 251 of the fixing member 242.

A lower rib 271a, serving as an axial abutting portion that forms an annular rib in the circumferential direction of the ring 271 and contacts the flange 41a from the axial direction, is provided on a lower surface of the ring 271 (an axial end face facing the flange 41a). An upper rib 271b that projects in the axial direction and forms an annular rib in the circumferential direction of the ring 271 is provided on an upper surface of the ring 271 (end face on side of driving-side rotating body 243).

As shown in FIGS. 18 and 21, the ring 271 is arranged between the flange 241a of the clutch housing 241 and the connecting frame 251 of the fixing member 242 and overlaps the flange 241a and the connecting frame 251 in the axial direction. The distal end portions of the leaf springs 253 of the fixing member 242 are in contact with the upper rib 271b, and the ring 271 is urged axially toward the flange 241a by the leaf springs 253. That is, the leaf springs 253 urge the support member 244 axially toward the clutch housing 241 (direction perpendicular to the rotation direction of the support member 244) so that the lower rib 271a is pressed against the flange 241a. In other words, the leaf springs 253 urge the support member 244 to increase the frictional force acting on the support member 244 with the flange 241a. When the clutch 40 is assembled, the support member 244 is inserted into the clutch housing 241, and then the fixing member 242 is fitted to the gear housing 31.

Figure 22A:
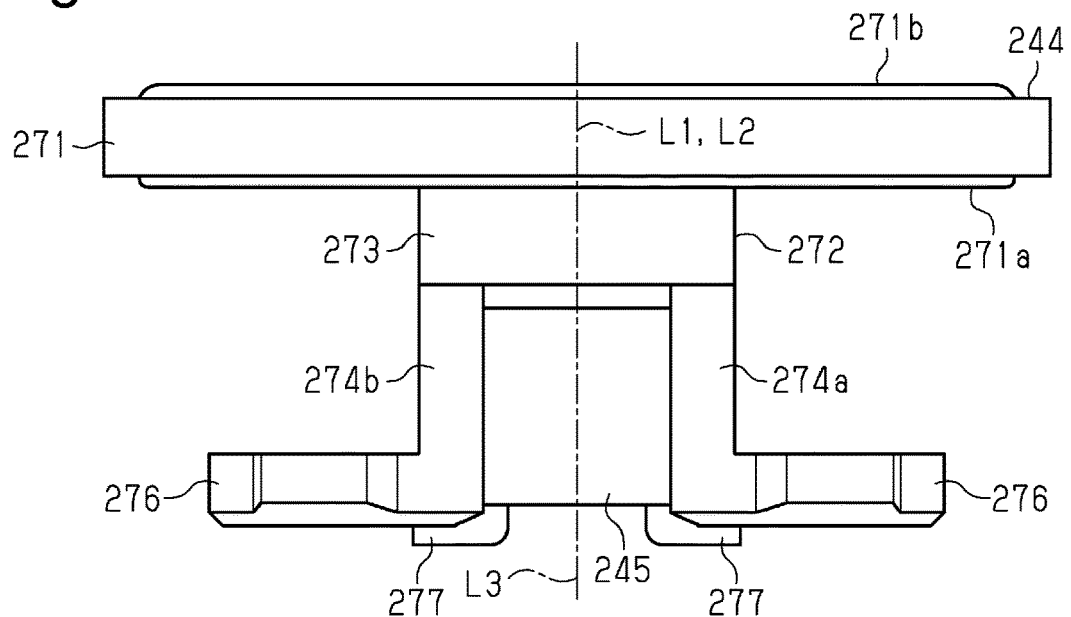
FIG. 22A is a side view of a support member holding rolling bodies in the clutch of the fifth embodiment.
Figure 22B:
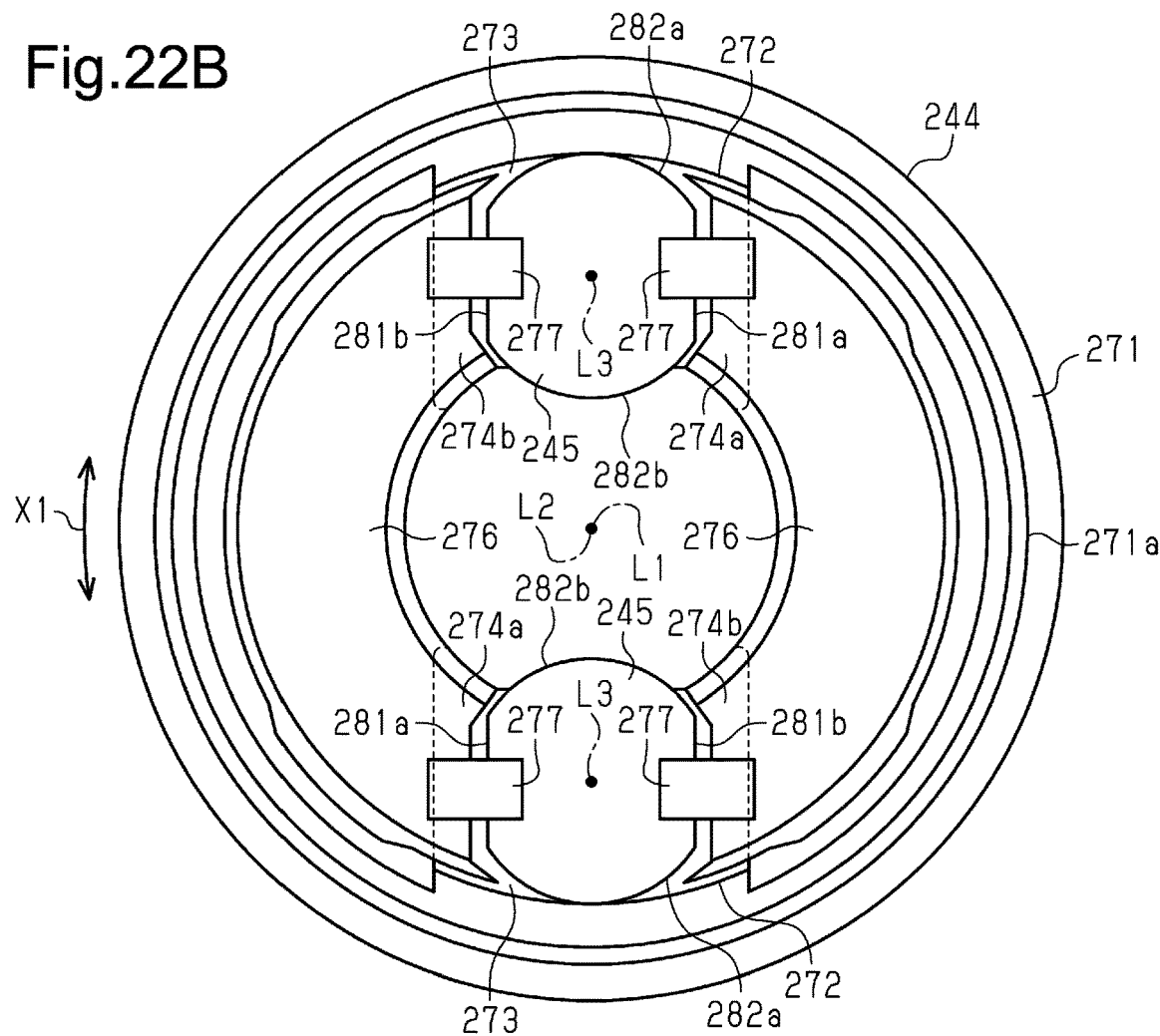
FIG. 22B is a bottom view of the support member.
Figure 23A:
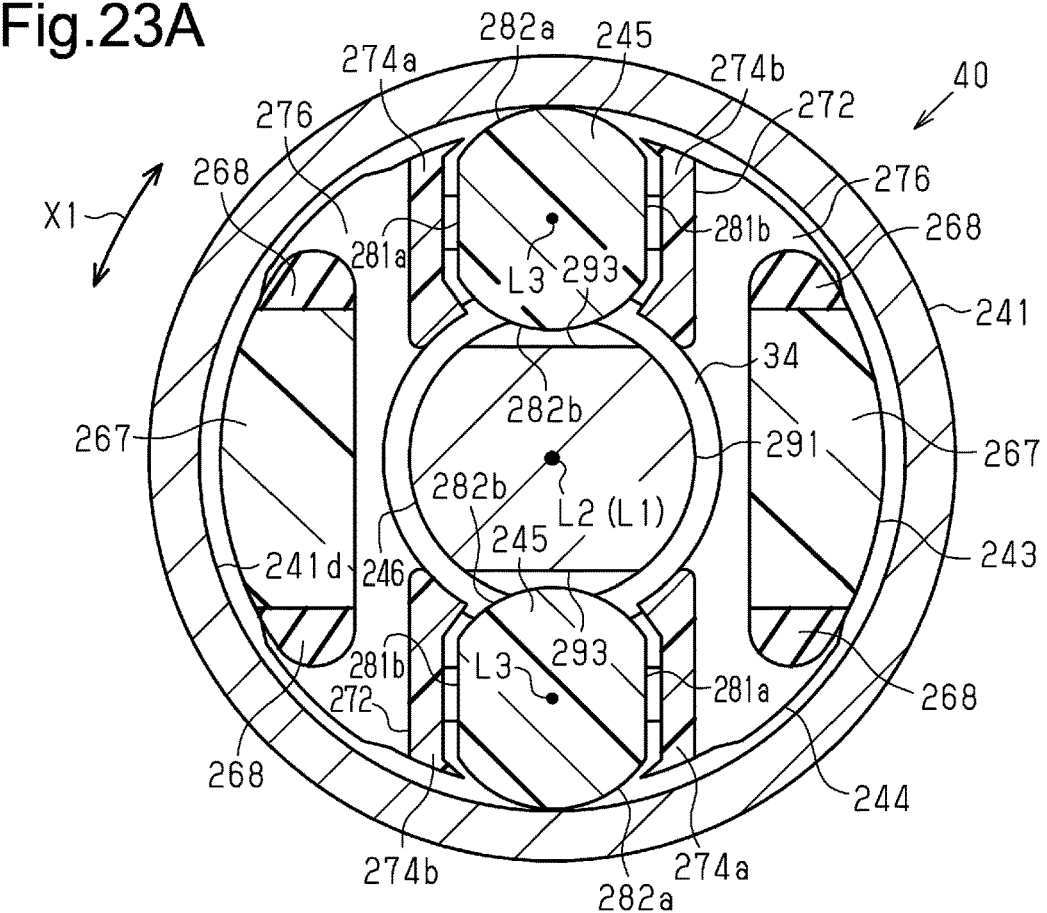
FIG. 23A is a cross-sectional view of the clutch of the fifth embodiment (a cross-sectional view taken along line 23a-23a in FIG. 18)
Figure 23B:
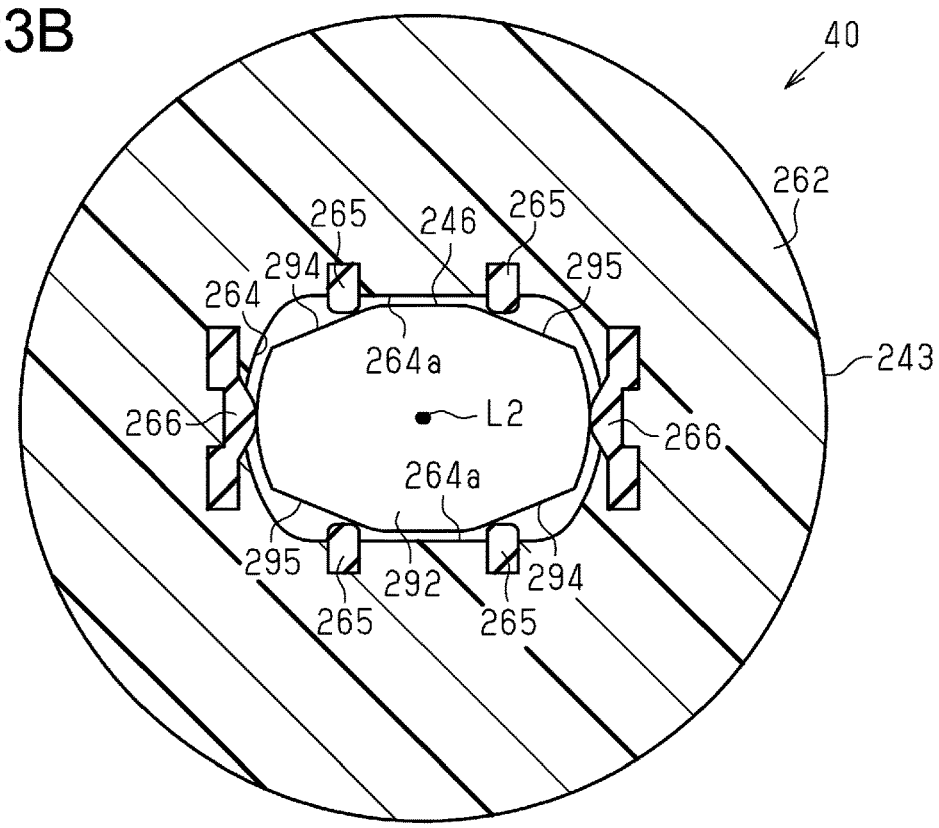
FIG. 23B is a cross-sectional view of the clutch (a cross-sectional view taken along line 23b-23b in FIG. 18).

As shown in FIG. 22B, the distance between opposed side surfaces of first and second roller supports 274a and 274b in each rolling body holding portion 272 is less than the largest outer diameter of the rolling body 245 (that is, longitudinal width of the rolling body 245 in axial view). Further, the distance between the opposed side surfaces of the first and second roller supports 274a and 274b at each rolling body holding portion 272 is slightly greater than the width of the rolling body 245 in the rotation direction X1 (length between first opposed surface 281a and second opposed surface 281b, transverse width of the rolling body 245 in axial view).

The operation of the motor 10 will now be described mainly focusing on the operation of the clutch 40.

Figure 24A:
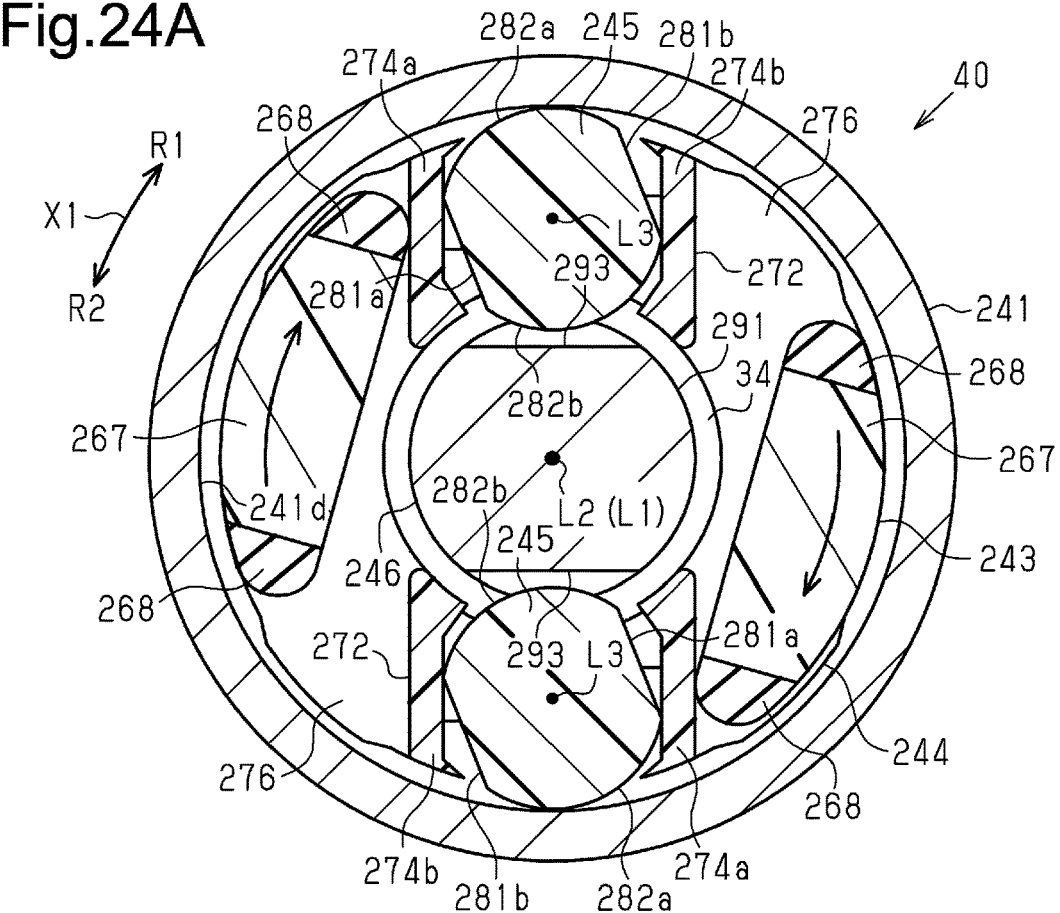
FIGS. 24A and 24B are cross-sectional views illustrating the operation of the clutch of the fifth embodiment.
Figure 24B:
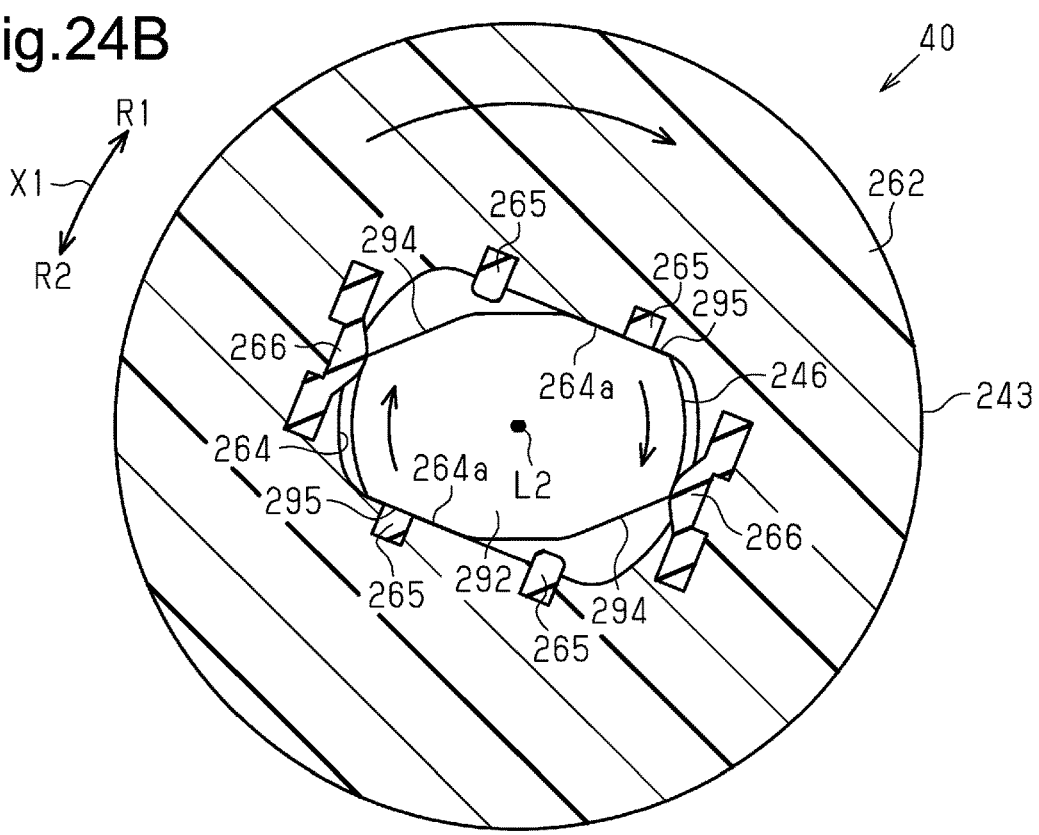

As shown in FIGS. 18 and 24A, when the motor unit 20 is driven by energizing the motor unit 20, the driving-side rotating body 243 rotates together with the rotation shaft 24. That is, the rotational drive of the driving-side rotating body 243 is started. FIGS. 24A and 24B illustrate a case where the driving-side rotating body 243 is rotationally driven in the first direction R1. As shown in FIG. 24A, as the driving-side rotating body 243 rotates in the first direction R1, circumferential end portions (elastic portions 268) of the rolling body release portions 267 of the driving-side rotating body 243 on the front sides in the rotation direction come into contact with the first roller supports 274a of the rolling body holding portions 272 in the rotation direction. At this time, the urging forces produced by the leaf springs 253, the frictional force between the leaf springs 253 and the ring 271 (upper rib 271b), and the frictional force between the ring 271 (lower rib 271a) and the flange 241a limits rotation of the support member 244 with the ring 271 urged by the two leaf springs 253 about the rotation axis of the driving-side rotating body 243 (see FIG. 21). Thus, when starting rotational drive of the driving-side rotating body 243, the support member 244 is restricted from being forced in the rotation direction of the driving-side rotating body 243 (first direction R1 in the example shown in FIG. 24) and rotated ahead of the driving-side rotating body 243 by the impact of the rolling body release portions 267 coming into contact with the first roller supports 274a from the rotation direction of the driving-side rotating body 243. Consequently, after the rolling body release portions 267 come into contact with the first roller supports 274a from the rotation direction of the driving-side rotating body 243, the driving-side rotating body 243 and the support member 244 easily rotate integrally. Then, the rolling body release portions 267 contacting the first roller supports 274a of the rolling body holding portions 272 in the rotation direction press the rolling bodies 245 in the first direction R1 with the first roller supports 274a. This releases the rolling bodies 245 held between an inner circumferential surface 241d of the clutch housing 241 and control surfaces 293 of the driven-side rotating body 246.

Further, as shown in FIG. 24B, contact of driving-side transmission surfaces 264a with second driven-side transmission surfaces 295 of a driven-side connecting portion 292 from the first direction R1 connects the driving-side rotating body 243 to the driven-side rotating body 246 in an integrally rotatable manner.

After the rolling bodies 245 held between the inner circumferential surface 241d of the clutch housing 241 and the driven-side rotating body 246 are released by the support member 244 pressed in the rotation direction of the driving-side rotating body 243 by the driving-side rotating body 243, the driven-side rotating body 246 may act to hold the rolling bodies 245 again with the inner circumferential surface 241d of the clutch housing 241 (see FIG. 24A). However, the present embodiment restricts the support member 244 from rotating ahead of the driving-side rotating body 243. This results in easy integral rotation of the driving-side rotating body 243 and the support member 244. Thus, integral rotation of the driving-side rotating body 243 and the support member 244 immediately releases the rolling bodies 245 held between the inner circumferential surface 241d of the clutch housing 241 and the driven-side rotating body 246.

While the driving-side rotating body 243 and the support member 244 are integrally rotating with the rolling body release portions 267 pressing the first roller supports 274a and the rolling bodies 245 in the first direction R1, the rolling bodies 245 are arranged at circumferentially central portions of the control surfaces 293 of the driven-side rotating body 246. In other words, the rolling bodies 245 shift to an unlocked state in which the rolling bodies 245 are not held between the control surfaces 293 and the clutch housing 241 (that is, rolling bodies 245 do not interfere with rotation of driven-side rotating body 246). In the unlocked state, the rotational driving force of the driving-side rotating body 243 (rotation shaft 24) is transmitted to the driven-side rotating body 246 (worm shaft 34), and the rotation shaft 24 and the worm shaft 34 integrally rotate in the first direction R1. The rotation of the worm shaft 34 in the first direction R1 is transmitted to the output shaft 38 while being decelerated between the worm shaft 34 and the worm wheel 37 and then output from the output shaft 38. Then, the vehicle window glass is raised or lowered with the window regulator (not shown) in accordance with the rotation direction of the output shaft 38. When the motor unit 20 is de-energized, the rotational drive of the rotation shaft 24, that is, the rotational drive of the driving-side rotating body 243, is stopped.

When the driving-side rotating body 243 is rotated in the second direction R2 by the drive of the motor unit 20, the clutch 40, of which components rotate in the opposite direction, connects the rotation shaft 24 and the worm shaft 34 through the same actions as described above when the driving-side rotating body 243 is rotated in the first direction R1.

Figure 25A:
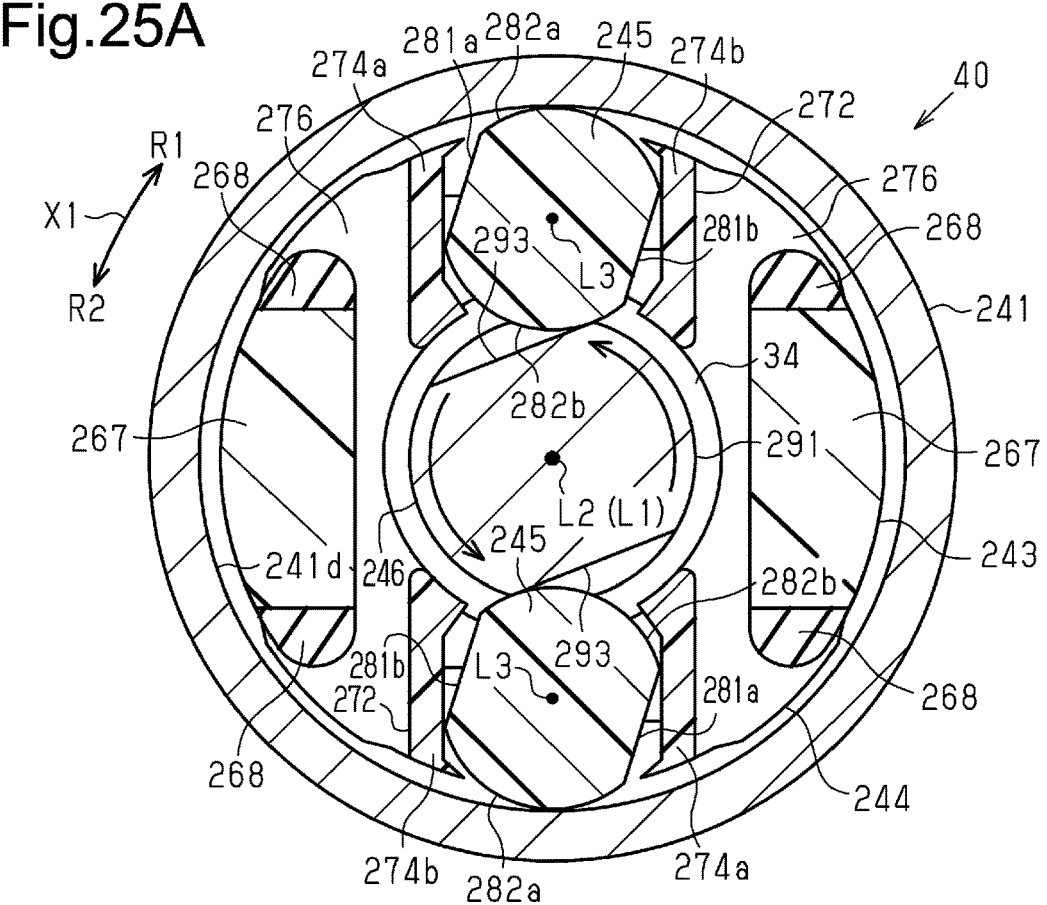
FIGS. 25A and 25B are cross-sectional views illustrating the operation of the clutch of the fifth embodiment.
Figure 25B:
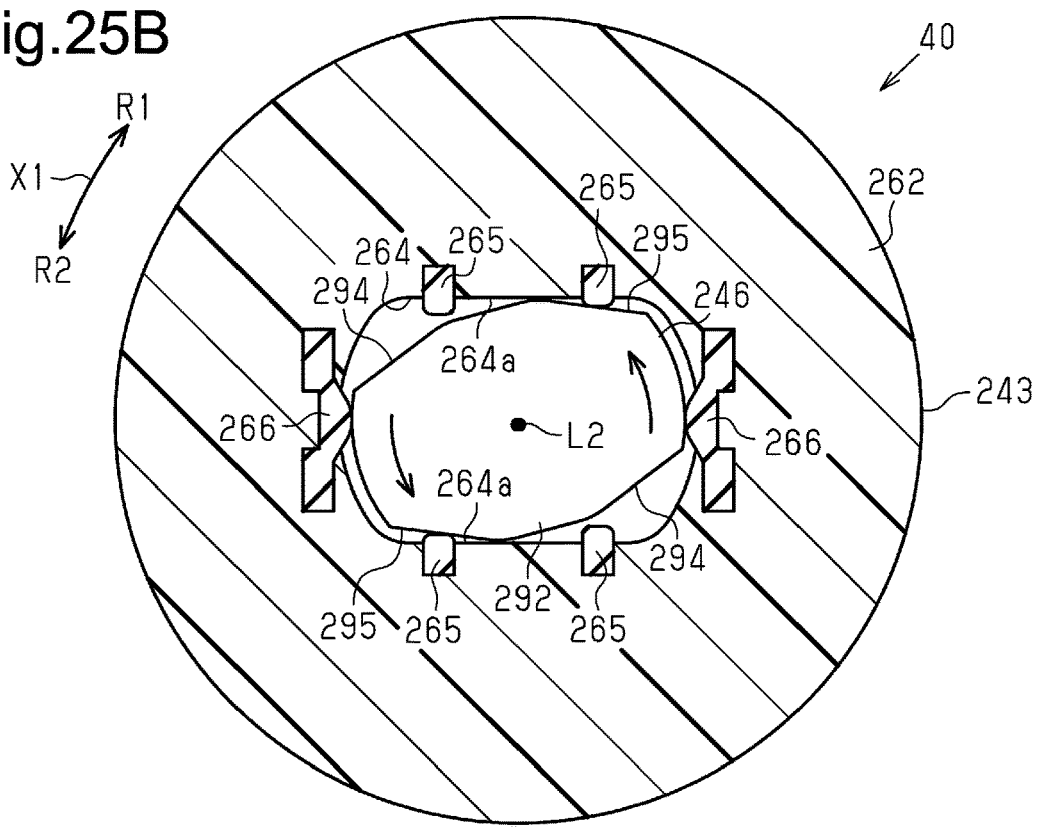

As shown in FIGS. 25A and 25B, when a load is applied from the load side (window regulator side in the present embodiment) to the output shaft 38 in a state where the drive of the motor unit 20 is stopped, that is, when the rotation shaft 24 (driving-side rotating body 243) is not rotationally driven, the driven-side rotating body 246 is easily rotated because of the load. FIGS. 25A and 25B illustrate a case where the driven-side rotating body 246 acts to rotate in the second direction R2. Then, the control surfaces 293 of the driven-side rotating body 246 press the rolling bodies 245 arranged between the control surfaces 293 and the inner circumferential surface 241d of the clutch housing 241 to the outer circumferential side. In each rolling body 245 pressed by the control surface 293, a first arcuate surface 282a contacts the inner circumferential surface 241d of the clutch housing 241 between the two roller supports 274a and 274b, and a second arcuate surface 282b contacts a portion of the control surface 293 closer to a circumferential end portion (rearward end portion of control surface 293 in second direction R2) than the circumferential center of the control surface 293. Then, each rolling body 245 is held between the portion of the control surface 293 closer to the rearward end portion in the second direction R2 and the inner circumferential surface 241d of the clutch housing 241. As a result, the rolling bodies 245 serve as wedges to stop the rotation (rotation in second direction R2) of the driven-side rotating body 246 (that is, to lock rotation of worm shaft 34). Consequently, rotation of the output shaft 38 is restricted when the rotation shaft 24 (driving-side rotating body 243) is not rotationally driven. In a state where the driven-side rotating body 246 is arranged in a locked position (a position to hold the rolling bodies 245 with the clutch housing 241) (a state shown in FIG. 25A), as shown in FIG. 25B, the second driven-side transmission surfaces 295 of the driven-side connecting portion 292 do not contact the driving-side transmission surfaces 264a of the driving-side rotating body 243 in the rotation direction (second direction R2).

Also, in a case where the driven-side rotating body 246 acts to rotate in the first direction R1 when the motor unit 20 (driving-side rotating body 243) is not driven, the rotation of the driven-side rotating body 246 is stopped in the same manner. That is, each rolling body 245 is held between a portion of the control surface 293 closer to a rearward end portion in the first direction R1 and the inner circumferential surface 241*d* of the clutch housing 241 so that the rolling bodies 245 serve as wedges to stop the rotation of the driven-side rotating body 246 (rotation in first direction R1) (that is, to lock rotation of the worm shaft 34).

The advantages of the present embodiment will now be described.

(1) When starting rotational drive of the driving-side rotating body 243, the driving-side rotating body 243 is restricted from repeatedly separating from and coming into contact with the support member 244 from the rotation direction of the driving-side rotating body 243. This reduces noise generation when starting rotational drive of the driving-side rotating body 243. Since the motor 10 is provided with the clutch 40 that reduces noise generation when starting rotational drive of the driving-side rotating body 243, noise generation is reduced in the motor 10 when starting rotational drive of the rotation shaft 24.

(2) The leaf springs 253 urge the support member 244 in the direction perpendicular to the rotation direction of the support member 244 (axial direction in present embodiment). Consequently, the urging forces of the leaf springs 253 limit rotation of the support member 244 in the rotation direction of the driving-side rotating body 243. Consequently, when starting rotational drive of the driving-side rotating body 243, the support member 244 is easily restricted from being rotated ahead of the driving-side rotating body 243 in the rotation direction of the driving-side rotating body 243. As a result, noise generation when starting rotational drive of the driving-side rotating body 243 is easily reduced.

(3) The leaf springs 253 provided at the fixing member 242 urge the support member 244 toward the clutch housing 241. Thus, by pressing the support member 244 against the clutch housing 241 with the urging forces of the leaf springs 253, the support member 244 is easily restricted from being rotated ahead of the driving-side rotating body 243 in the rotation direction of the driving-side rotating body 243 when starting rotational drive of the driving-side rotating body 243. As a result, noise generation when starting rotational drive of the driving-side rotating body 243 is further easily reduced.

(4) The support member 244 includes the lower rib 271*a* that contacts the flange 241*a* of the clutch housing 241 from the axial direction. The leaf springs 253 of the fixing member 242 urge the support member 244 in the axial direction so that the lower rib 271*a* is pressed against the flange 241*a*. Thus, the lower rib 271*a* of the support member 244 is pressed against the flange 241*a* by the axial urging forces of the leaf springs 253, and the frictional force between the lower rib 271*a* and the flange 241*a* is easily increased. The frictional force limits rotation of the support member 244 in the rotation direction of the driving-side rotating body 243. Consequently, when starting rotational drive of the driving-side rotating body 243, the support member 244 is further easily restricted from rotating ahead of the driving-side rotating body 243 in the rotation direction of the driving-side rotating body 243. As a result, noise generation when starting rotational drive of the driving-side rotating body 243 is further easily reduced.

Sixth Embodiment

A motor including a clutch in a sixth embodiment will now be described. Same reference numerals are given to those components that are the same as the corresponding components of the fifth embodiment. Such components will not be described in detail.

Figure 26:
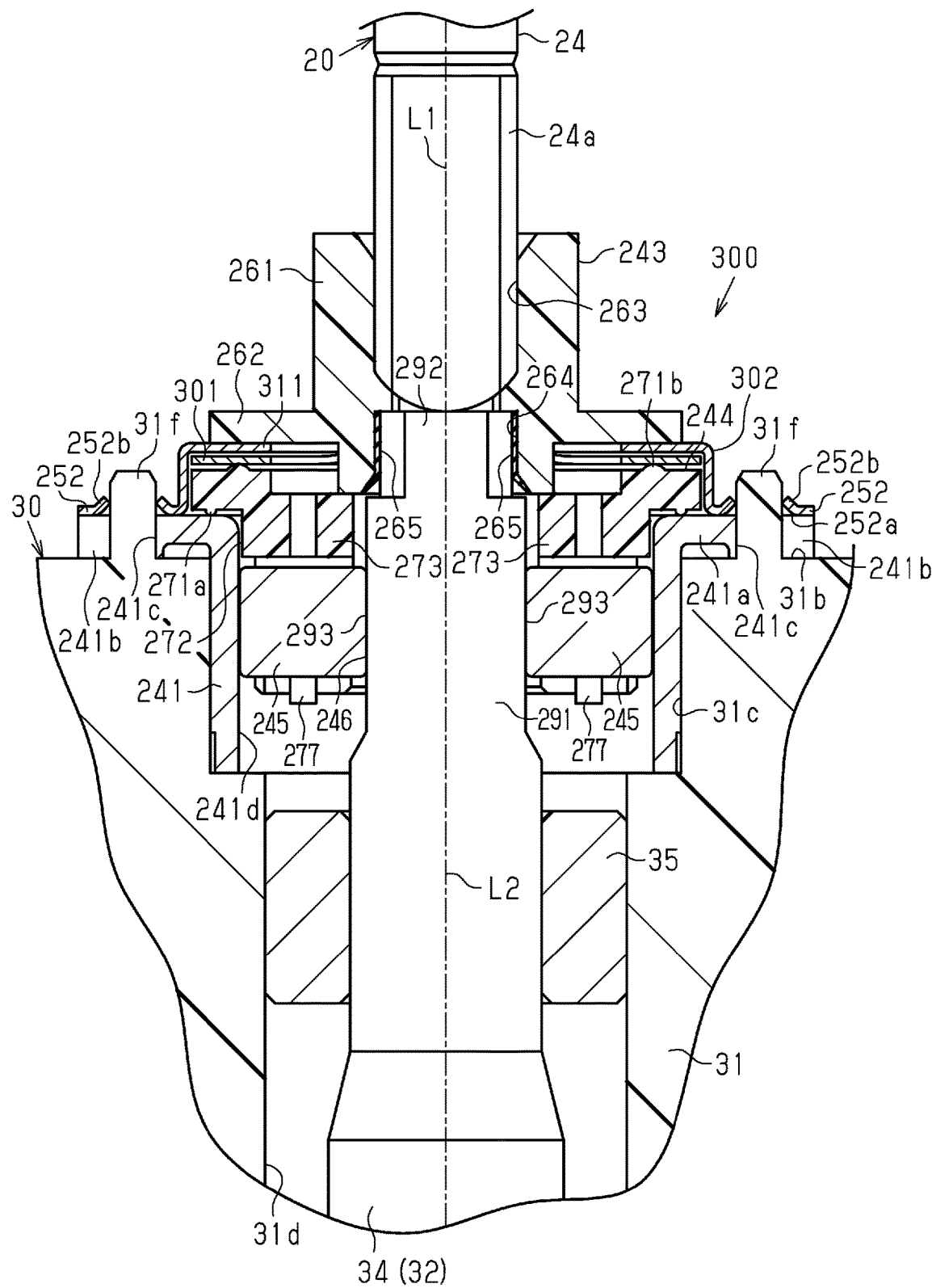
FIG. 26 is a partial enlarged cross-sectional view of a motor of a sixth embodiment.

As shown in FIG. 26, a clutch 300 of the present embodiment is provided in the motor 10 in place of the clutch 40 in the fifth embodiment. The clutch 300 includes the clutch housing 241, a wave washer 301 as an urging member, a fixing member 302, the driving-side rotating body 243, the support member 244, the rolling bodies 245, and the driven-side rotating body 246.

Figure 27:
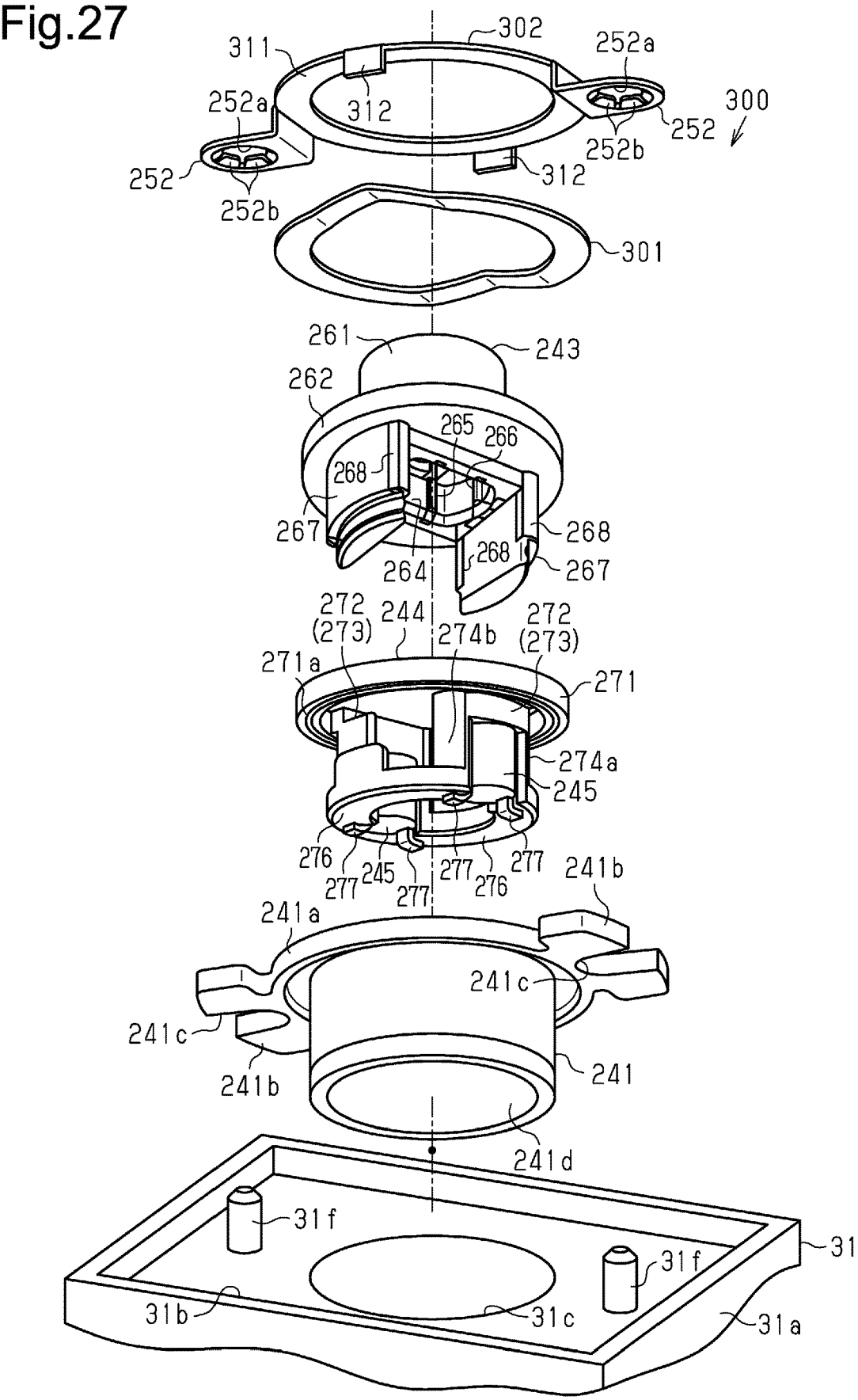
FIG. 27 is an exploded perspective view of part of a clutch in the sixth embodiment.

As shown in FIGS. 26 and 27, the wave washer 301 has an annular shape, and the outer diameter and the inner diameter thereof are substantially equal to the outer diameter and the inner diameter of the ring 271 of the support member 244. The wave washer 301 is located between the collar 262 of the driving-side rotating body 243 and the ring 271, and contacts the upper rib 271*b* of the ring 271 from the axial direction.

The fixing member 302 fixes the clutch housing 241 to the gear housing 31 and is formed by stamping a metal plate material into a predetermined shape. The fixing member 302 has an annular plate-shaped connecting frame 311 and the two engaging portions 252, projecting radially outward from two locations of the connecting frame 311 at equal angular intervals in the circumferential direction.

The connecting frame 311, which is located between the collar 262 of the driving-side rotating body 243 and the wave washer 301, contacts the wave washer 301 from the axial direction (direction of the central axis L1). The outer diameter of the connecting frame 311 is slightly larger than the outer diameter of the wave washer 301. The inner diameter of the connecting frame 311 is substantially equal to the inner diameter of the wave washer 301. Positioning projections 312 extending in one axial direction (toward the support member 244) are provided at two locations of the connecting frame 311 at equal angular intervals in the circumferential direction, which are two locations at circumferentially central portions between the two engaging portions 252.

The fixing member 302 is fixed to the gear housing 31 with the fixing projections 31*f* inserted into the engaging holes 252*a* until the engaging portions 252 come into contact with the fixing extended portions 241*b* from the axial direction. This fixes the clutch housing 241 to the gear housing 31I a non-movable manner in the axial direction. The fixing member 302 is fixed to the gear housing 31 with the connecting frame 251 pressing the wave washer 301 against the ring 271 of the support member 244 in the axial direction. Consequently, the wave washer 301 urges, with its elastic force, the ring 271 toward the flange 241*a* in the axial direction (direction perpendicular to rotation direction of support member 244) so that the lower rib 271*a* is pressed against the flange 241*a*. That is, the wave washer 301 urges the support member 244 to increase the frictional force acting on the support member 244 with the flange 241*a*.

In the fixing member 302 fixed to the gear housing 31, distal end portions of the positioning projections 312 radially face the outer circumferential surface of the ring 271 on the outer circumferential side of the ring 271. Thus, the wave washer 301 is radially positioned by the positioning projections 312 and the engaging portions 252.

The operation of the present embodiment will now be described.

When the rotational drive of the rotation shaft 24 is started by the drive of the motor unit 20, the rotational drive of the driving-side rotating body 243 that rotates integrally with the rotation shaft 24 is started. As the driving-side rotating body 243 rotates, the circumferential end portions (elastic portions 268) of the rolling body release portions 267 of the driving-side rotating body 243 on the front sides in the rotation direction come into contact with the rolling body holding portions 272 in the rotation direction (see FIG. 24A). At this time, the urging force produced by the wave washer 301, the frictional force between the washer 301 and the ring 271 (upper rib 271b), and the frictional force between the ring 271 (lower rib 271a) and the flange 241a limit rotation of the support member 244 with the ring 271 urged by the wave washer 301 about the rotation axis of the driving-side rotating body 243. Thus, when starting rotational drive of the driving-side rotating body 243, the support member 244 is restricted from being forced in the rotation direction of the driving-side rotating body 243 and rotated ahead of the driving-side rotating body 243 by the impact of the rolling body release portions 267 of the driving-side rotating body 243 coming into contact with the rolling body holding portions 272 of the support member 244 from the rotation direction of the driving-side rotating body 243. Consequently, after the rolling body release portions 267 come into contact with the rolling body holding portions 272 from the rotation direction of the driving-side rotating body 243, the driving-side rotating body 243 and the support member 244 easily rotate integrally. Then, the rolling body release portions 267 contacting the rolling body holding portions 272 in the rotation direction press the rolling bodies 245 in the rotation direction of the driving-side rotating body 243 with the rolling body holding portions 272 release the rolling bodies 245 held between the inner circumferential surface 241d of the clutch housing 241 and the control surfaces 293 of the driven-side rotating body 246.

After the rolling bodies 245 held between the inner circumferential surface 241d of the clutch housing 241 and the driven-side rotating body 246 are released by the support member 244 pressed in the rotation direction of the driving-side rotating body 243 by the driving-side rotating body 243, the driven-side rotating body 246 may act to hold the rolling bodies 245 again with the inner circumferential surface 241d of the clutch housing 241. However, the present embodiment restricts the support member 244 from rotating ahead of the driving-side rotating body 243. This facilitates the integral rotation of the driving-side rotating body 243 and the support member 244. Thus, the integral rotation of the driving-side rotating body 243 and the support member 244 immediately releases the rolling bodies 245 held between the inner circumferential surface 241d of the clutch housing 241 and the driven-side rotating body 246.

In addition to advantage (1) of the fifth embodiment, the present embodiment has the following advantages.

(1) The wave washer 301 urges the support member 244 in the direction perpendicular to the rotation direction of the support member 244 (axial direction in present embodiment). Thus, the urging force of the wave washer 301 limits rotation of the support member 244 in the rotation direction of the driving-side rotating body 243. Consequently, when starting rotational drive of the driving-side rotating body 243, the support member 244 is easily restricted from being rotated ahead of the driving-side rotating body 243 in the rotation direction of the driving-side rotating body 243. As a result, noise generation when starting rotational drive of the driving-side rotating body 243 is easily reduced.

(2) The wave washer 301 urges the support member 244 toward the clutch housing 241. Thus, by pressing the support member 244 against the clutch housing 241 with the urging force of the wave washer 301, the support member 244 is further easily restricted from rotating ahead of the driving-side rotating body 243 in the rotation direction of the driving-side rotating body 243 when starting rotational drive of the driving-side rotating body 243. As a result, noise generation when starting rotational drive of the driving-side rotating body 243 is further easily reduced.

(3) The support member 244 includes the lower rib 271a that contacts the flange 241a of the clutch housing 241 from the axial direction. The wave washer 301 urges the support member 244 in the axial direction so that the lower rib 271a is pressed against the flange 241a. In this manner, the lower rib 271a of the support member 244 is pressed against the flange 241a by the axial urging force of the wave washer 301, and the frictional force between the lower rib 271a and the flange 241a is easily increased. The frictional force limits rotation of the support member 244 in the rotation direction of the driving-side rotating body 243. Consequently, when starting rotational drive of the driving-side rotating body 243, the support member 244 is further easily restricted from rotating ahead of the driving-side rotating body 243 in the rotation direction of the driving-side rotating body 243. As a result, noise generation when starting rotational drive of the driving-side rotating body 243 is further easily restricted.

Seventh Embodiment

A motor including a clutch in a seventh embodiment will now be described. Same reference numerals are given to those components that are the same as the corresponding components of the fifth embodiment. Such components will not be described in detail.

Figure 28:
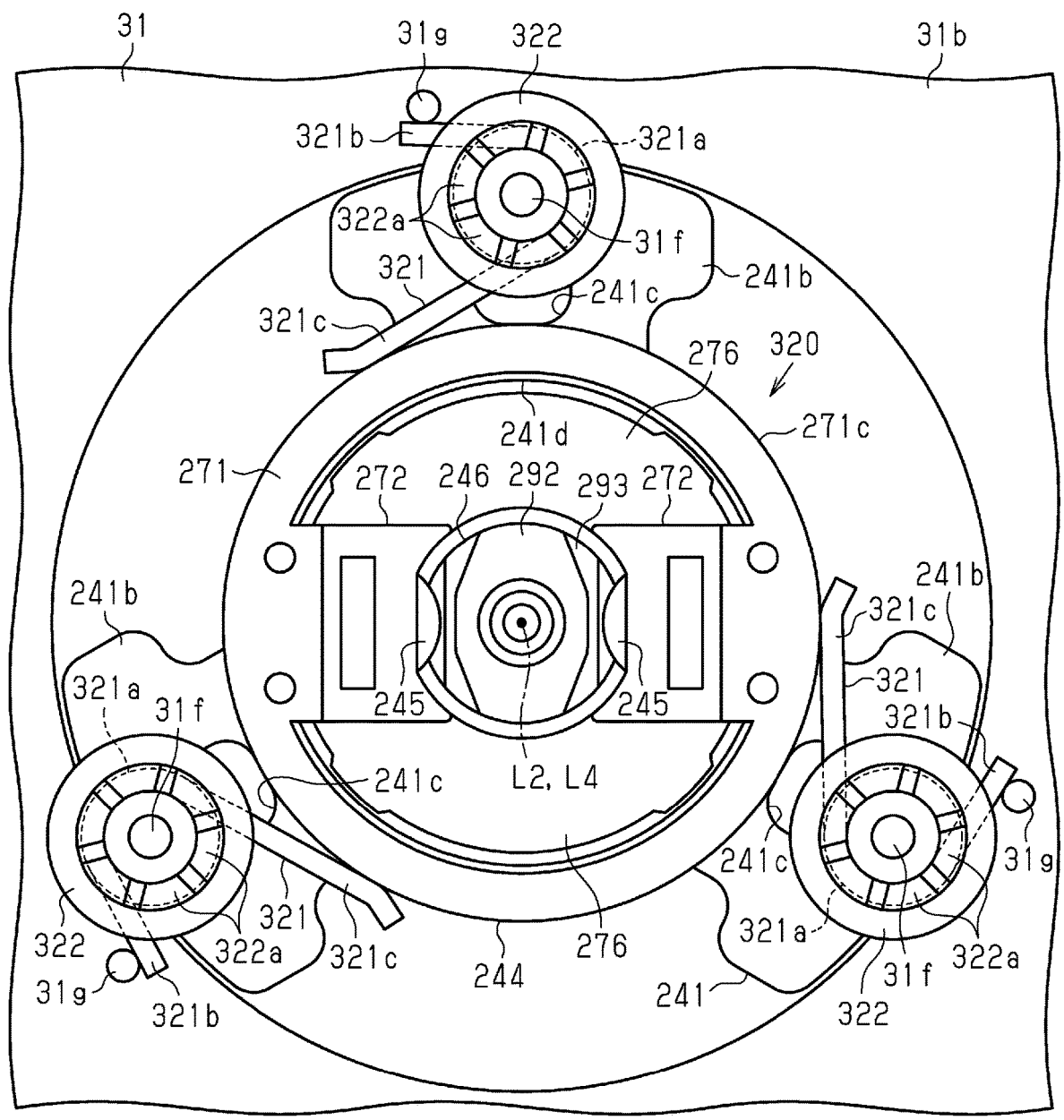
FIG. 28 is a plan view showing part of an output unit and a clutch in a motor of a seventh embodiment.

As shown in FIG. 28, a clutch 320 of the present embodiment is provided in the motor 10 in place of the clutch 40 in the fifth embodiment. The clutch 320 includes the clutch housing 241, three torsion springs 321 as urging members, the driving-side rotating body 243 (not shown in FIG. 28), the support member 244, the rolling bodies 245, and the driven-side rotating body 246.

As shown in FIGS. 28 and 29, the clutch housing 241 in the present embodiment includes three fixing extended portions 241b. The three fixing extended portions 241b are provided at three locations of the flange 241a at equal angular intervals in the circumferential direction (at 120° intervals in the present embodiment). The fixing projections 31f are provided on the outer circumference of the opening of the clutch housing recess 31c forming the bottom of the housing recess 31b at three locations at equal angular intervals in the circumferential direction (at 120° intervals in the present embodiment). The clutch housing 241 is inserted into the clutch housing recess 31c with the fixing projections 31f inserted into the fixing recesses 241c of the three fixing extended portions 241b. The fixing extended portions 241b abut on the bottom of the housing recess 31b.

The torsion springs 321 are attached to the fixing projections 31f to be axially overlapped with the fixing extended portions 241b. The three torsion springs 321 all have the same shape. Each torsion spring 321 includes a coil 321a wound in coil (spiral), an engaging portion 321b extending from one end of the coil 321a, and an urging portion 321c extending from the other end of the coil 321a. The torsion springs 321 are externally fitted to the different fixing projections 31f at the coils 321a. An annular fixing member 322 is externally fitted to each fixing projection 31f to be axially overlapped with the coil 321a. The fixing member 322 in the present embodiment is a push nut. Engaging teeth 322a are provided on an inner circumferential edge of each fixing member 322. The engaging teeth 322a are caught in the outer circumferential surface of the fixing projection 31f to fix the fixing member 322 to the fixing projection 31f so that it cannot move to the distal end side of the fixing projection 31f. Each fixing member 322 is externally fitted toward the proximal end side of the fixing projection 31f until it axially comes into contact with the coil 321a and holds the coil 321a and the fixing extended portion 241b with the bottom of the housing recess 31b. The fixing members 322 fix the torsion springs 321 and the clutch housing 241 to the gear housing 31 and axially position the torsion springs 321.

The gear housing 31 is provided with engaging projections 31g projecting in the axial direction in the vicinity of the fixing projections 31f. The engaging portions 321b of the torsion springs 321 are engaged with the engaging projections 31g in the vicinity of the fixing projections 31f to which the coils 321a of the torsion springs 321 are externally fitted.

The distal end portions of the urging portions 321c of the torsion springs 321 urge an outer circumferential surface 271c of the ring 271 of the support member 244 radially inward. Specifically, the three urging portions 321c contact the outer circumferential surface 271c of the ring 271 at three locations at equal angular intervals in the circumferential direction (at 120° intervals in present embodiment) urging the ring 271 in the direction perpendicular to the rotation axis L4 of the driving-side rotating body 243 (direction perpendicular to rotation direction of support member 244, radial direction). The torsion springs 321 urge the support member 244 to increase the frictional force acting on the support member 244 between the urging portions 321c and the support member 244. The urging forces produced by the torsion springs 321 for urging the ring 271 are equal. The urging forces of the torsion springs 321 restrict separation of the rotation axis of the support member 244 from the rotation axis of the driven-side rotating body 246 (same as central axis L2 of worm shaft 34) and from of the rotation axis L4 of the driving-side rotating body 243.

The operation of the present embodiment will now be described.

When the rotational drive of the rotation shaft 24 is started by the drive of the motor unit 20, the rotational drive of the driving-side rotating body 243 that rotates integrally with the rotation shaft 24 is started. As the driving-side rotating body 243 rotates, the circumferential end portions (elastic portions 268) of the rolling body release portions 267 of the driving-side rotating body 243 on the front sides in the rotation direction come into contact with the rolling body holding portions 272 in the rotation direction (see FIG. 24A). At this time, the three torsion springs 321 urge the support member 244 with the ring 271, and the urging forces produced by the urging portions 321c and the frictional force between the urging portions 321c and the ring 271 limit rotation of the support member 244 about the rotation axis of the driving-side rotating body 243. Thus, when starting rotational drive of the driving-side rotating body 243, the support member 244 is restricted from being forced in the rotation direction of the driving-side rotating body 243 and rotated ahead of the driving-side rotating body 243 by the impact of the rolling body release portions 267 of the driving-side rotating body 243 coming into contact with the rolling body holding portions 272 of the support member 244 from the rotation direction of the driving-side rotating body 243. Consequently, after the rolling body release portions 267 come into contact with the rolling body holding portions 272 from the rotation direction of the driving-side rotating body 243, the driving-side rotating body 243 and the support member 244 easily rotate integrally. Then, the rolling body release portions 267 contacting the rolling body holding portions 272 in the rotation direction press the rolling bodies 245 in the rotation direction of the driving-side rotating body 243 with the rolling body holding portions 272. This releases the rolling bodies 245 held between the inner circumferential surface 241d of the clutch housing 241 and the control surfaces 293 of the driven-side rotating body 246.

After the rolling bodies 245 held between the inner circumferential surface 241d of the clutch housing 241 and the driven-side rotating body 246 are released by the support member 244 pressed in the rotation direction of the driving-side rotating body 243 by the driving-side rotating body 243, the driven-side rotating body 246 may act to hold the rolling bodies 245 again with the inner circumferential surface 241d of the clutch housing 241. However, the present embodiment restricts the support member 244 from rotating ahead of the driving-side rotating body 243. This facilitates integral rotation of the driving-side rotating body 243 and the support member 244. Thus, integral rotation of the driving-side rotating body 243 and the support member 244 immediately releases the rolling bodies 245 held between the inner circumferential surface 241d of the clutch housing 241 and the driven-side rotating body 246.

In addition to advantage (1) of the fifth embodiment, the present embodiment has the following advantages.

(1) The torsion springs 321 urge the support member 244 in the direction perpendicular to the rotation direction of the support member 244 (radial direction in the present embodiment). Thus, the urging forces of the torsion springs 321 limit rotation of the support member 244 in the rotation direction of the driving-side rotating body 243. Consequently, when starting rotational drive of the driving-side rotating body 243, the support member 244 is easily restricted from being rotated ahead of the driving-side rotating body 243 in the rotation direction of the driving-side rotating body 243. As a result, noise generation when starting rotational drive of the driving-side rotating body 243 is easily reduced.

(2) The torsion springs 321 urge the support member 244 in the direction perpendicular to the rotation axis L4 of the driving-side rotating body 243 (radial direction). Thus, the urging forces of the torsion springs 321 press the support member 244 in the direction perpendicular to the rotation axis L4 of the driving-side rotating body 243, and the support member 244 is further easily restricted from rotating ahead of the driving-side rotating body 243 in the rotation direction of the driving-side rotating body 243 when starting rotational drive of the driving-side rotating body 243. As a result, noise generation when starting rotational drive of the driving-side rotating body 243 is further easily reduced.

Eighth Embodiment

A motor including a clutch of an eighth embodiment will now be described. Same reference numerals are given to those components that are the same as the corresponding components of the first and seventh embodiments. Such components will not be described in detail.

As shown in FIG. 30A, a clutch 330 of the present embodiment is provided in the motor 10 in place of the clutch 40 in the fifth embodiment. The clutch 330 is configured to include a driving-side rotating body 331 in place of the driving-side rotating body 243 in the clutch 40 of the fifth embodiment. In the clutch 330, the clutch housing 241 is fixed to the gear housing 31 by the fixing members 322 in the seventh embodiment in place of the fixing member 242 in the clutch 40 in the fifth embodiment.

As shown in FIGS. 30A and 30B, the driving-side rotating body 331 includes urging portions 332 serving as urging members provided at the rolling body release portions 267 of the driving-side rotating body 243 in the fifth embodiment. The urging portions 332 are provided at both circumferential end portions of each rolling body release portion 267. In the present embodiment, the urging portions 332 are provided integrally with the elastic portions 268, and are formed of a resin material having elasticity (for example, an elastomer (including rubber)). Each urging portion 332 projects radially outward from a radially outer side surface of the rolling body release portion 267, and forms a rib extending in the axial direction (same as rotation axis direction of driving-side rotating body 331). In the present embodiment, each urging portion 332 is shaped to be semicircular in a cross-sectional orthogonal to the axial direction.

Figure 31:
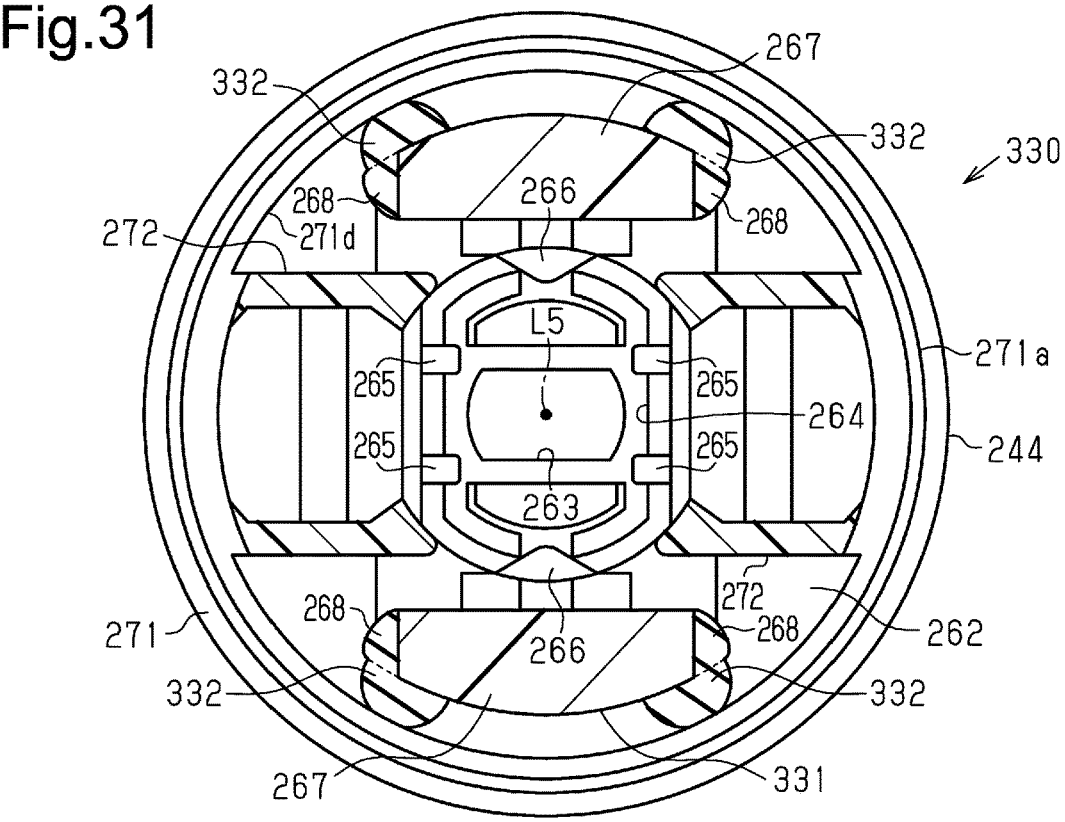
FIG. 31 is a cross-sectional view of the clutch of the eighth embodiment.

As shown in FIG. 31, in a state where the rolling body release portions 267 are inserted into the ring 271 of the support member 244 to couple the driving-side rotating body 331 and the support member 244, the urging portions 332 are located inside the ring 271 in a state compressed radially by the rolling body release portions 267 and an inner circumferential surface 271d of the ring 271. The urging portions 332 are in a state pressed against the inner circumferential surface 271d of the ring 271 by their own elastic forces. The urging portions 332 urge the ring 271 radially outward. That is, the urging portions 332 urge the support member 244 in a direction perpendicular to the rotation direction of the support member 244, which is a direction perpendicular to the rotation axis L5 of the driving-side rotating body 331. The urging portions 332 urge the support member 244 to increase the frictional force acting on the support member 244 between the urging portions 332 and the support member 244.

The advantages of the present embodiment will now be described.

When the rotational drive of the rotation shaft 24 is started by the drive of the motor unit 20, the rotational drive of the driving-side rotating body 331 that rotates integrally with the rotation shaft 24 is started. As the driving-side rotating body 331 rotates, the circumferential end portions (elastic portions 268) of the rolling body release portions 267 of the driving-side rotating body 331 on the front sides in the rotation direction come into contact with the rolling body holding portions 272 in the rotation direction.

Figure 32:
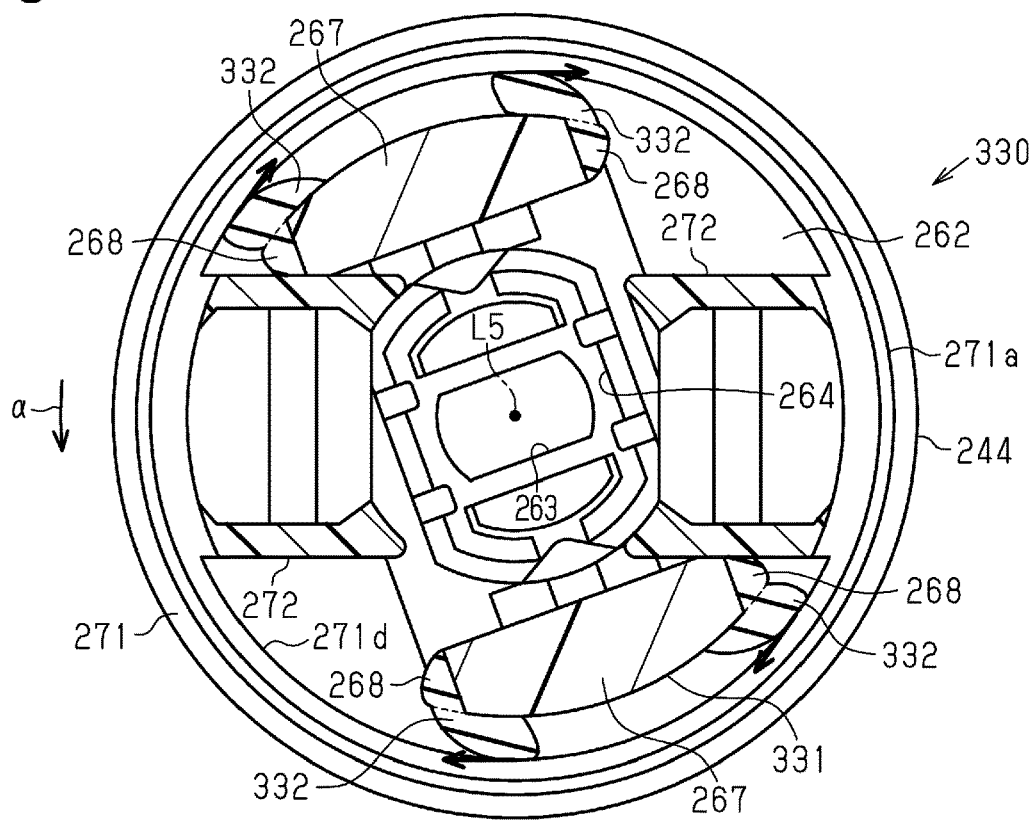
FIG. 32 is a cross-sectional view of the clutch of the eighth embodiment.

At this time, as shown in FIGS. 31 and 32, the radial urging forces (elastic forces) produced by the urging portions 332 and the frictional force between the urging portions 332 and the inner circumferential surface 271d of the ring 271 limit rotation of the support member 244, of which the ring 271 is urged radially outward by the urging portions 332, about the rotation axis of the driving-side rotating body 331. As shown in FIG. 32, for example, when the support member 244 acts to rotate ahead of the driving-side rotating body 331 in a direction of arrow α (a counterclockwise direction in FIG. 32), the urging portions 332 are elastically deformed such that their radially outer distal end portions are shifted in the direction of the arrow α relative to their radially inner proximal end portions. This generates force in a circumferential direction with the elastically deformed urging portions 332 acting to return to the original shape, that is, load in a direction opposite to the direction in which the support member 244 acts to rotate ahead (loads in a clockwise direction). The load in the clockwise direction (see thick arrows in FIG. 32) act on the support member 244 from the urging portions 332. Thus, when starting rotational drive of the driving-side rotating body 331, the support member 244 is restricted from being forced in the rotation direction of the driving-side rotating body 331 and rotated ahead of the driving-side rotating body 331 by the impact of the rolling body release portions 267 of the driving-side rotating body 331 coming into contact with the rolling body holding portions 272 of the support member 244 from the rotation direction of the driving-side rotating body 331. Consequently, after the rolling body release portions 267 come into contact with the rolling body holding portions 272 from the rotation direction of the driving-side rotating body 331, the driving-side rotating body 331 and the support member 244 easily rotate integrally. Then, the rolling body release portions 267 contacting the rolling body holding portions 272 in the rotation direction press the rolling bodies 245 in the rotation direction of the driving-side rotating body 331 with the rolling body holding portions 272. This releases the rolling bodies 245 held between the inner circumferential surface of the clutch housing 241 and the control surfaces 293 of the driven-side rotating body 246 (see FIG. 24A).

After the rolling bodies 245 held between the inner circumferential surface 241d of the clutch housing 241 and the driven-side rotating body 246 are released by the support member 244 pressed in the rotation direction of the driving-side rotating body 331 by the driving-side rotating body 331, the driven-side rotating body 246 may act to hold the rolling bodies 245 again with the inner circumferential surface 241d of the clutch housing 241. However, the present embodiment prevents the support member 244 from rotating ahead of the driving-side rotating body 331. This facilitates integral rotation of the driving-side rotating body 331 and the support member 244. Thus, integral rotation of the driving-side rotating body 331 and the support member 244 immediately releases the rolling bodies 245 from between the inner circumferential surface 241d of the clutch housing 241 and the driven-side rotating body 246.

In addition to advantage (1) of the fifth embodiment, the present embodiment has the following advantages.

(1) The urging portions 332 urge the support member 244 in the direction perpendicular to the rotation direction of the support member 244. Thus, the urging forces of the urging portions 332 limit rotation of the support member 244 in the rotation direction of the driving-side rotating body 331. Consequently, when starting rotational drive of the driving-side rotating body 331, the support member 244 is easily restricted from being rotated ahead of the driving-side rotating body 331 in the rotation direction of the driving-side rotating body 331. As a result, noise generation when starting rotational drive of the driving-side rotating body 331 is easily reduced.

(2) The urging portions 332 urge the support member 244 in the direction perpendicular to the rotation axis L5 of the driving-side rotating body 331 (radial direction). Thus, the urging forces of the urging portions 332 press the support member 244 in the direction perpendicular to the rotation axis L5 of the driving-side rotating body 331, and the support member 244 is further easily restricted from rotating ahead of the driving-side rotating body 331 in the rotation direction of the driving-side rotating body 331 when starting rotational drive of the driving-side rotating body 331. As a result, noise generation when starting rotational drive of the driving-side rotating body 331 is further easily reduced.

(3) The urging forces (elastic forces) of the urging portions 332 limit movement of the support member 244 in the axial direction relative to the driving-side rotating body 331. This reduces noise generation that would be caused by movement of the support member 244 in the axial direction.

The above embodiments may be modified as follows.

In the fifth embodiment, the support member 244 includes the lower rib 271a that contacts the flange 241a of the clutch housing 241 from the axial direction. However, the support member 244 does not necessarily have to directly contact the flange 241a as long as the ring 271 is urged in the axial direction toward the flange 241a by the urging forces of the leaf springs 253. For example, a member such as a washer may be located between the ring 271 and the flange 241a, and the ring 271 may be pressed against the flange 241a in the axial direction with the member. The same applies to the support member 244 of the sixth embodiment.

In the sixth embodiment, the ring 271 of the support member 244 is urged in the axial direction toward the flange 241a of the clutch housing 241 by the elastic force of the wave washer 301. However, the urging member for urging the ring 271 in the axial direction toward the flange 241a is not limited to the wave washer 301, and may be a spring or the like other than the wave washer 301 located between the connecting frame 311 of the fixing member 302 and the ring 271.

Figure 33:
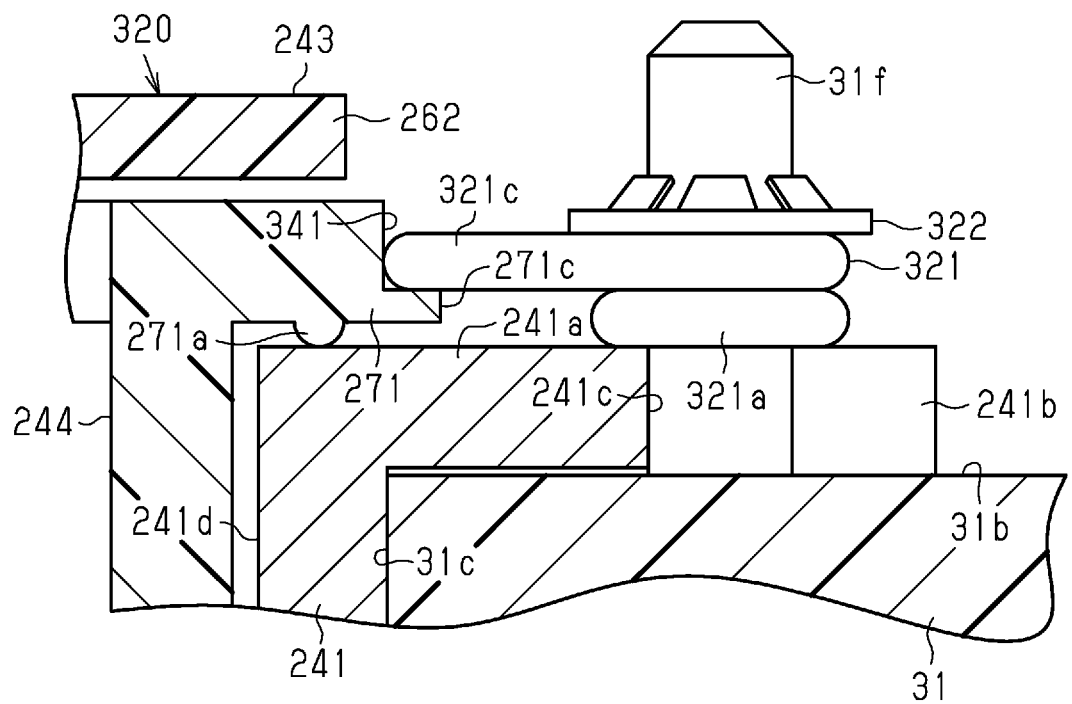
FIG. 33 is a schematic cross-sectional view of the vicinity of a clutch in a motor in another form.
Figure 34:
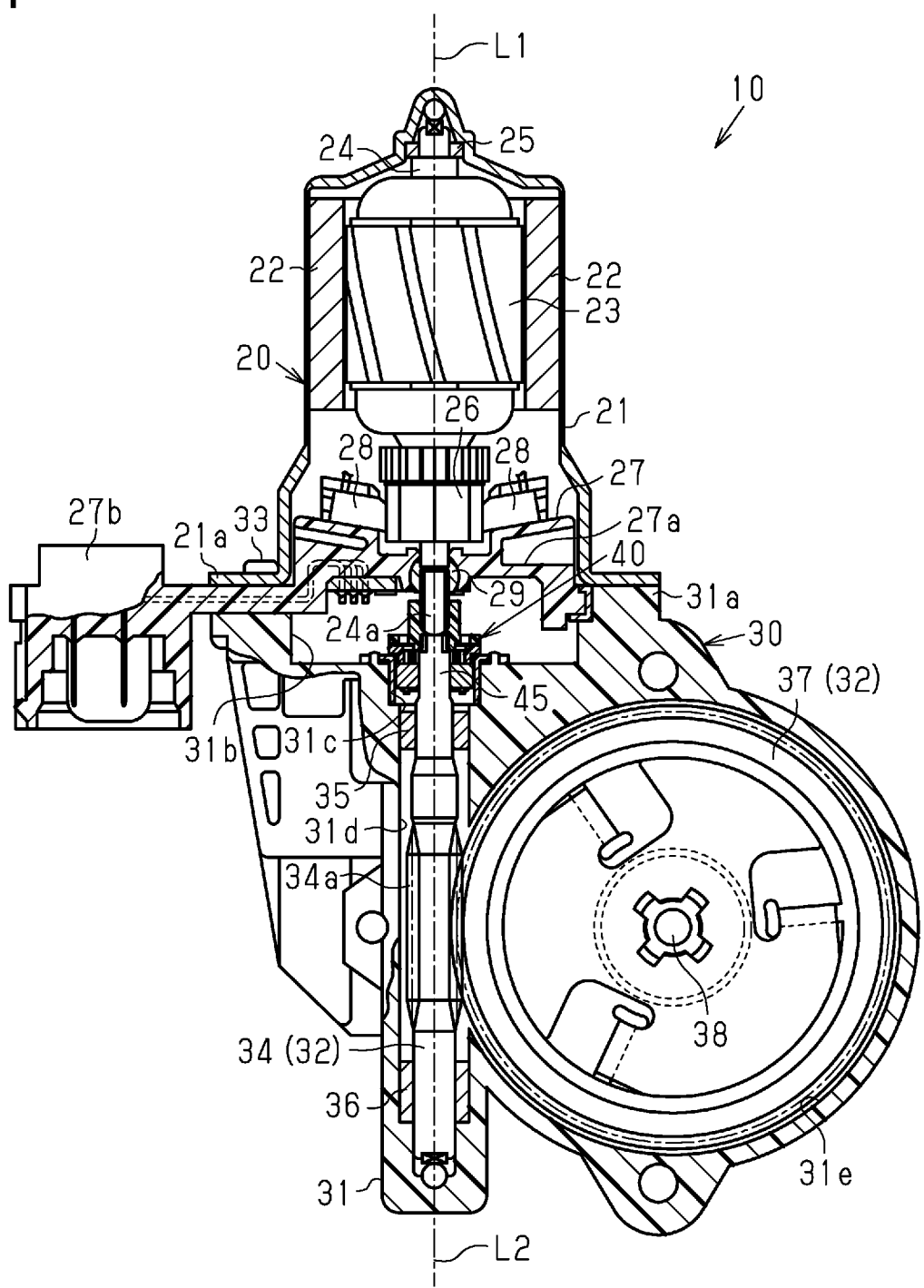
FIG. 34 is a cross-sectional view of a motor of a ninth embodiment.

As shown in FIG. 33, in the clutch 320 of the seventh embodiment, an engaging groove 341, which is open radially outward, may be provided in the outer circumferential surface 271c of the ring 271 of the support member 244. The engaging groove 341, is also open in one axial direction (upward in the example shown in FIG. 33, toward the collar 262), has a stepped shape. The engaging groove 341 is annular and provided along the entire circumference of the ring 271. The distal end portions of the urging portions 321c of the torsion springs 321 are inserted into the engaging groove 341 to urge the inner circumferential surface of the engaging groove 341 radially inward. The torsion springs 321 inserted into the engaging groove 341 restrict separation of the support member 244 from the clutch housing 241 in the axial direction.

In the seventh embodiment, the clutch 320 includes the three torsion springs 321. However, the number of the torsion springs 321 provided in the clutch 320 is not limited to three, and may be two or greater. Preferably, in this case, the arranged positions and urging forces of the torsion springs 321 are adjusted so that the rotation axis of the support member 244 are not moved away from the rotation axis of the driven-side rotating body 246 (same as central axis L2 of worm shaft 34) by the urging forces of the torsion springs 321.

The clutch 320 of the seventh embodiment includes the torsion springs 321 serving as urging members for urging the support member 244 in the direction perpendicular to the rotation axis L4 of the driving-side rotating body 243. However, springs other than the torsion springs 321 may be used as the urging members.

In the eighth embodiment, the urging portions 332 are provided at both circumferential end portions of each rolling body release portion 267, each forming the rib of the semicircular cross-sectional shape extending in the axial direction. However, the urging portions 332 are not limited to the shape and position of the eighth embodiment as long as they are provided at the driving-side rotating body 331, contact the inner circumferential surface 271d of the ring 271 in an elastically deformed state, and urge the ring 271 radially outward by their own elastic forces. For example, the urging portions 332 may form ribs extending in the axial direction and having a rectangular cross-sectional shape in a direction perpendicular to the axial direction. Alternatively, for example, the urging portions 332 may have a semispherical shape, a truncated conical shape, or the like. Alternatively, for example, the urging portions 332 may be provided at circumferentially central portions of the radially outer side surfaces of the rolling body release portions 267.

In the eighth embodiment, the two urging portions 332 are provided at each rolling body release portion 267. However, the number of the urging portions 332 provided at the driving-side rotating body 331 is not limited to this. One or more urging portions 332 may be provided in at least one of the rolling body release portions 267.

In the fifth embodiment, the shapes of the clutch housing 241, the fixing member 242, the driving-side rotating body 243, the support member 244, the rolling bodies 245, and the driven-side rotating body 246 forming the clutch 40 do not necessarily need to be the shapes in the fifth embodiment. For example, the driving-side rotating body 243 may be formed integrally with the rotation shaft 24. Further, for example, the driven-side rotating body 246 may be provided separately from the worm shaft 34, and fitted to the worm shaft 34 in an integrally rotatable manner. The number of the rolling bodies 245 is not limited to two. At least one rolling body 245 may be arranged between the inner circumferential surface 241d of the clutch housing 241 and the driven-side rotating body 246. The same applies to the clutches 300, 320, and 330 in the second to eighth embodiments.

In the above embodiments, the motor 10 is used as the drive source of the power window device but may be used as a drive source of another device.

In the above embodiments, the clutch 40, 300, 320, or 330 is provided in the motor 10 to connect the rotation shaft 24 and the worm shaft 34 of the speed reduction mechanism 32. However, the clutch 40, 300, 320, or 330 may be provided in a device other than the motor 10 to connect a rotation shaft to be rotationally driven and a driven shaft to which the rotational driving force of the rotation shaft is transmitted.

Ninth Embodiment

Hereinafter, a motor including a clutch of a ninth embodiment will now be described. In the present embodiment, same reference numerals are given to those components that are the same as the corresponding components of the first embodiment. Such components will not be described in detail. Even when different reference numerals components are given to those components that are the same as the corresponding components of the first embodiment, as long as the components are similar, the components will not be described.

The support member 43 has a ring 61 that is annular and extends around the central axis L2 of the worm shaft 34. The outer diameter of the ring 61 is larger than the inner diameter of the clutch housing 41. The ring 61 is arranged on the side of the motor unit 20 (upper side in FIG. 35) relative to the flange 41a of the clutch housing 41 and axially faces the flange 41a.

The lower projecting portion 61a that forms an annular rib in the circumferential direction of the ring 61 and contacts the flange 41a from the axial direction is provided on the lower surface of the ring 61 (axial end face facing flange 41a). The upper projecting portions 61b having a substantially semispherical shape and projecting in the axial direction are provided on the upper surface of the ring 61 (axial end face facing the collar 52). In the present embodiment, the upper projecting portions 61b are spaced apart in the circumferential direction and provided at four locations. The upper projecting portions 61b have distal end portions axially contacting the collar 52 from the side of the output unit 30.

The rolling body holding portions 62 projecting from the ring 61 in the rotation axis direction of the driving-side rotating body 42 (same as direction of central axis L1) are formed at two circumferentially spaced locations on the inner circumferential side of the ring 61 (two locations at 180° intervals in the present embodiment). The two rolling body holding portions 62 each hold the columnar rolling body 44 extending in the axial direction.

Each rolling body holding portion 62 has two supports 464a and 464b projecting toward the side opposite to the ring 61 (downward in FIG. 38A) from both circumferential end portions of the axial support portion 63 in the axial direction (direction of central axes L1 and L2). That is, at each rolling body holding portion 62, the two supports 464a and 464b project in the rotation axis direction of the driving-side rotating body 42 on both sides of the rolling body 44 in the rotation direction X1. The two supports 464a and 464b extend parallel to each other in the axial direction. In each rolling body holding portion 62, the two supports 464a and 464b hold the rolling body 44 from both sides in the rotation direction X1 so that the central axis L3 is parallel to the central axis L1. In the two supports 464a and 464b of each rolling body holding portion 62, when the clutch 40 is viewed in the axial direction from the side of the motor unit 20 (that is, in a state shown in FIG. 39A), the support located on the counterclockwise side of the rolling body 44 is referred to as a first support 464a, and the support located on the clockwise side of the rolling body 44 is referred to as a second support 464b.

Figure 38A:
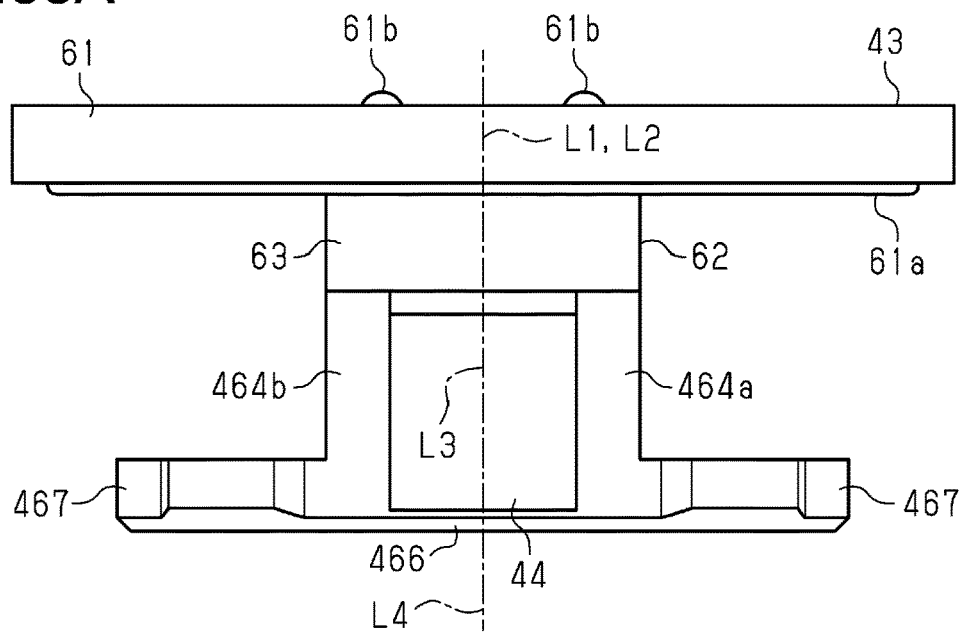
FIG. 38A is a side view of the support member holding the rolling bodies of the ninth embodiment.
Figure 38B:
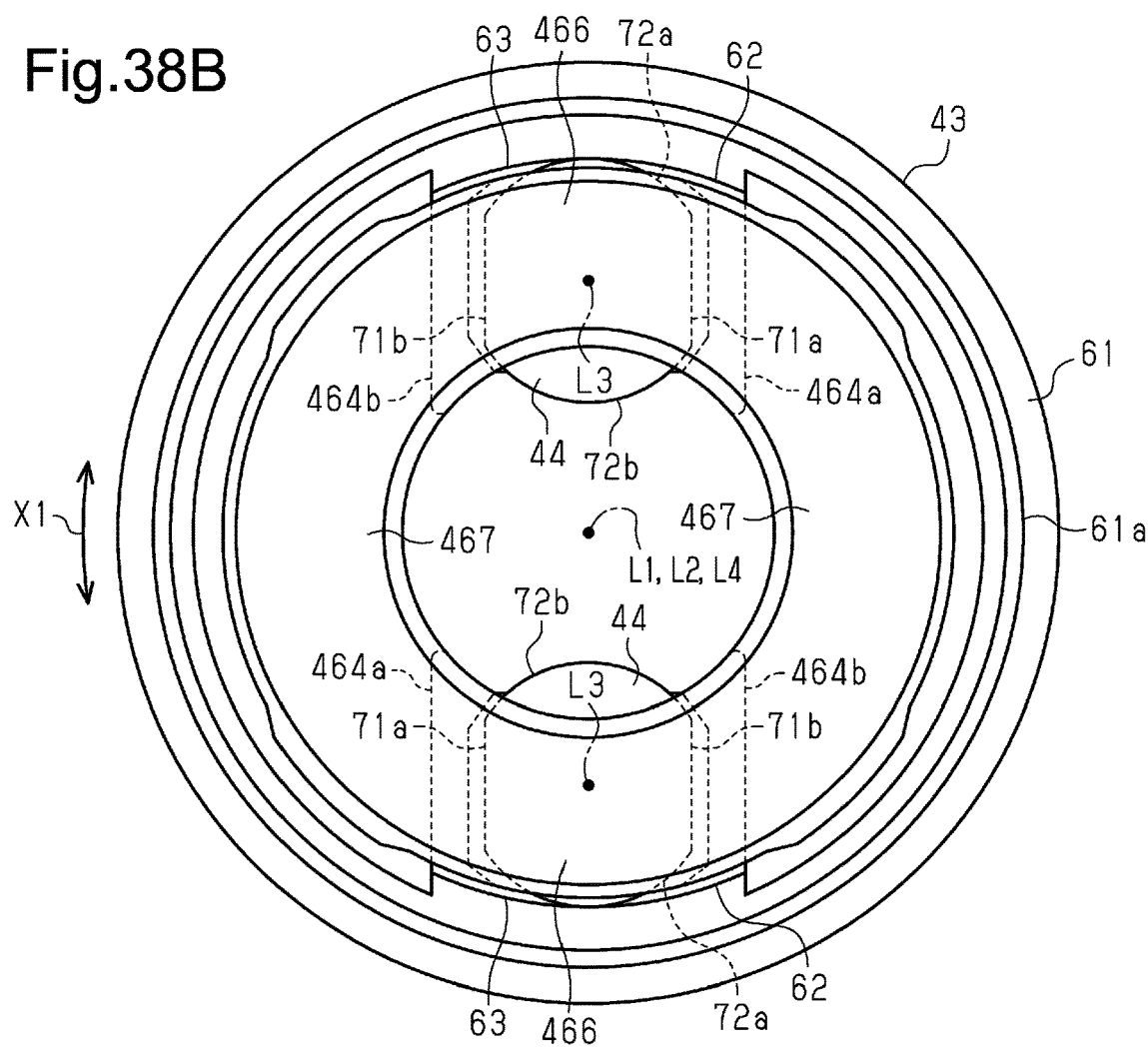
FIG. 38B is a bottom view of the support member.

As shown in FIG. 38B, the distance between the first and second supports 464a and 464b facing each other at each rolling body holding portion 62 is less than the largest outer diameter of the rolling body 44 (that is, the longitudinal width of the rolling body 44 in an axial view). Further, the distance between the first and second supports 464a and 464b facing each other at each rolling body holding portion 62 is slightly greater than the width of the rolling body 44 in the rotation direction X1 (length between the first opposed surface 71a and the second opposed surface 71b, transverse width of the rolling body 44 in axial view).

Figure 37:
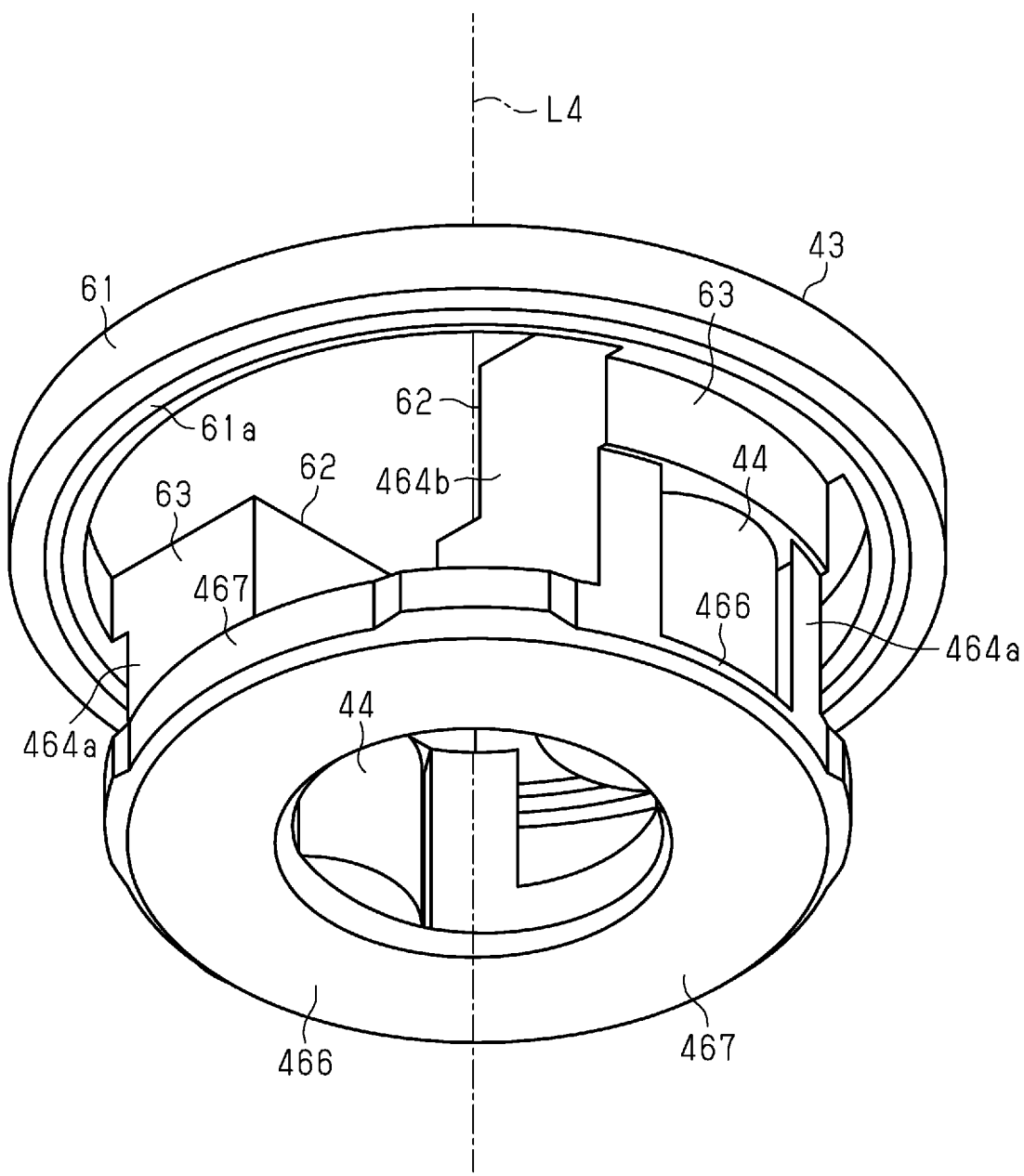
FIG. 37 is a perspective view of a support member holding rolling bodies of the ninth embodiment.

As shown in FIGS. 37, 38A, and 38B, in each rolling body holding portion 62, a distal end portion of the first support 464a in the rotation axis direction of the driving-side rotating body 42 (same as direction of rotation axis L4 of support member 43) and a distal end portion of the second support 464b in the rotation axis direction of the driving-side rotating body 42 are connected by a support connecting portion 466. The support connecting portions 466 of the present embodiment are provided integrally with the support member 43. The support connecting portions 466 have a flat plate shape with a width substantially equal to the radial width of the first and second supports 464a and 464b. The support connecting portions 466 have the shape of an arc extending around the rotation axis L4 of the support member 43 when viewed from the axial direction. Each support connecting portion 466 contacts one axial end face of the rolling body 44 from the axial direction to restrict separation of the rolling body 44 from the rolling body holding portion 62 in the axial direction.

Further, the support member 43 has connecting portions 467, each connecting the distal end portion of the first support 464a of one of the rolling body holding portions 62 in the rotation axis direction of the driving-side rotating body 42 (same as direction of rotation axis L4) and the distal end portion of the second support 464b of the other rolling body holding portion 62, which is adjacent to the first support 464a in the rotation direction X1, in the rotation axis direction of the driving-side rotating body 42. The connecting portions 467 are provided integrally with the first and second supports 464a and 464b and shaped as an arc extending around the rotation axis L4 in an axial view. In the present embodiment, the radial width of the connecting portions 467 is substantially equal to the radial width of the support connecting portions 466.

Figure 35:
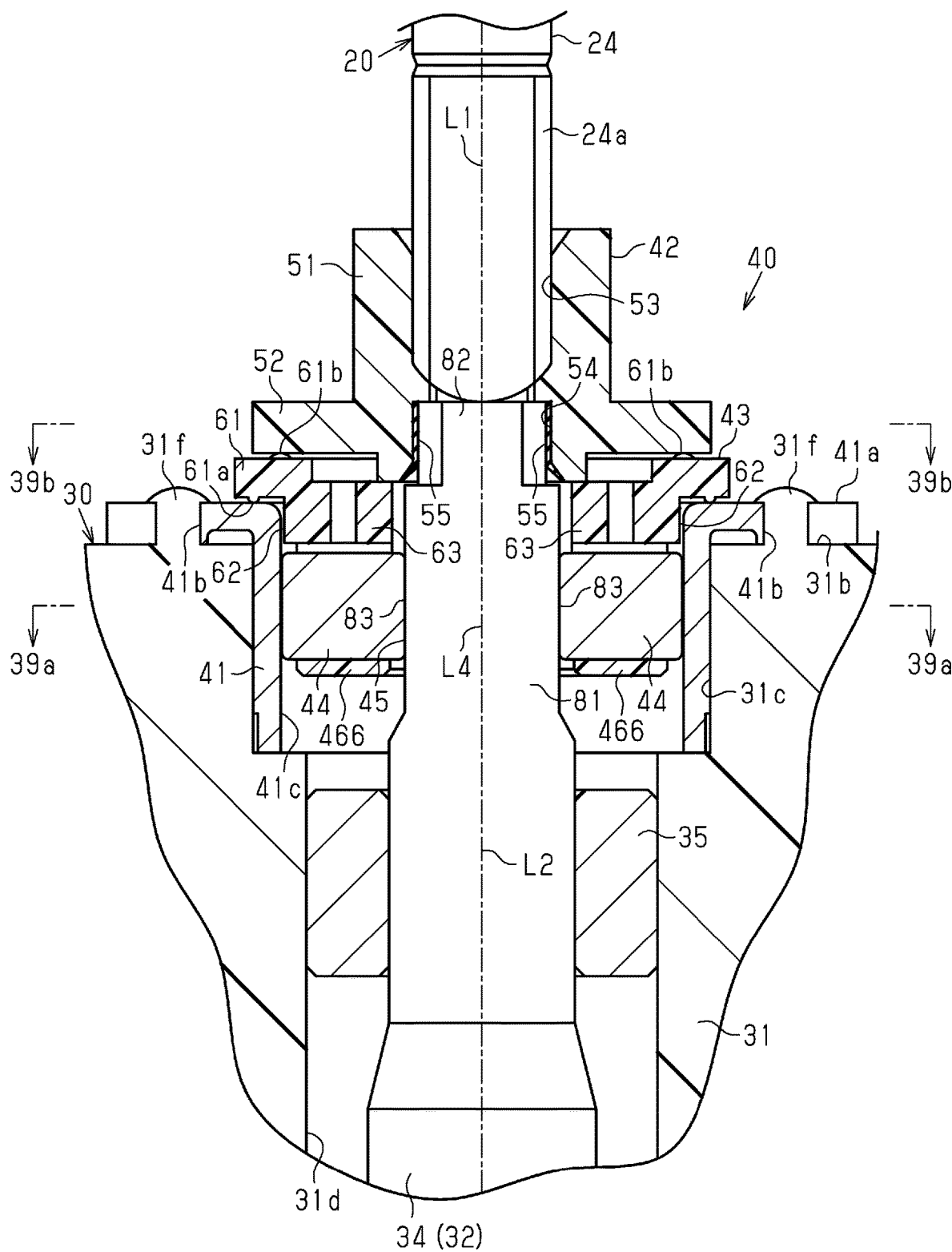
FIG. 35 is a partial enlarged cross-sectional view of the motor of the ninth embodiment.
Figure 36:
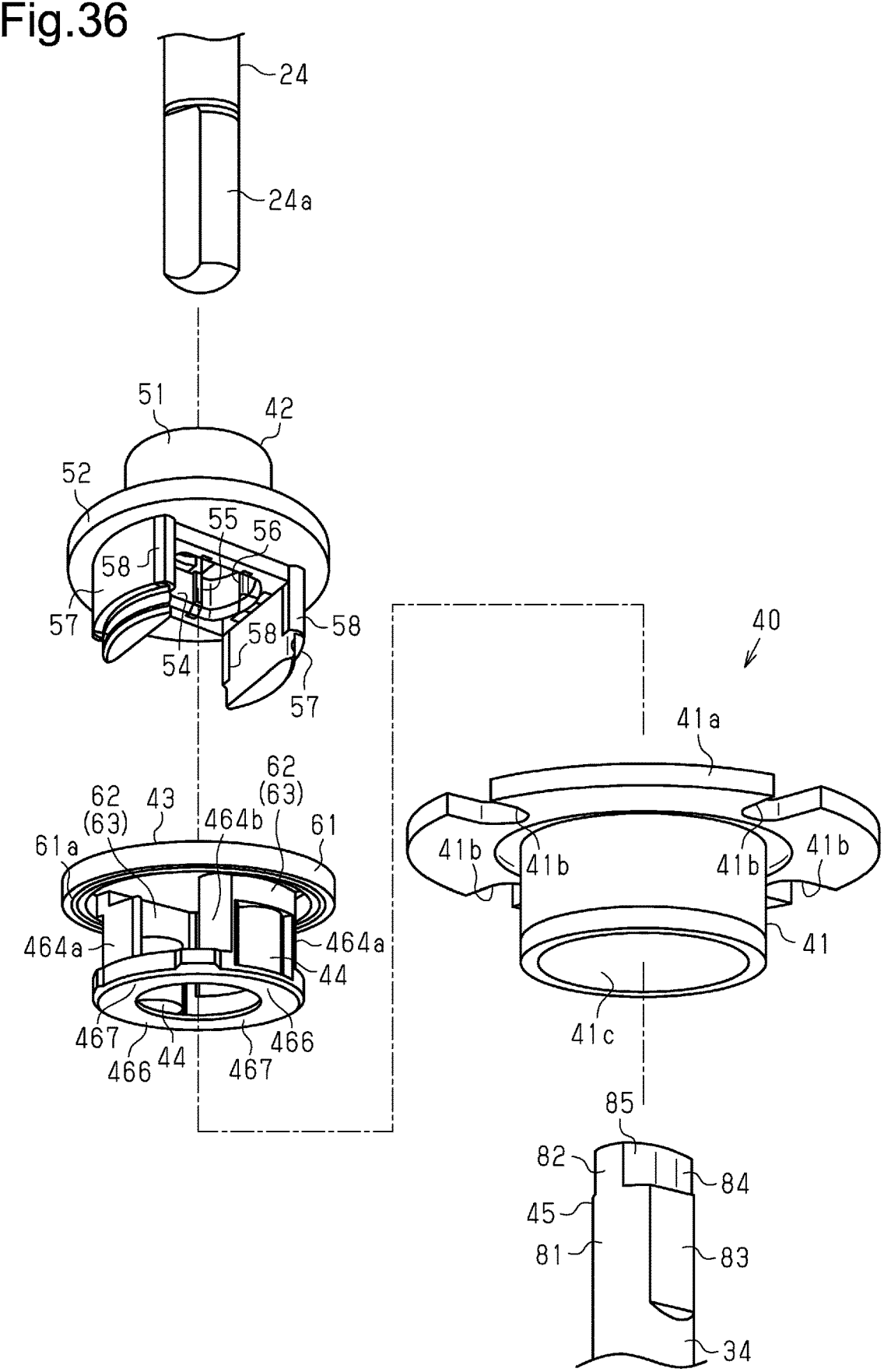
FIG. 36 is an exploded perspective view of a clutch of the ninth embodiment.
Figure 39A:
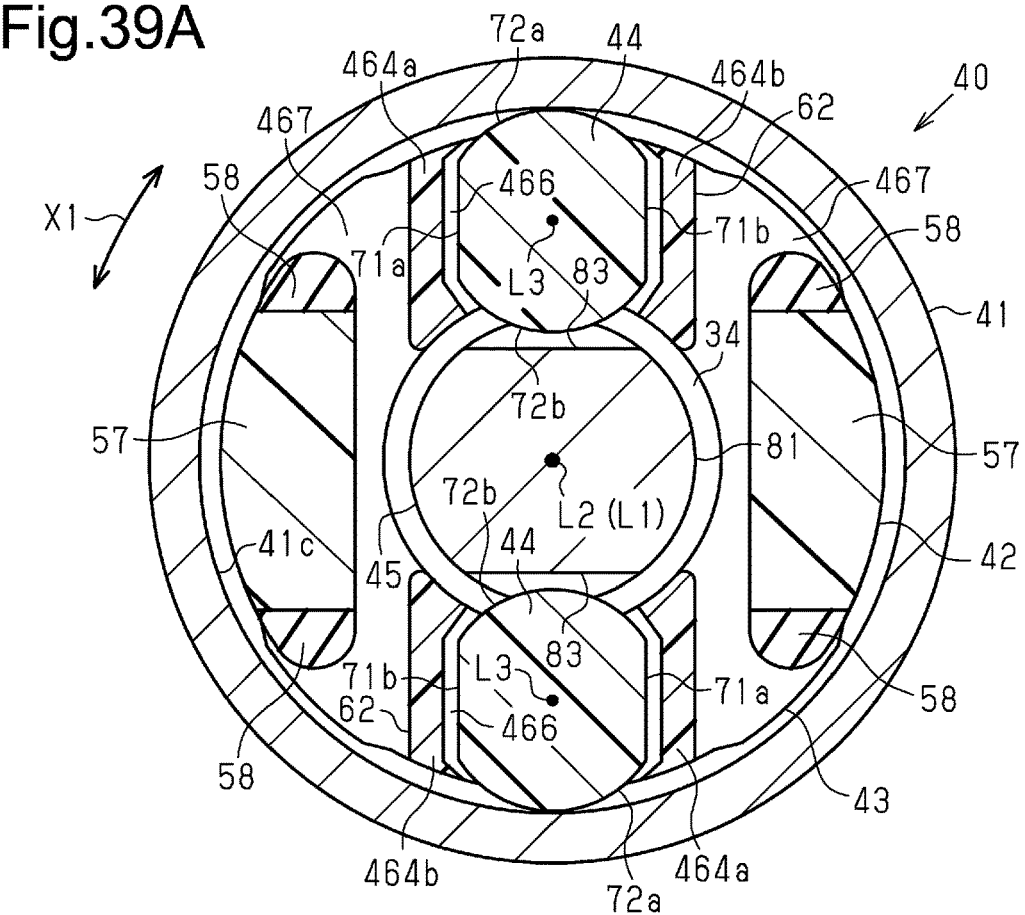
FIG. 39A is a cross-sectional view of the clutch of the ninth embodiment (cross-sectional view taken along line 39a-39a in FIG. 35)
Figure 39B:
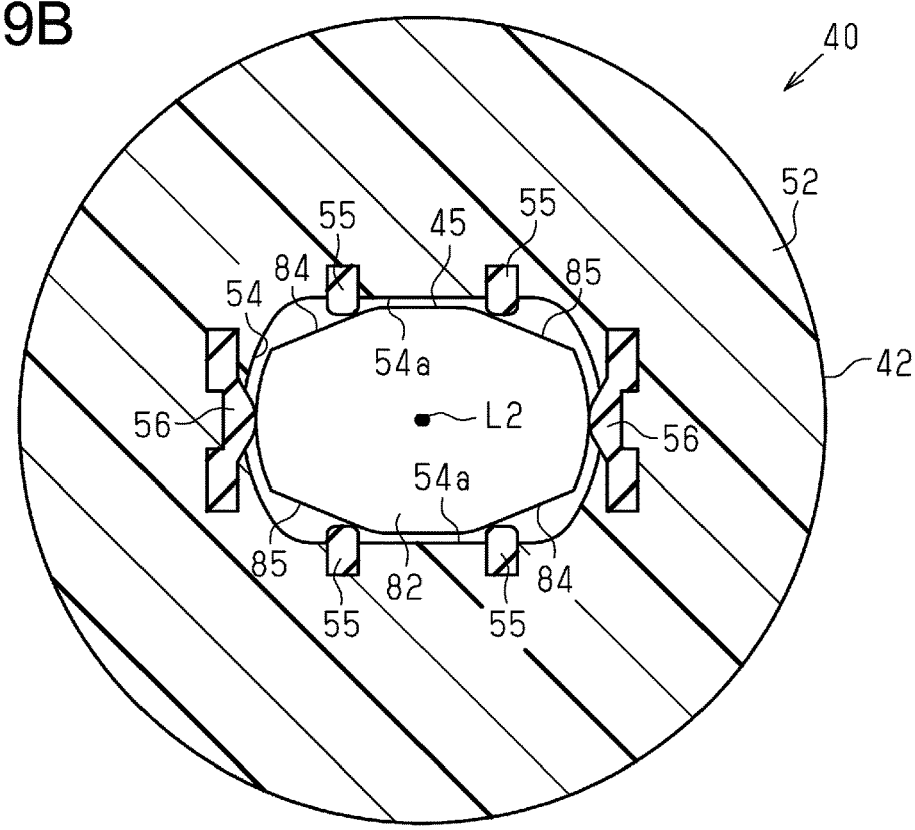
FIG. 39B is a cross-sectional view of the clutch (cross-sectional view taken along line 39b-39b in FIG. 35).

As shown in FIGS. 35 and 39A, the two rolling bodies 44 are held by the support member 43 and spaced apart at equal angular intervals (at 180° intervals in the present embodiment) in the rotation direction X1. Since the rolling body holding portions 62 holding the rolling bodies 44 are inserted and arranged in the clutch housing 41, the rolling bodies 44 radially face the clutch housing 41 inside the clutch housing 41. The support member 43 is rotatable in the rotation direction X1 relative to the clutch housing 41.

The rolling body release portions 57 of the driving-side rotating body 42 are inserted into the clutch housing 41 through the inner circumferential side of the ring 61 of the support member 43. Further, each rolling body release portion 57 is arranged between the two rolling body holding portions 62, and is adjacent to the rolling body holding portions 62 in the rotation direction X1. Thus, both end portions (elastic portions 58) of each rolling body release portion 57 in the rotation direction X1 face the first support 464a of one of the rolling body holding portions 62 and the second support 464b of the other rolling body holding portion 62 in the rotation direction X1. The support member 43 and the driving-side rotating body 42 are relatively rotatable in the rotation direction X1. When the driving-side rotating body 42 rotates, each rolling body release portion 57 comes into contact with the first support 464a or the second support 464b located forward in the rotation direction from the rotation direction.

The operation of the motor 10 will now be described focusing on the operation of the clutch 40.

Figure 40A:
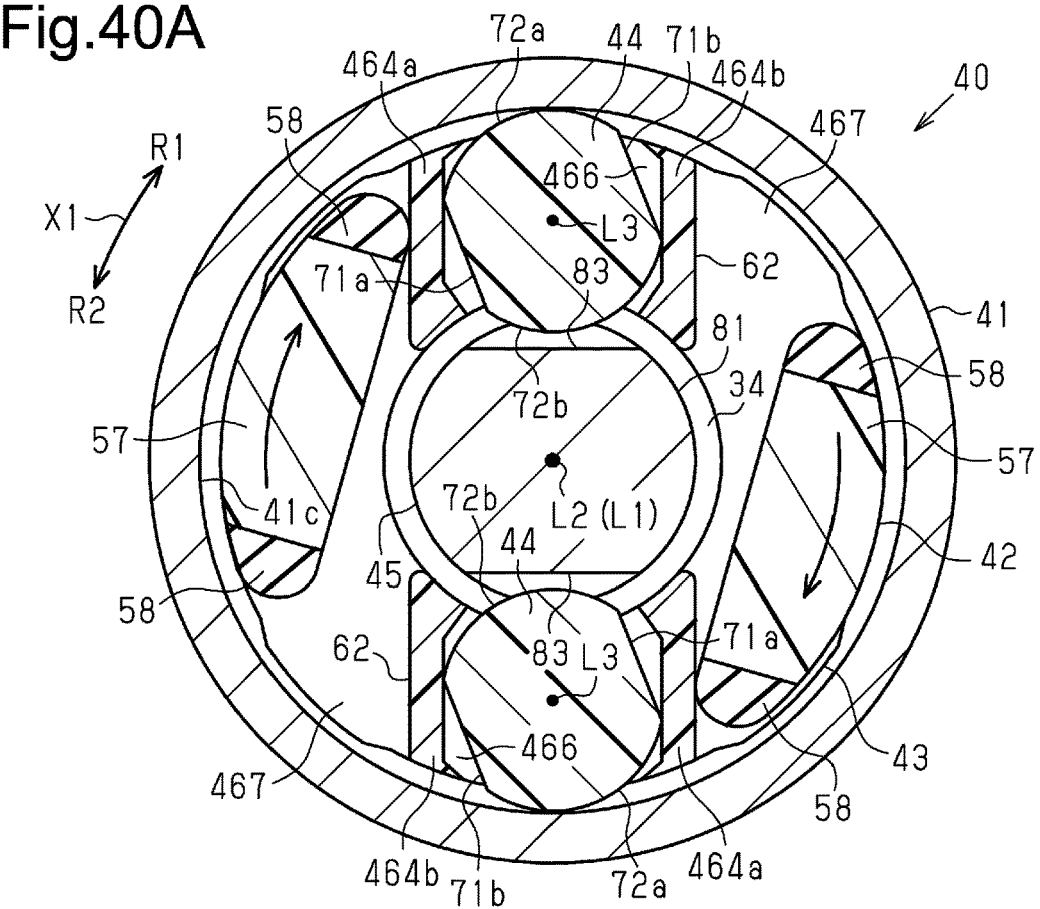
FIGS. 40A and 40B are cross-sectional views illustrating the operation of the clutch of the ninth embodiment.
Figure 40B:
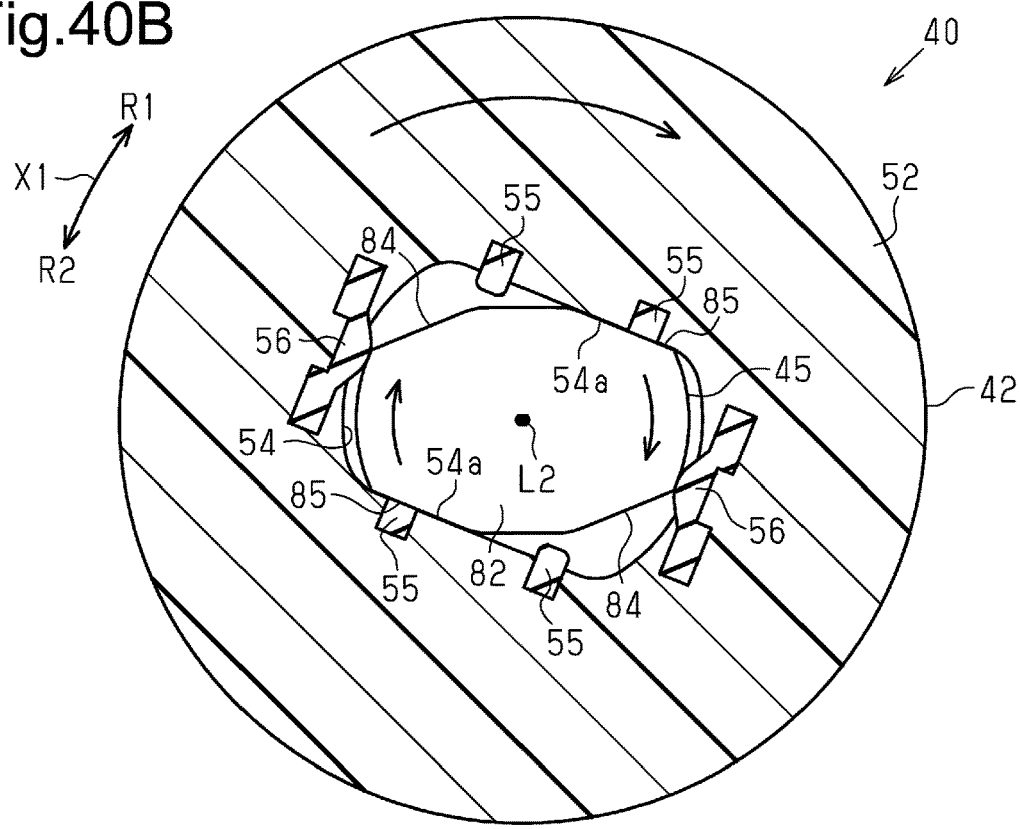

As shown in FIGS. 35 and 40A, when the motor unit 20 is driven by energizing the motor unit 20, the driving-side rotating body 42 rotates together with the rotation shaft 24. That is, the rotational drive of the driving-side rotating body 42 is started. FIGS. 40A and 40B illustrate a case where the driving-side rotating body 42 is rotationally driven in the first direction R1. As shown in FIG. 40A, as the driving-side rotating body 42 rotates in the first direction R1, the circumferential end portions (elastic portions 58) of the rolling body release portions 57 of the driving-side rotating body 42 on the front sides in the rotation direction come into contact with the first supports 464a of the rolling body holding portions 62 in the rotation direction.

As shown in FIGS. 37 and 40A, in each rolling body holding portion 62, the distal end portions of the two first and second supports 464a and 464b in the direction of the rotation axis L4 are connected by the support connecting portion 466. Thus, when starting rotational drive of the driving-side rotating body 42, each pair of the first and second supports 464a and 464b is restricted from being elastically deformed and opened in the rotation direction so as to move away from each other by the impact of the rolling body release portion 57 coming into contact with the rolling body holding portion 62 from the rotation direction of the driving-side rotating body 42. Consequently, the support member 43 is restricted from being forced in the rotation direction relative to the driving-side rotating body 42 by an elastic force resulting from the elastic deformation of at least one of the first and second supports 464a and 464b. Thus, when starting rotational drive of the driving-side rotating body 42, the support member 43 is restricted from being forced in the rotation direction of the driving-side rotating body 42 (first direction R1 in the example shown in FIG. 40) and rotated ahead of the driving-side rotating body 42 by the impact of the rolling body release portions 57 coming into contact with the first supports 464a from the rotation direction of the driving-side rotating body 42. Consequently, after the rolling body release portions 57 come into contact with the first supports 464a from the rotation direction of the driving-side rotating body 42, the driving-side rotating body 42 and the support member 43 easily rotate integrally. Then, the rolling body release portions 57 contacting the first supports 464a of the rolling body holding portions 62 in the rotation direction press the rolling bodies 44 in the first direction R1 with the first supports 464a to release the rolling bodies 44 held between the inner circumferential surface 41c of the clutch housing 41 and control surfaces 83 of the driven-side rotating body 45.

Further, as shown in FIG. 40B, the driving-side rotating body 42 is connected to the driven-side rotating body 45 in an integrally rotatable manner by the driving-side transmission surfaces 54a coming into contact with the second driven-side transmission surfaces 85 of the driven-side connecting portion 82 from the first direction R1.

After the rolling bodies 44 held between the inner circumferential surface 41c of the clutch housing 41 and the driven-side rotating body 45 are released by the rolling body holding portions 62 pressed in the rotation direction of the driving-side rotating body 42 by the driving-side rotating body 42 (rolling body release portions 57), the driven-side rotating body 45 may act to hold the rolling bodies 44 again with the inner circumferential surface 41c of the clutch housing 41. However, the present embodiment restricts the support member 43 from rotating ahead of the driving-side rotating body 42. This facilitates integral rotation of the driving-side rotating body 42 and the support member 43. Thus, integral rotation of the driving-side rotating body 42 and the support member 43 immediately releases the rolling bodies 44 held between the inner circumferential surface 41c of the clutch housing 41 and the driven-side rotating body 45.

While the driving-side rotating body 42 and the support member 43 are integrally rotating with the rolling body release portions 57 pressing the first supports 464a and the rolling bodies 44 in the first direction R1, the rolling bodies 44 are arranged at circumferentially central portions of the control surfaces 83. That is, the rolling bodies 44 shift to an unlocked state in which the rolling bodies 44 are not held between the control surfaces 83 and the clutch housing 41 (that is, rolling bodies 44 do not interfere with rotation of driven-side rotating body 45). In the unlocked state, the rotational driving force of the driving-side rotating body 42 (rotation shaft 24) is transmitted to the driven-side rotating body 45 (worm shaft 34), and the rotation shaft 24 and the worm shaft 34 integrally rotate in the first direction R1. The rotation of the worm shaft 34 in the first direction R1 is transmitted to the output shaft 38 while being decelerated between the worm shaft 34 and the worm wheel 37, and is output from the output shaft 38. Then, the vehicle window glass is raised or lowered with the window regulator (not shown) in accordance with the rotation direction of the output shaft 38. When the motor unit 20 is de-energized, the rotational drive of the rotation shaft 24, that is, the rotational drive of the driving-side rotating body 42 is stopped.

When the driving-side rotating body 42 is rotated in a second direction R2 by the drive of the motor unit 20, the clutch 40, of which the components rotate in the opposite direction, connects the rotation shaft 24 and the worm shaft 34 through the same actions as described above when the driving-side rotating body 42 is rotated in the first direction R1.

Figure 41A:
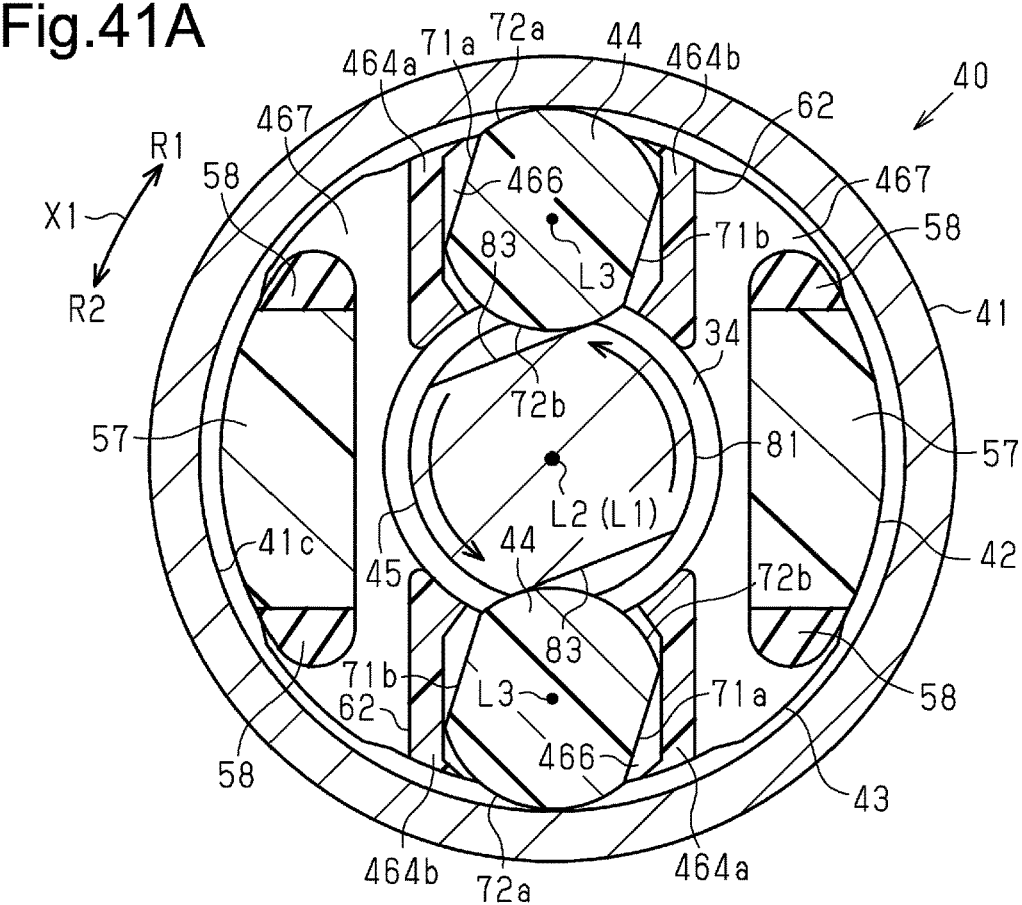
FIGS. 41A and 41B are cross-sectional views illustrating the operation of the clutch of the ninth embodiment.
Figure 41B:
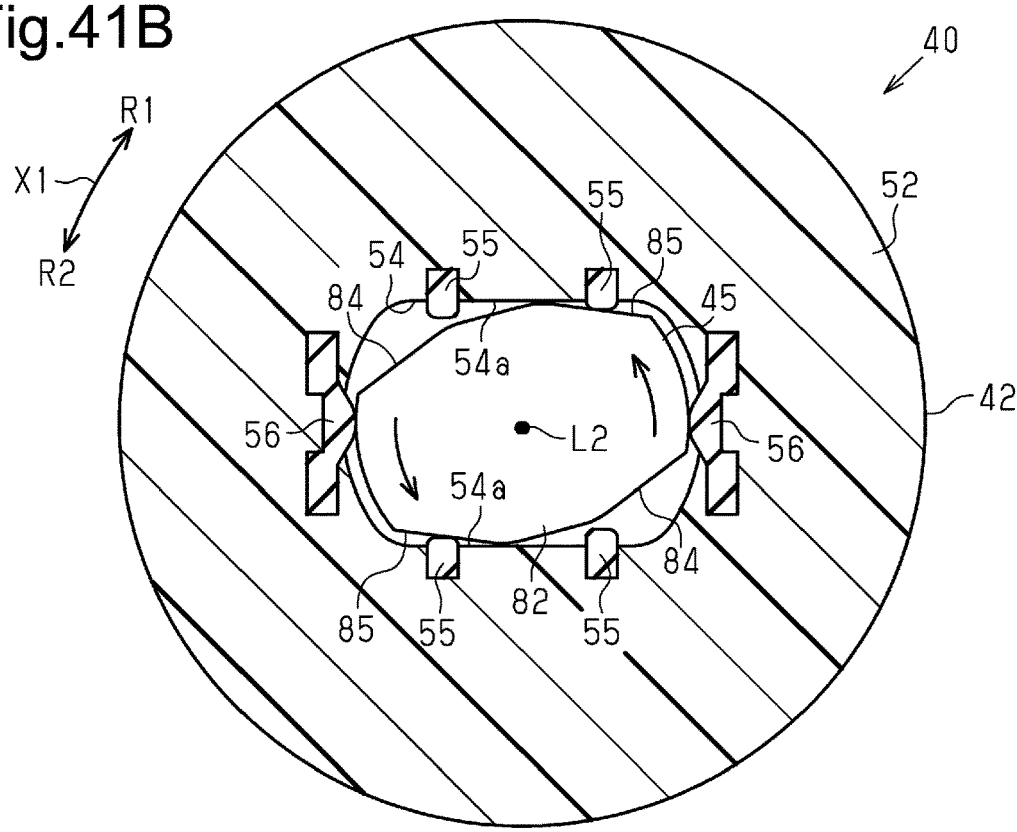

As shown in FIGS. 41A and 41B, when a load is applied from the load side (window regulator side in the present embodiment) to the output shaft 38 in a state where the drive of the motor unit 20 is stopped, that is, when the rotation shaft 24 (driving-side rotating body 42) is not rotationally driven, the driven-side rotating body 45 is easily rotated by the load. FIGS. 41A and 41B illustrate a case where the driven-side rotating body 45 acts to rotate in the second direction R2. Then, the control surfaces 83 of the driven-side rotating body 45 press the rolling bodies 44 arranged between the control surfaces 83 and the inner circumferential surface 41c of the clutch housing 41 to the outer circumferential side. In each rolling body 44 pressed by the control surface 83, the first arcuate surface 72a contacts the inner circumferential surface 41c of the clutch housing 41 between the two supports 464a and 464b, and the second arcuate surface 72b contacts a portion of the control surface 83 closer to a circumferential end portion than to the circumferential center of the control surface 83 (rearward end portion of the control surface 83 in the second direction R2). Then, each rolling body 44 is held between the portion of the control surface 83 closer to the rearward end portion in the second direction R2 and the inner circumferential surface 41c of the clutch housing 41. Thus, the rolling bodies 44 serve as wedges to stop the rotation (rotation in second direction R2) of the driven-side rotating body 45 (that is, to lock rotation of the worm shaft 34). Consequently, the output shaft 38 is restricted from being rotated when the rotation shaft 24 (driving-side rotating body 42) is not rotationally driven. In a state where the driven-side rotating body 45 is arranged in a locked position (a position to hold the rolling bodies 44 with the clutch housing 41) (a state shown in FIG. 41A), as shown in FIG. 41B, the second driven-side transmission surfaces 85 of the driven-side connecting portion 82 do not contact the driving-side transmission surfaces 54a of the driving-side rotating body 42 in the rotation direction (second direction R2).

Also, in a case where the driven-side rotating body 45 acts to rotate in the first direction R1 when the motor unit 20 (driving-side rotating body 42) is not driven, the rotation of the driven-side rotating body 45 is stopped in the same manner. That is, each rolling body 44 is held between a portion of the control surface 83 closer to a rearward end portion in the first direction R1 and the inner circumferential surface 41c of the clutch housing 41. Thus, the rolling bodies 44 serve as wedges to stop the rotation of the driven-side rotating body 45 (rotation in the first direction R1) (that is, to lock the rotation of the worm shaft 34).

The advantages of the present embodiment will now be described.

(1) When starting rotational drive of the driving-side rotating body 42, the driving-side rotating body 42 and the rolling body holding portions 62 are prevented from repeatedly separating from and coming into contact with each other in the rotation direction of the driving-side rotating body 42. This reduces noise generation when starting rotational drive of the driving-side rotating body 42. The motor 10 is provided with the clutch 40 in which noise generation when starting rotational drive of the driving-side rotating body 42 is reduced, and noise generation in the motor 10 when starting rotational drive of the rotation shaft 24 is reduced.

(2) Each support connecting portion 466 that connects the distal end portions of the two first and second supports 464a and 464b in the rotation axis direction of the driving-side rotating body 42 contacts one axial end face of the rolling body 44 from the axial direction. Accordingly, the support connecting portions 466 restricts the pairs of first and second supports 464a and 464b from being elastically deformed and opening in the rotation direction and moved away from each other by the impact of the driving-side rotating body 42 coming into contact with the rolling body holding portions 62 from the rotation direction of the driving-side rotating body 42. This limits separation of the rolling bodies 44 from the rolling body holding portions 62 in the axial direction.

(3) The support connecting portions 466 are provided integrally with the support member 43. This limits an increase in the number of parts resulting from the employment of the support connecting portions 466. Thus, noise generation when starting rotational drive of the driving-side rotating body 42 is reduced without increasing the number of parts.

(4) The clutch 40 includes the connecting portions 467, each connecting the axially distal end portion of the first support 464a of one of the two rolling body holding portions 62 adjacent to each other in the rotation direction of the support member 43 and the axially distal end portion of the second support 464b of the other rolling body holding portion 62, adjacent to the first support 464a, in the rotation direction of the support member 43. That is, in the two rolling body holding portions 62 that are adjacent to each other in the rotation direction of the driving-side rotating body 42, the distal end portions of the two supports 464a and 464b in the rotation axis direction of the driving-side rotating body 42 between the two rolling bodies 44 held by the two rolling body holding portions 62 are connected by the connecting portion 467. Generally, dimensional errors, assembly errors, or the like in the driving-side rotating body 42 and the support member 43 may hinder simultaneous contact of the rolling body release portions 57 with all the rolling body holding portions 62 when starting rotational drive of the driving-side rotating body 42. That is, when starting rotational drive of the driving-side rotating body 42, if one of the rolling body release portions 57 comes into contact with one of the rolling body holding portions 62 from the rotation direction, the other rolling body release portion 57 may not come into contact with the other rolling body holding portion 62 from the rotation direction. Even in such a case, in the clutch 40 of the present embodiment, the pressing force in the rotation direction of the driving-side rotating body 42 applied to one of the rolling body holding portions 62 is transmitted through the connecting portion 467 to the other rolling body holding portion 62. That is, the pressing force in the rotation direction of the driving-side rotating body 42 is applied to the other rolling body holding portion 62 with the connecting portion 467. Consequently, the two rolling bodies 44 held by the two rolling body holding portions 62 adjacent to each other in the rotation direction of the driving-side rotating body 42 are restricted from being released from between the inner circumferential surface 41c of the clutch housing 41 and the driven-side rotating body 45 at different timings. Accordingly, when starting rotational drive of the driving-side rotating body 42, the rolling bodies 44 held between the inner circumferential surface 41c of the clutch housing 41 and the driven-side rotating body 45 are released more smoothly.

Tenth Embodiment

A motor including a clutch of a tenth embodiment will now be described. In the present embodiment, the same reference numerals are assigned to the same components and corresponding components as and to those of the ninth embodiment without explanations of them.

Figure 42:
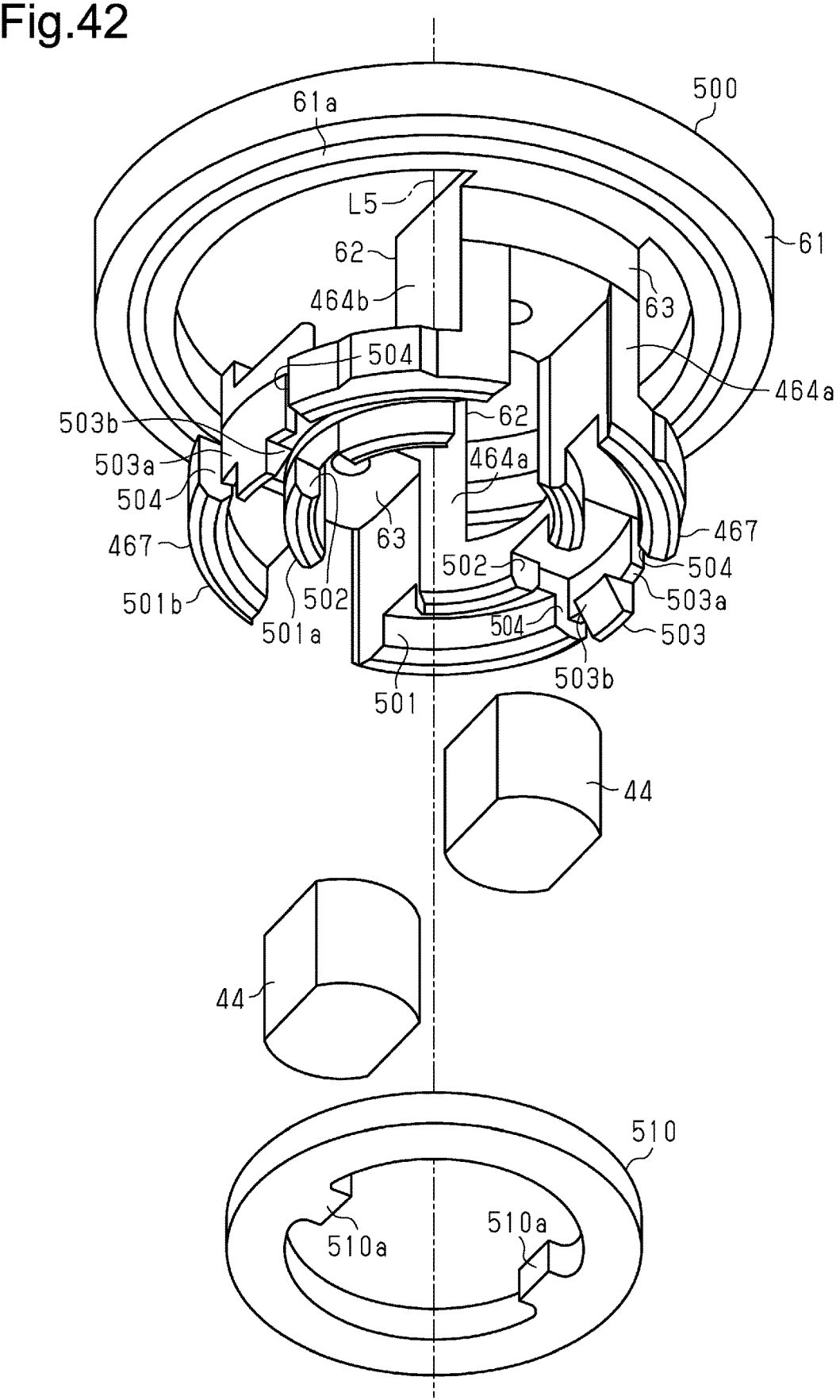
FIG. 42 is an exploded perspective view of a support member, rolling bodies, and a support connecting portion of a tenth embodiment.

As shown in FIG. 42, a support member 500 of the present embodiment is provided in the clutch 40 of the ninth embodiment in place of the support member 43 of the ninth embodiment. The support member 500 is configured to include a support connecting portion 510 in place of the support connecting portions 466 of the support member 43 of the ninth embodiment.

The support member 500 is provided with a substantially annular housing recess 501 extending over the distal end portions of the two pairs of supports 464a and 464b in the direction of the rotation axis L5 of the support member 500 and the two connecting portions 467. The housing recess 501 is recessed in the axial direction (direction of the rotation axis L5) and is open in a direction opposite to the ring 61.

In the support member 500, positioning recesses 502 are provided at two locations in a portion forming a side wall of the housing recess 501 at equal angular intervals (at 180° intervals) in the circumferential direction (rotation direction of support member 500). In the present embodiment, the positioning recesses 502 are provided at circumferentially central portions of the connecting portions 467, radially extend through a radially inner side wall 501a of the housing recess 501, and open in an axial direction (opposite to the ring 61).

In the support member 500, engaging claws 503 are provided at a portion forming a side wall of the housing recess 501, at two locations at equal angular intervals in the circumferential direction (at 180° intervals). The two engaging claws 503 are provided at a radially outer side wall 501b of the housing recess 501 in positions at circumferentially central portions of the connecting portions 467 to radially face the two positioning recesses 502. Two separation grooves 504 that are recessed from the distal end to the proximal end of the side wall 501b, radially extending through the side wall 501b are provided on both sides of each engaging claw 503 in the circumferential direction. Each engaging claw 503 includes an extending portion 503a, which extends from the bottom of the housing recess 501 in the axial direction opposite to the ring 61 between the two separation grooves 504, and an engaging portion 503b, which projects radially inward from a distal end portion of the extending portion 503a. The extending portion 503a is elastically deformable so that its distal end portion radially moves relative to its proximal end portion. The engaging portion 503b projects radially inward from the inner circumferential surface of the side wall 501b. In the housing recess 501, portions between the engaging claws 503 and the positioning recesses 502 are partially formed deeply.

The support connecting portion 510 is made of a material having a mass per unit volume larger than that of a resin material of the support member 500. Thus, the support connecting portion 510 is larger in mass per unit volume than the support member 500. In the present embodiment, the support connecting portion 510 is made of a metal material to serve as a weight for the support member 500 (weight for adding mass to the support member 500).

The support connecting portion 510 has an annular plate shape. The axial thickness of the support connecting portion 510 is slightly smaller than the axial depth of the housing recess 501. The inner diameter of the support connecting portion 510 is substantially equal to the inner diameter of the housing recess 501 (outer diameter of the side wall 501a), and the outer diameter of the support connecting portion 510 is substantially equal to the outer diameter of the housing recess 501 (inner diameter of the side wall 501b).

The support connecting portion 510 has positioning protrusions 510a projecting radially inward at two locations at equal angular intervals in the circumferential direction (at 180° intervals). The two positioning protrusions 510a are formed in conformance with the two positioning recesses 502 provided in the support member 500 and have a circumferential width equal to the circumferential width of the positioning recesses 502.

Figure 43:
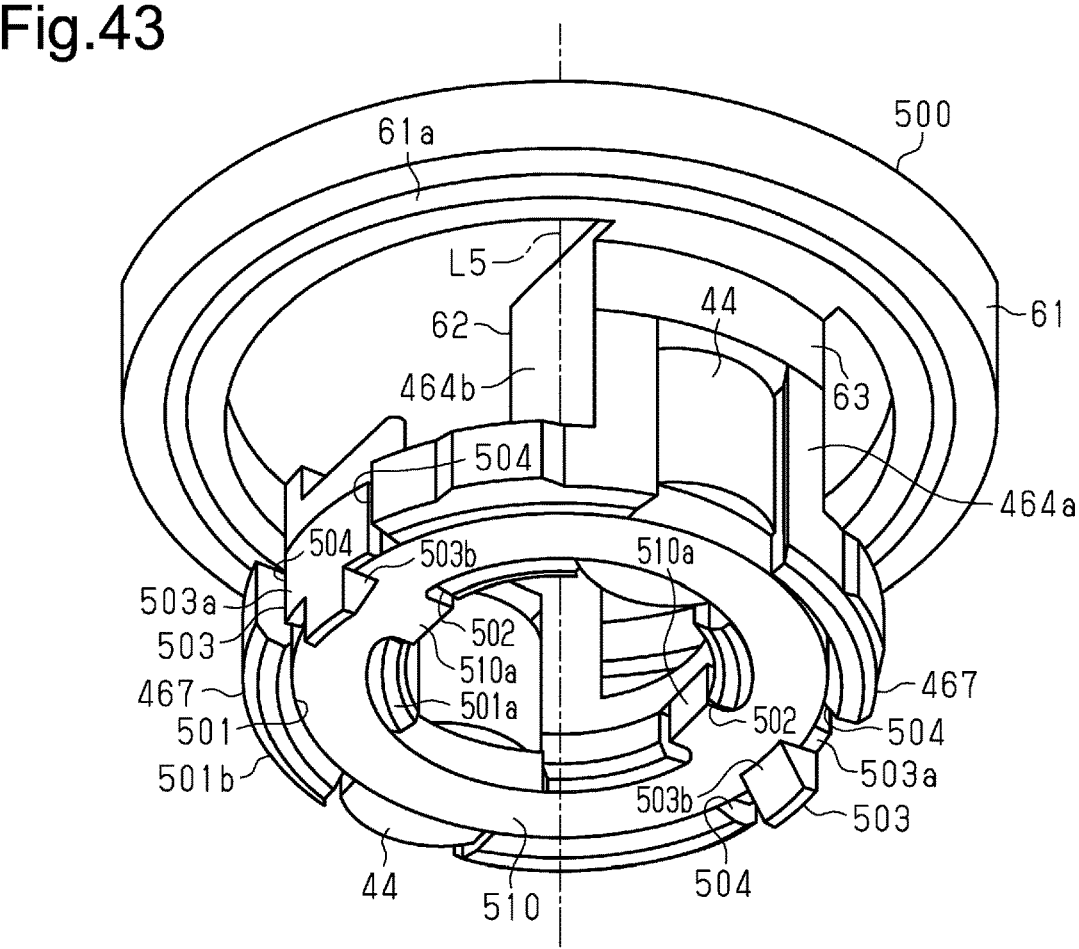
FIG. 43 is a perspective view of the support member to which the support connecting portion is fitted of the tenth embodiment.

As shown in FIGS. 42 and 43, the support connecting portion 510 is coupled to the support member 500 after the rolling bodies 44 are inserted between the pairs of supports 464a and 464b of the support member 500 from the distal end side of the supports 464a and 464b in the direction of the rotation axis L5. The support connecting portion 510 is inserted into the housing recess 501, elastically deforming the extending portions 503a of the engaging claws 503 to the outer circumferential side. At this time, the support connecting portion 510 is inserted into the housing recess 501 so that the two positioning protrusions 510a are inserted into the two positioning recesses 502. When the support connecting portion 510 is inserted into the housing recess 501 until it comes into contact with the bottom of the housing recess 501, the extending portions 503a return to the original shape, and the engaging portions 503b axially contact the support connecting portion 510 from the side opposite to the bottom of the housing recess 501. The engaging portions 503b restrict separation of the support connecting portion 510 from the support member 500. That is, the engaging portions 503b are coupled to the support member 500. The support connecting portion 510 coupled to the support member 500 connect the distal end portions of the pairs of first and second supports 464a and 464b in the direction of the rotation axis L5 to each other with the support connecting portion 510. In this state, engagement of the positioning protrusions 510a and the positioning recesses 502 in the rotation direction of the support member 500 restrict relative rotation of the support member 500 and the support connecting portion 510 in the rotation direction of the support member 500. Also, in this state, the support connecting portion 510 contacts one axial end face of each rolling body 44 from the axial direction. This restricts separation of the rolling bodies 44 from the rolling body holding portions 62 in the axial direction.

The operation of the present embodiment will now be described.

When the rotational drive of the rotation shaft 24 is started by the drive of the motor unit 20, the rotational drive of the driving-side rotating body 42 that rotates integrally with the rotation shaft 24 is started. As the driving-side rotating body 42 rotates, the circumferential end portions of the rolling body release portions 57 of the driving-side rotating body 42 on the front sides in the rotation direction come into contact with the rolling body holding portions 62 in the rotation direction (see FIG. 40A).

Figure 44:
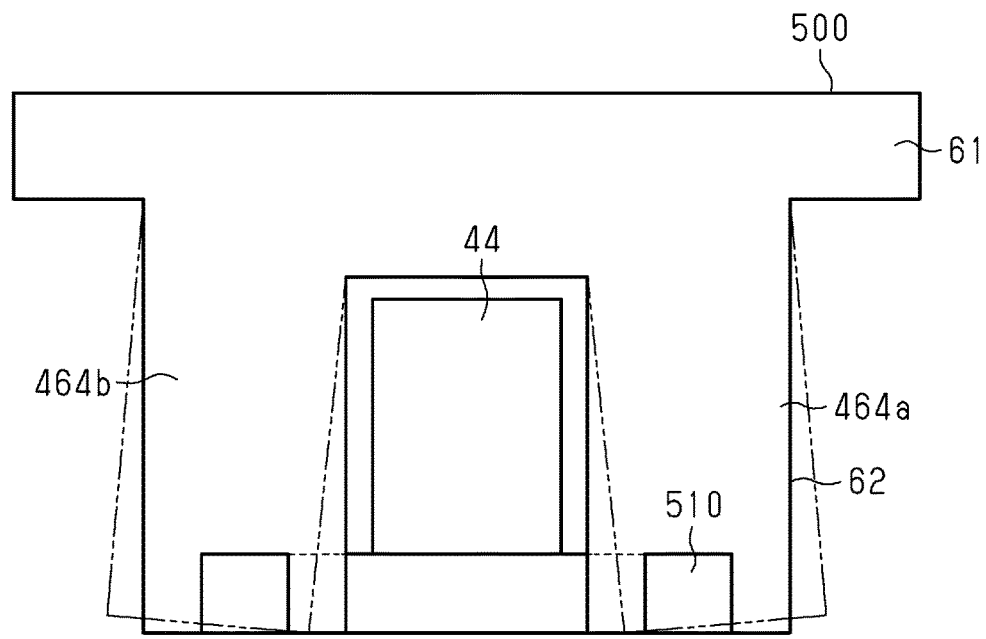
FIG. 44 is a schematic view of the support member holding the rolling bodies of the tenth embodiment.

Here, as shown in FIG. 44, the support connecting portion 510 coupled to the support member 500 serves as a weight for the support member 500. Accordingly, the moment of inertia of the support member 500 is increased, thus making it difficult for the support member 500 that has stopped rotating to start to rotate about the rotation axis of the driving-side rotating body 42. Furthermore, the support connecting portion 510 connects the distal end portions of the two first and second supports 464a and 464b in the direction of the rotation axis L5 at each rolling body holding portion 62. Thus, when starting rotational drive of the driving-side rotating body 42, the two first and second supports 464a and 464b are restricted from being elastically deformed and opening in the rotation direction away from each other by the impact of the rolling body release portion 57 coming into contact with the rolling body holding portion 62 from the rotation direction of the driving-side rotating body 42 (see chain double-dashed lines in FIG. 44). Consequently, the support member 500 is prevented from being forced in the rotation direction with respect to the driving-side rotating body 42 by an elastic force caused by the elastic deformation of at least one support of the first and second supports 464a and 464b. Therefore, when starting rotational drive of the driving-side rotating body 42, the support member 500 is prevented from being forced in the rotation direction of the driving-side rotating body 42, rotating ahead of the driving-side rotating body 42 by the impact of the rolling body release portions 57 coming into contact with the rolling body holding portions 62 from the rotation direction of the driving-side rotating body 42. Accordingly, after the rolling body release portions 57 come into contact with the rolling body holding portions 62 from the rotation direction of the driving-side rotating body 42, the driving-side rotating body 42 and the support member 500 tend to rotate integrally. Then, the rolling body release portions 57 contacting the rolling body holding portions 62 in the rotation direction press the rolling bodies 44 in the rotation direction of the driving-side rotating body 42 with the rolling body holding portions 62. This releasing the rolling bodies 44 held between the inner circumferential surface 41c of the clutch housing 41 and the control surfaces 83 of the driven-side rotating body 45.

After the rolling bodies 44 held between the inner circumferential surface 41c of the clutch housing 41 and the driven-side rotating body 45 are released by the rolling body holding portions 62 pressed in the rotation direction of the driving-side rotating body 42 by the driving-side rotating body 42 (rolling body release portions 57), the driven-side rotating body 45 may act to hold the rolling bodies 44 again with the inner circumferential surface 41c of the clutch housing 41. However, the present embodiment restricts the support member 500 from rotating ahead of the driving-side rotating body 42. This facilitates integral rotation of the driving-side rotating body 42 and the support member 500. Thus, integral rotation of the driving-side rotating body 42 and the support member 500 immediately releases the rolling bodies 44 held between the inner circumferential surface 41c of the clutch housing 41 and the driven-side rotating body 45.

In addition to advantages (1), (2), and (4) of the ninth embodiment, the present embodiment has the following advantages.

(1) The support connecting portion 510 is formed separately from the support member 500, and is fitted to the support member 500. Thus, the support connecting portion 510 can be coupled to the support member 500 after the rolling bodies 44 are coupled between the pairs of supports 464a and 464b. In this case, the rolling bodies 44 can be inserted between the pairs of supports 464a and 464b from the distal end side of the supports 464a and 464b in the direction of the rotation axis L5 (same as rotation axis direction of driving-side rotating body 42). Thus, the rolling bodies 44 can be easily coupled to the support member 500.

(2) The support connecting portion 510 serves as a weight for the support member 500. Accordingly, the moment of inertia of the support member 500 is increased. Thus, it is difficult for the support member 500 that has stopped rotating to start to rotate about the rotation axis of the driving-side rotating body 42. Therefore, when starting rotational drive of the driving-side rotating body 42, the support member 500 can be further restricted from being forced in the rotation direction of the driving-side rotating body 42, rotating ahead of the driving-side rotating body 42 by the impact of the rolling body release portions 57 coming into contact with the rolling body holding portions 62 from the rotation direction of the driving-side rotating body 42. Accordingly, after the rolling body release portions 57 come into contact with the rolling body holding portions 62 from the rotation direction of the driving-side rotating body 42, the driving-side rotating body 42 and the support member 500 rotate integrally more easily. As a result, when starting rotational drive of the driving-side rotating body 42, the driving-side rotating body 42 and the rolling body holding portions 62 are be further restricted from repeatedly separating from and coming into contact with each other in the rotation direction of the driving-side rotating body 42 so that noise generation when starting rotational drive of the driving-side rotating body 42 is further reduced.

The above embodiments may be modified as follows.

In the above embodiments, the connecting portions 467 are provided integrally with the first and second supports 464a and 464b. However, the connecting portions 467 may be provided separately from the support member 43 or 500, and fitted to the support member 43 or 500. Further, the clutch 40 does not necessarily need to include the connecting portions 467.

In the tenth embodiment, the support connecting portion 510 is made of a metal material having a mass per unit volume larger than that of a resin material of which the support member 500 is made. However, the material of which the support connecting portion 510 is made is not limited in such a manner. For example, the support connecting portion 510 may be made of the same resin material as the support member 500. Alternatively, for example, the support connecting portion 510 may be made of a resin material that is different from the resin material of which the support member 500 is made, and has the same or a smaller mass per unit volume. This obtains advantage (1) of the ninth embodiment. Alternatively, for example, when the support connecting portion 510 is formed of a resin material that is different from the resin material of which the support member 500 is made, and has a mass per unit volume larger than that of the resin material of which the support member 500 is made, the same advantages as the tenth embodiment can be obtained. Further, for example, the support connecting portion 510 may include a weight made of a metal material and a holding member made of a resin material for holding the weight.

In the tenth embodiment, the support connecting portion 510 has an annular shape. However, the shape of the support connecting portion 510 is not limited to in such a manner. The support connecting portion 510 may have any shape as long as it is formed separately from the support member 500 and coupled to the support member 500, and connects the distal end portions of the pairs of first and second supports 464a and 464b in the rotation axis direction of the driving-side rotating body 42. For example, the support connecting portion 510 may be provided for each rolling body holding portion 62 and have an arc shape for connecting the distal end portions of the two first and second supports 464a and 464b in the rotation axis direction of the driving-side rotating body 42.

In the ninth embodiment, each support connecting portion 466 has a flat plate shape of an arc shape with a width substantially equal to the radial width of the first and second supports 464a and 464b. However, the shape of the support connecting portions 466 is not limited in such a manner. Each support connecting portion 466 may have any shape as long as it connects the distal end portions of the two first and second supports 464a and 464b in the rotation axis direction of the driving-side rotating body 42. For example, each support connecting portion 466 may have an arcuate plate shape with a radial width smaller than that of the first and second supports 464a and 464b when viewed from the axial direction. Further, for example, each support connecting portion 466 may extend linearly between the two first and second supports 464a and 464b.

The support connecting portion 466 or 510 does not necessarily have to be provided in a position to abut on one axial end face of each rolling body 44. Preferably, in this case, a structure is provided to restrict separation of the rolling bodies 44 from the rolling body holding portions 62 in the axial direction separately from the support connecting portion 466 or 510.

In the above embodiments, each of the support members 43 and 500 includes the two rolling body holding portions 62 that hold the rolling bodies 44. However, the number of the rolling body holding portions 62 of the support member 43 or 500 is not limited to two, and may be one, or three or greater. The number of the rolling body holding portions 62 may be set according to the number of the rolling bodies 44 provided in the clutch 40. At least one rolling body 44 may be arranged between the inner circumferential surface 41c of the clutch housing 41 and the driven-side rotating body 45.

In the above embodiments, the shapes of the clutch housing 41, the driving-side rotating body 42, the support member 43 or 500, the rolling bodies 44, and the driven-side rotating body 45 forming the clutch 40 do not necessarily need to be the shapes in the above embodiments. For example, the driving-side rotating body 42 may be formed integrally with the rotation shaft 24. Further, for example, the driven-side rotating body 45 may be provided separately from the worm shaft 34, and fitted to the worm shaft 34 in an integrally rotatable manner. Further, for example, the rolling bodies 44 may have a columnar shape or a spherical shape.

In the above embodiments, the motor 10 is used as the drive source of the power window device, but it may be used as a drive source of another device.

In the above embodiments, the clutch 40 is provided in the motor 10 to connect the rotation shaft 24 and the worm shaft 34 of the speed reduction mechanism 32. However, the clutch 40 may be provided in a device other than the motor 10 to connect a rotation shaft to be rotationally driven and a driven shaft to which the rotational driving force of the rotation shaft is transmitted.

The invention claimed is:
1. A clutch comprising:
an annular clutch housing;
a driving-side rotating body that is rotationally driven;
a driven-side rotating body inserted into the clutch housing and to which rotational driving force is transmitted from the driving-side rotating body;
a rolling body arranged between an inner circumferential surface of the clutch housing and the driven-side rotating body, wherein the rolling body is rotated about a rotation axis of the driving-side rotating body together with the driving-side rotating body when the driving-side rotating body is rotationally driven and held between the clutch housing and the driven-side rotating body to restrict rotation of the driven-side rotating body when the driving-side rotating body is not rotationally driven; and
a support member holding the rolling body between the inner circumferential surface of the clutch housing and the driven-side rotating body and being rotatable about the rotation axis of the driving-side rotating body together with the driving-side rotating body,
wherein:
when starting rotational drive of the driving-side rotating body, the driving-side rotating body abuts on the support member from a rotation direction and presses the rolling body in the rotation direction with the support member to release the rolling body held between the clutch housing and the driven-side rotating body;
the support member includes a load generation portion that generates load limiting rotation of the support member about the rotation axis of the driving-side rotating body at least when starting rotational drive of the driving-side rotating body;
the support member includes at least one of a first abutting portion that abuts on the clutch housing and a second abutting portion that abuts on the driving-side rotating body;
the load generation portion increases at least one of frictional force between the clutch housing and the first abutting portion and frictional force between the driving-side rotating body and the second abutting portion;
the support member includes a portion overlapping at least one of the clutch housing and the driving-side rotating body in a rotation axis direction of the support member; and
the load generation portion is an inclined surface inclined relative to the rotation axis direction of the support member and abuts on the driving-side rotating body from the rotation direction of the driving-side rotating body when starting rotational drive of the driving-side rotating body.

2. The clutch according to claim 1, wherein the load generation portion generates a pressing force that presses the support member toward the clutch housing or the driving-side rotating body so that the first abutting portion is pressed against the clutch housing or the second abutting portion is pressed against the driving-side rotating body.

3. The clutch according to claim 1, wherein the driving-side rotating body includes a driving-side inclined surface inclined relative to the rotation axis direction of the driving-side rotating body and coming into surface contact or line contact with the inclined surface from the rotation direction of the driving-side rotating body when starting rotational drive of the driving-side rotating body.

4. The clutch according to claim 1, wherein the load generation portion includes a resistance projection that projects from an outer surface of the support member and increases air resistance acting on the support member when the support member rotates about the rotation axis of the driving-side rotating body.

5. The clutch according to claim 4, wherein
the resistance projection projects in an axial direction from an outer surface of the support member and includes a resistance inclined surface inclined relative to the rotation axis direction of the support member.

6. A motor comprising:
a motor unit including a rotation shaft that is rotationally driven;
the clutch according to claim 1 including the driving-side rotating body that rotates integrally with the rotation shaft; and
an output unit that includes a driven shaft rotated integrally with the driven-side rotating body and outputs rotational driving force transmitted to the driven shaft.

7. A clutch comprising:
an annular clutch housing;
a driving-side rotating body that is rotationally driven;
a driven-side rotating body at least partially arranged in the clutch housing and to which rotational driving force is transmitted from the driving-side rotating body;
a rolling body arranged between an inner circumferential surface of the clutch housing and the driven-side rotating body, wherein the rolling body is rotated about a rotation axis of the driving-side rotating body together with the driving-side rotating body when the driving-side rotating body is rotationally driven and held between the inner circumferential surface of the clutch housing and the driven-side rotating body to restrict rotation of the driven-side rotating body when the driving-side rotating body is not rotationally driven; and
a support member holding the rolling body between the inner circumferential surface of the clutch housing and the driven-side rotating body and being rotatable about the rotation axis of the driving-side rotating body together with the driving-side rotating body;
wherein:
when starting rotational drive of the driving-side rotating body, the driving-side rotating body abuts on the support member from a rotation direction of the driving-side rotating body and presses the rolling body in the rotation direction of the driving-side rotating body with the support member to release the rolling body held between the inner circumferential surface of the clutch housing and the driven-side rotating body;
the clutch further comprises an urging member that urges the support member to limit rotation of the support member about the rotation axis of the driving-side rotating body; and
the urging member urges the support member in a direction perpendicular to the rotation axis of the driving-side rotating body.

8. The clutch according to claim 7, wherein the urging member urges the support member in a direction perpendicular to a rotation direction of the support member.

9. The clutch according to claim 7, wherein the urging member urges the support member toward the clutch housing.

10. The clutch according to claim 9, wherein
the support member includes an axial abutting portion that abuts on the clutch housing from an axial direction, and
the urging member urges the support member in the axial direction so that the axial abutting portion is pressed against the clutch housing.

11. A motor comprising:
a motor unit including a rotation shaft that is rotationally driven;
the clutch according to claim 7 including the driving-side rotating body that rotates integrally with the rotation shaft; and
an output unit that includes a driven shaft rotated integrally with the driven-side rotating body and outputs rotational driving force transmitted to the driven shaft.

12. A clutch comprising:
an annular clutch housing;
a driving-side rotating body that is rotationally driven;
a driven-side rotating body inserted into the clutch housing and to which rotational driving force is transmitted from the driving-side rotating body;
a rolling body arranged between an inner circumferential surface of the clutch housing and the driven-side rotating body, wherein the rolling body is held between the clutch housing and the driven-side rotating body when the driving-side rotating body is not rotationally driven to restrict rotation of the driven-side rotating body; and
a support member including a pair of first and second supports and a rolling body holding portion, wherein the first and second supports project in a rotation axis direction of the driving-side rotating body on both sides of the rolling body in a rotation direction of the driving-side rotating body, wherein the rolling body holding portion holds the rolling body between the inner circumferential surface of the clutch housing and the driven-side rotating body, and the support member is rotatable about the rotation axis of the driving-side rotating body together with the driving-side rotating body,
wherein:
when starting rotational drive of the driving-side rotating body, the driving-side rotating body abuts on the rolling body holding portion from the rotation direction and presses the rolling body in the rotation direction with the rolling body holding portion to release the rolling body held between the clutch housing and the driven-side rotating body;
the clutch further comprises a support connecting portion that connects distal end portions of the two first and second supports in the rotation axis direction of the driving-side rotating body;
the support member includes a plurality of the rolling body holding portions arranged in a rotation direction of the support member and each holding the rolling body; and
the clutch further comprises a connecting portion that connects the distal end portion in the rotation axis direction of the driving-side rotating body of the first support of one of two of the rolling body holding portions located adjacent to each other in the rotation direction of the support member and the distal end portion in the rotation axis direction of the driving-side rotating body of the second support of the other one of the rolling body holding portions adjacent to the first support in the rotation direction of the support member.

13. The clutch according to claim 12, wherein the support connecting portion is provided integrally with the support member.

14. The clutch according to claim 12, wherein the support connecting portion is formed separately from the support member and coupled to the support member.

15. The clutch according to claim 14, wherein the support connecting portion serves as a weight for the support member.

16. A motor comprising:
a motor unit including a rotation shaft that is rotationally driven;
the clutch according to claim 12 including the driving-side rotating body that rotates integrally with the rotation shaft; and
an output unit that includes a driven shaft rotated integrally with the driven-side rotating body and outputs rotational driving force transmitted to the driven shaft.

* * * * *